US011089622B2

(12) United States Patent
Luo et al.

(10) Patent No.: US 11,089,622 B2
(45) Date of Patent: Aug. 10, 2021

(54) SUPPORTING SCHEDULING PLAN INDICATIONS

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Muhammad Nazmul Islam, Littleton, MA (US); Karl Georg Hampel, Hoboken, NJ (US)

(73) Assignee: QUALCOMM Incorporated, San Diego, CA (US)

(*) Notice: Subject to any disclaimer, the term of this patent is extended or adjusted under 35 U.S.C. 154(b) by 98 days.

(21) Appl. No.: 16/418,824

(22) Filed: May 21, 2019

(65) Prior Publication Data
US 2019/0373627 A1   Dec. 5, 2019

Related U.S. Application Data

(60) Provisional application No. 62/677,533, filed on May 29, 2018.

(51) Int. Cl.
*H04W 72/12* (2009.01)
*H04W 72/08* (2009.01)
(Continued)

(52) U.S. Cl.
CPC ....... *H04W 72/1289* (2013.01); *H04W 24/10* (2013.01); *H04W 72/082* (2013.01);
(Continued)

(58) Field of Classification Search
CPC ......... H04W 72/1289; H04W 72/1226; H04W 72/1242; H04W 72/082; H04W 24/10;
(Continued)

(56) References Cited

U.S. PATENT DOCUMENTS 8,670,717 B2 * 3/2014 van Rensburg ........ H04B 7/026
455/63.1
2014/0274202 A1 * 9/2014 Zhao ................. H04W 72/1226
455/552.1
(Continued)

FOREIGN PATENT DOCUMENTS

EP         3556137 A1 * 10/2019 ............ H04W 36/00
WO   WO-2013180991 A1 * 12/2013 .......... H04J 11/0069
(Continued)

OTHER PUBLICATIONS

Astri et al., "Interference Measurement and Reporting for MU Transmission in FD-MIMO", 3GPP Draft; R1-1609547, 3rd Generation Partnership Project (3GPP), Mobile Competence Centre ; 650, Route Des Lucioles ; F-06921 Sophia-Antipolis Cedex ; France, vol. RAN WG1, No. Lisbon, Portugal; Oct. 10, 2016-Oct. 14, 2016, Sep. 30, 2016 (Sep. 30, 2016), XP051158494, 6 pages, Retrieved from the Internet: URL:http://www.3gpp.org/ftp/tsg_ran/WG1_RL1/TSGR1_86b/Docs/ [retrieved on Sep. 30, 2016], section 2.2.
(Continued)

*Primary Examiner* — Jay P Patel
(74) *Attorney, Agent, or Firm* — Holland & Hart LLP

(57) ABSTRACT

A base station central unit (CU) may receive a measurement report from one or more user equipments (UEs). The CU may identify a scheduling plan indication (SPI) for one or more scheduling nodes in a network, based at least in part on the received measurement reports. The SPI may specify a pattern of scheduling states, over a period of time, to be used by the one or more scheduling nodes to schedule communication resources for one or more UEs in the network. The scheduling states may (e.g., based on an interference profile determined from the received measurement reports) specify UEs or other communication resources for transmission scheduling decisions made by the scheduling nodes, or may (Continued)

specify beam patterns for beamforming procedures performed by the scheduling nodes. In some cases, the scheduling nodes may identify tentative SPIs, which the CU may pass amongst other scheduling nodes for distributed scheduling coordination schemes.

69 Claims, 23 Drawing Sheets

(51) Int. Cl.
*H04W 24/10* (2009.01)
*H04L 1/00* (2006.01)

(52) U.S. Cl.
CPC ... *H04W 72/1226* (2013.01); *H04W 72/1242* (2013.01); *H04L 1/0003* (2013.01)

(58) Field of Classification Search
CPC ............. H04W 72/1231; H04L 1/0003; H04L 1/0025; H04B 7/0617
See application file for complete search history.

(56) References Cited

U.S. PATENT DOCUMENTS

| | | | | |
|---|---|---|---|---|
| 2016/0262178 | A1* | 9/2016 | Vangala | H04W 72/14 |
| 2018/0007587 | A1* | 1/2018 | Feldman | H04L 65/1016 |
| 2019/0052483 | A1* | 2/2019 | Akula | H04W 72/1268 |
| 2019/0053193 | A1* | 2/2019 | Park | H04W 72/02 |
| 2020/0128646 | A1* | 4/2020 | Sinha | H05B 45/20 |
| 2020/0145079 | A1* | 5/2020 | Marinier | H04W 74/0833 |

FOREIGN PATENT DOCUMENTS

| | | | | |
|---|---|---|---|---|
| WO | WO-2015136092 | A1 * | 9/2015 | H04W 72/0453 |
| WO | WO-2017196612 | A1 * | 11/2017 | H04B 7/0617 |
| WO | WO-2018028158 | A1 * | 2/2018 | H04B 7/06 |
| WO | WO-2018108294 | A1 * | 6/2018 | H04B 10/116 |

OTHER PUBLICATIONS

International Search Report and Written Opinion—PCT/US2019/033620—ISA/EPO—dated Aug. 1, 2019.

Nokia et al., "Dynamic Resource Allocation between Backhaul and Access Links", 3GPP Draft; R1-1806662_IAB_Resource Allocation, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 12, 2018, (May 12, 2018), XP051462699, 6 pages, Retrieved from the Internet: URL:http://www.3gpp.org/ftp/tsg%5Fran/WG1%5FRL1/TSGR1%5F93/Docs [retrieved on May 12, 2018], p. 2, "option 2", section 3—section 4; figure 5.

Qualcomm Incorporated: "Iab Resource Partitioning for Architecture Group 1", 3GPP Draft; R2-1808006 IAB Resource Partitioning for Architecture Group 1, 3rd Generation Partnership Project (3GPP), Mobile Competence Centre; 650, Route Des Lucioles; F-06921 Sophia-Antipolis Cede, vol. RAN WG2, No. Busan, South Korea; May 21, 2018-May 25, 2018, May 11, 2018 (May 11, 2018), XP051465059, 3 pages, Retrieved from the Internet: URL:http://www.3gpp.org/ftp/tsg%5Fran/WG2%5FRL2/TSGR2%5F102/Docs [retrieved on May 11, 2018], p. 2; figure 2.

Qualcomm Incorporated: "Resource Coordination Across IAB Topology", 3GPP Draft; R2-1808007 Resource Coordination Across IAB Topology, 3rd Generation Partnership Project (3GPP), Mobile Competence Centre ; 650, Route Des Lucioles ; F-06921 Sophia-Antipolis Cedex; Franc, vol. RAN WG2, No. Busan, South Korea; May 21, 2018-May 25, 2018, May 10, 2018 (May 10, 2018), XP051464245, 6 pages, Retrieved from the Internet: URl:http://www.3gpp.org/ftp/tsg%5Fran/WG2%5FRL2/TSGR2%5F102/Docs [retrieved on May 10, 2018], p. 2.

* cited by examiner

SUPPORTING SCHEDULING PLAN INDICATIONS

CROSS REFERENCE

The present application for patent claims the benefit of U.S. Provisional Patent Application No. 62/677,533 by LUO et al., entitled "Supporting Scheduling Plan Indications," filed May 29, 2018, assigned to the assignee hereof, and expressly incorporated herein.

BACKGROUND

The following relates generally to wireless communications, and more specifically to supporting scheduling plan indications (SPIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., 5G new radio (NR) systems), base stations may include central units (CUs) and distributed units (DUs), where one or more DUs associated with a base station may be partially controlled by a CU associated with the base station. A base station CU may be a component of a database, data center, core network, or network cloud. In some cases (e.g., in integrated access backhaul (IAB) networks), a network node may communicate with a base station CU (e.g., a donor base station) via a backhaul link (e.g., a wireline backhaul or wireless backhaul). This donor base station (e.g., IAB donor) may be in communication with one or more IAB nodes operating as base station DUs relative to the IAB donor. These relay mechanisms may forward received traffic along to other devices, extend the range of wireless access for one or more base stations, etc. However, in some cases, scheduling of resources within access networks implementing such relay techniques may be associated with increased complexity, for example due to interference between neighboring beams and UEs of neighboring cells.

SUMMARY

The described techniques relate to improved methods, systems, devices, or apparatuses that support scheduling plan indications (SPIs). Generally, the described techniques provide for signaling of SPI information to coordinate scheduling in wireless communications systems implementing distributed unit (DU) techniques. A core network may be associated with one or more access networks (ANs). In networks employing distributed node techniques, each AN may include a central unit (CU) (e.g., associated with a base station) and one or more nodes for scheduling (e.g., DUs, for example, also associated with the base station) for scheduling communications with user equipment (UEs) within the network.

In some examples, a network may employ centralized intra-AN scheduling coordination via SPIs. A CU may receive a measurement report from one or more UEs. The CU may identify a SPI for one or more scheduling nodes (e.g., a DU) in a network, based at least in part on the received measurement reports. The SPI may specify a pattern of scheduling states, over a period of time, to be used by the one or more scheduling nodes to schedule communication resources for one or more UEs in the network (e.g., the SPI pattern may be set by the CU based on an interference profile determined from the received measurement reports). The scheduling states (e.g., for a given time unit) may specify UEs, beam indices, or other communication resources to be used by the scheduling nodes for making transmission scheduling decisions. Additionally or alternatively, the scheduling states may coordinate beam indices or beam patterns for beamforming procedures performed by the scheduling nodes.

In some examples, a network may employ distributed intra-AN scheduling coordination via SPIs. The scheduling nodes may identify tentative SPIs, which the CU may take into consideration upon determining the SPI. The scheduling states associated with tentative SPIs transmitted by scheduling nodes may depend on the capability or functionality partition between the CU and scheduling nodes within the network (e.g., the tentative SPI may depend on the role or responsibility the scheduling nodes take in scheduling decisions). The CU may receive tentative SPI from one or more scheduling nodes, and may update the tentative SPI (e.g., based on an interference profile) or may pass or forward the tentative SPI to other scheduling nodes (e.g., the CU may pass tentative SPI amongst scheduling nodes, and the scheduling nodes may take each other's tentative SPI into account when making scheduling decisions). For example, a scheduling node may prepare an updated SPI based on the other scheduling node's tentative SPIs, and in some cases may then distribute the updated SPI. Such techniques may provide for scheduling node distributed scheduling coordination schemes.

In some examples, a network may employ inter-AN scheduling coordination via SPIs (e.g., inter-AN scheduling coordination may be employed in addition to intra-AN scheduling coordination). For example, in distributed inter-AN scheduling coordination schemes, two or more CUs may exchange tentative SPI with each other, and each CU may modify SPI, which they may then signal to their respective scheduling nodes based on tentative SPI associated with other CUs. In a centralized inter-AN scheduling coordination scheme, CUs may signal tentative SPI to a network node, and the network node may modify a SPI based on all received tentative SPI, and may signal updated SPI to the CUs (e.g., which the CUs may then indicate to their respective scheduling nodes).

A method of wireless communication is described. The method may include receiving a measurement report for a UE, where the measurement report includes measured values of at least one beam of a cell measured by the UE. The method may further include identifying, for a scheduling node, an indication of a scheduling plan specifying a pattern of scheduling states over a period of time, where the indication of the scheduling plan is based on the measurement report and is to be used by the scheduling node to schedule communication resources for the UE.

An apparatus for wireless communication is described. The apparatus may include a processor, memory in electronic communication with the processor, and instructions stored in the memory. The instructions may be executable by the processor to cause the apparatus to receive a measurement report for a UE, where the measurement report includes measured values of at least one beam of a cell measured by the UE. The instructions may be executable by the processor to further cause the apparatus to identify, for a scheduling node, an indication of a scheduling plan specifying a pattern of scheduling states over a period of time, where the indication of the scheduling plan is based on the measurement report and is to be used by the scheduling node to schedule communication resources for the UE.

Another apparatus for wireless communication is described. The apparatus may include means for receiving a measurement report for a UE, where the measurement report includes measured values of at least one beam of a cell measured by the UE. The apparatus may further include means for identifying, for a scheduling node, an indication of a scheduling plan specifying a pattern of scheduling states over a period of time, where the indication of the scheduling plan is based on the measurement report and is to be used by the scheduling node to schedule communication resources for the UE.

A non-transitory computer-readable medium storing code for wireless communication is described. The code may include instructions executable by a processor to receive a measurement report for a UE, where the measurement report includes measured values of at least one beam of a cell measured by the UE. The code may further include instructions executable by a processor to identify, for a scheduling node, an indication of a scheduling plan specifying a pattern of scheduling states over a period of time, where the indication of the scheduling plan is based on the measurement report and is to be used by the scheduling node to schedule communication resources for the UE.

In some examples of the method, apparatuses, and non-transitory computer-readable medium described herein, the pattern of scheduling states includes a scheduling information state, or a flexible state, or a NULL state, or a combination thereof. In some examples of the method, apparatuses, and non-transitory computer-readable medium described herein, for the flexible state, the scheduling node may be allowed to schedule any UE, or any beam direction, or a combination thereof. In some examples of the method, apparatuses, and non-transitory computer-readable medium described herein, for the NULL state, the scheduling node may be prevented from scheduling all UEs, or all beam directions, or a combination thereof.

In some examples of the method, apparatuses, and non-transitory computer-readable medium described herein, the period of time includes one or more slots or mini-slots. In some examples of the method, apparatuses, and non-transitory computer-readable medium described herein, the indication of the scheduling plan identifies values for scheduling for a scheduling state, the values including a set UE indices, or a set of beam indices, or a set of angular values, or a set of location values, or a combination thereof. In some examples of the method, apparatuses, and non-transitory computer-readable medium described herein, the indication of the scheduling plan schedules, for a scheduling state, data transmissions for different UEs, or different beam patterns, or a combination thereof.

In some examples of the method, apparatuses, and non-transitory computer-readable medium described herein, the indication of the scheduling plan identifies, for a scheduling state, allocated resources blocks, or a buffer status, or a priority, or a type of communications, or a modulation and coding scheme (MCS), or a target signal to interference noise ratio (SINR), or a target transmit power, or a target receive power, or a combination thereof.

Some examples of the method, apparatuses, and non-transitory computer-readable medium described herein may further include operations, features, means, or instructions for transmitting, by the scheduling node, the measurement report to a CU and receiving, based on transmitting the measurement report, the indication of the scheduling plan from the CU.

Some examples of the method, apparatuses, and non-transitory computer-readable medium described herein may further include operations, features, means, or instructions for determining, by the scheduling node, a tentative scheduling plan, transmitting an indication of the tentative scheduling plan to a CU and receiving, from the CU, an indication of an updated scheduling plan based on the tentative scheduling plan, where the updated scheduling plan may be the scheduling plan for the scheduling node.

Some examples of the method, apparatuses, and non-transitory computer-readable medium described herein may further include operations, features, means, or instructions for transmitting, by a first CU, the indication of the scheduling plan to the scheduling node, where the first CU identifies the indication of the scheduling plan. In some examples of the method, apparatuses, and non-transitory computer-readable medium described herein, identifying the indication of the scheduling plan may include operations, features, means, or instructions for determining, by the first CU, the indication of the scheduling plan based on the received measurement report, the measurement report received from the scheduling node.

In some examples of the method, apparatuses, and non-transitory computer-readable medium described herein, identifying the indication of the scheduling plan may include operations, features, means, or instructions for receiving an indication of a tentative scheduling plan from the scheduling node and determining an updated scheduling plan for the scheduling node based on the received indication of the tentative scheduling plan and the received measurement report, where the updated scheduling plan may be scheduling plan for the scheduling node.

In some examples of the method, apparatuses, and non-transitory computer-readable medium described herein, the updated scheduling plan for the scheduling node may be further based on at least one additional tentative scheduling plan received from at least one additional scheduling node, and may be further based on at least one additional measurement report from at least one additional UE. Some examples of the method, apparatuses, and non-transitory computer-readable medium described herein may further include operations, features, means, or instructions for receiving the indication of the scheduling plan from a second CU, the received indication transmitted to the scheduling node by the CU.

Some examples of the method, apparatuses, and non-transitory computer-readable medium described herein may further include operations, features, means, or instructions for transmitting the measurement report to a core network node and receiving the indication of the scheduling plan from the core network node. Some examples of the method, apparatuses, and non-transitory computer-readable medium described herein may further include operations, features, means, or instructions for transmitting, by a first CU, the indication of the scheduling plan to a second CU, or a core network node, or a combination thereof, where the first CU identifies the indication of the scheduling plan based on the received measurement report.

Some examples of the method, apparatuses, and non-transitory computer-readable medium described herein may further include operations, features, means, or instructions for receiving, at the scheduling node and from a second scheduling node via a CU, an indication of a tentative scheduling plan and determining, by the scheduling node, an updated scheduling plan for the scheduling node based on the received indication of the tentative scheduling plan.

Some examples of the method, apparatuses, and non-transitory computer-readable medium described herein may further include operations, features, means, or instructions for identifying, by the scheduling node, at least one priority rule applicable to the scheduling plan of the scheduling node, where the updated scheduling plan for the scheduling node may be determined based on the received indication of the tentative scheduling plan and the at least one priority rule.

Some examples of the method, apparatuses, and non-transitory computer-readable medium described herein may further include operations, features, means, or instructions for receiving, at a CU, indications of one or more tentative scheduling plans, each of the one or more tentative scheduling plans for an additional scheduling node and forwarding the indications of the one or more tentative scheduling plans to the scheduling node.

Some examples of the method, apparatuses, and non-transitory computer-readable medium described herein may further include operations, features, means, or instructions for identifying the indication of the scheduling plan includes determining, by a core network node, the indication of the scheduling plan based on the received measurement report and the method further includes transmitting the indication of the scheduling plan determined by the core network node to a CU.

Some examples of the method, apparatuses, and non-transitory computer-readable medium described herein may further include operations, features, means, or instructions for receiving, at a CU, at least one additional measurement report for at least one additional UE from the scheduling node or at least one second scheduling node and determining, by the CU, an interference profile based on the received measurement report and the at least one additional measurement reports, where the indication of the scheduling plan may be identified based on the determined interference profile. In some examples of the method, apparatuses, and non-transitory computer-readable medium described herein, the interference profile includes a profile of interfering UEs, or interfering beams, or a combination thereof.

Some examples of the method, apparatuses, and non-transitory computer-readable medium described herein may further include operations, features, means, or instructions for receiving, at the scheduling node, an interference profile from a central unit, identifying at least one UE, or at least one beam direction, or a combination thereof, as interfering based on the received interference profile and assigning, by the scheduling node, the at least one UE, or the at least one beam direction, or the combination thereof, to different time units, or different non-overlapping resource block allocations, or a combination thereof.

Some examples of the method, apparatuses, and non-transitory computer-readable medium described herein may further include operations, features, means, or instructions for transmitting configuration information for the UE to use to perform measurements of the cell, or at least one additional cell, or a combination thereof. Some examples of the method, apparatuses, and non-transitory computer-readable medium described herein may further include operations, features, means, or instructions for receiving at least one additional measurement report from the UE based on the transmitted configuration information.

Some examples of the method, apparatuses, and non-transitory computer-readable medium described herein may further include operations, features, means, or instructions for transmitting, by a parent node of an integrated access and backhaul network (IAB), the indication of the scheduling plan to a child node of the IAB.

Some examples of the method, apparatuses, and non-transitory computer-readable medium described herein may further include operations, features, means, or instructions for transmitting the indication of the scheduling plan on a group common physically downlink control channel (GC-PDCCH), or a radio resource control (RRC) message, or a combination thereof.

In some examples of the method, apparatuses, and non-transitory computer-readable medium described herein, identifying the indication of the scheduling plan may include operations, features, means, or instructions for identifying a conflict between a first indication of a first scheduling plan for the scheduling node and a second indication of the scheduling plan for the scheduling node and selecting the first scheduling plan or the second scheduling plan to be the scheduling plan based on a rule for scheduling plan selection.

Some examples of the method, apparatuses, and non-transitory computer-readable medium described herein may further include operations, features, means, or instructions for identifying a first time duration associated with the first scheduling plan and a second time duration associated with the second scheduling plan, where the rule indicates that the first scheduling plan may be selected based on the second time duration being longer than the first time duration.

Some examples of the method, apparatuses, and non-transitory computer-readable medium described herein may further include operations, features, means, or instructions for receiving a first indication of a first scheduling plan over a first type of interface, receiving a second indication of a second scheduling plan over a second type of interface and selecting the first scheduling plan to be the scheduling plan based on the rule indicating that the first type of interface overrides the second type of interface.

In some examples of the method, apparatuses, and non-transitory computer-readable medium described herein, the scheduling node includes a DU of an IAB network. In some examples of the method, apparatuses, and non-transitory computer-readable medium described herein, the IAB network includes a CU controlling a set of DUs, including the DU. In some examples of the method, apparatuses, and non-transitory computer-readable medium described herein, the SPI may be used for inter-DU coordination via a CU of the IAB network. In some examples of the method, apparatuses, and non-transitory computer-readable medium described herein, the SPI may be used for inter-CU coordination via one or more Xn_C interfaces, or via a core network, or a combination thereof.

DETAILED DESCRIPTION

Figure 1:
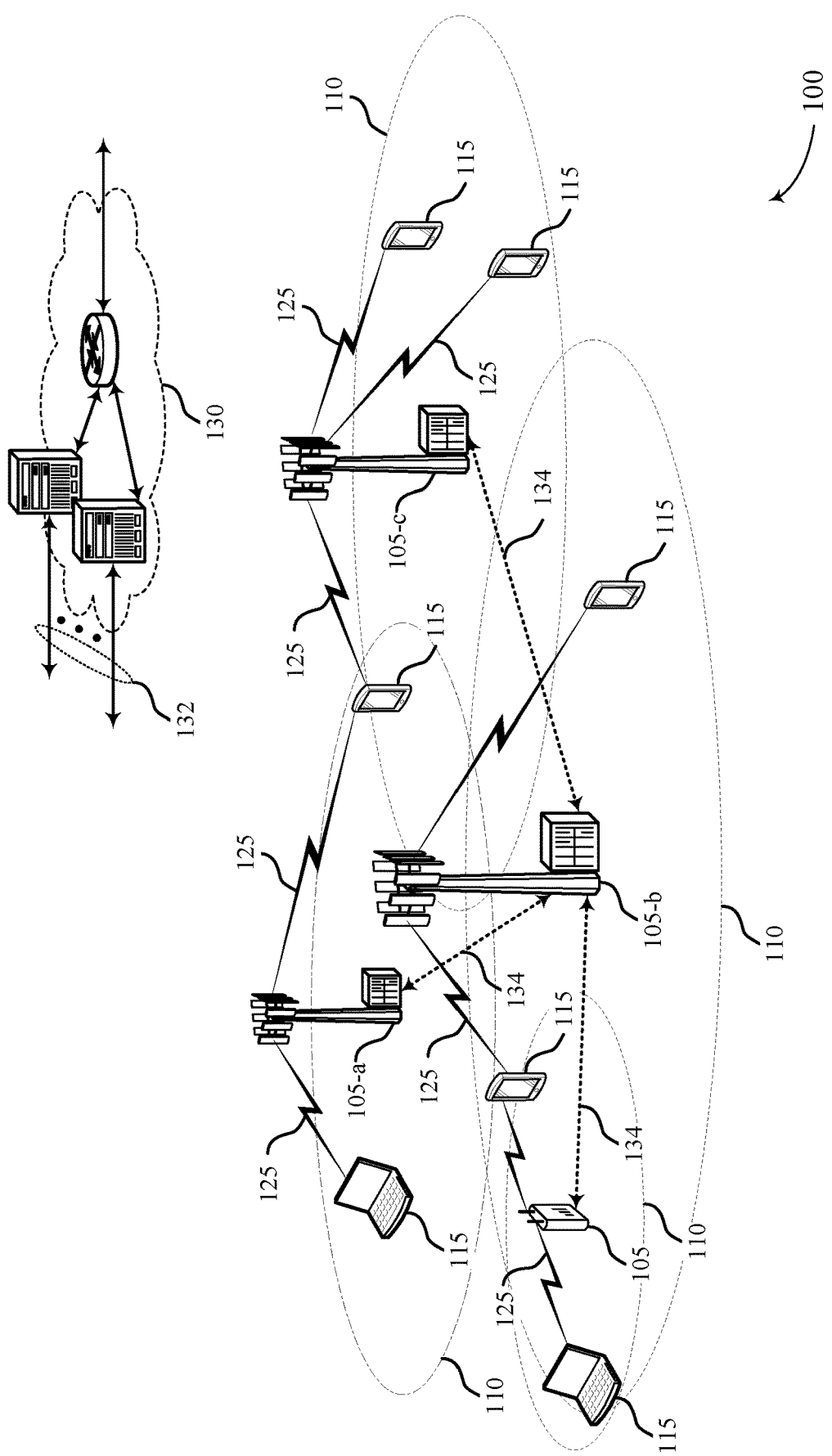
FIG. 1 illustrates an example of a system for wireless communications that supports scheduling plan indications (SPIs) in accordance with aspects of the present disclosure.

In some wireless communications systems (e.g., 5G new radio (NR) systems), base stations may be split into base station central units (CUs) and base station distributed units (DUs), where one or more DUs associated with a base station may be partially controlled by a CU associated with the base station. A base station CU may be a component of a database, data center, core network, or network cloud. In some cases (e.g., in integrated access backhaul (IAB) networks), a network node may communicate with a base station CU (e.g., a donor base station) via a backhaul link (e.g., a wireline backhaul or wireless backhaul). This donor base station (e.g., IAB donor) may be in communication with one or more IAB nodes operating as base station DUs relative to the IAB donor. For example, an IAB network may include a chain of wireless devices (e.g., starting with the donor base station and ending with a user equipment (UE), with any number of IAB nodes in between) in order to extend the range of the base station CU.

However, these relay techniques (e.g., CU-DU architecture) may be associated with increased scheduling complexity (e.g., as several DUs or IAB nodes may each be in communication with one or more UEs). For example, two different cells may each be controlled by a DU, where each DU is controlled by a CU. In some cases, UE communications associated with the first cell may interfere with UE communications associated with the second cell. Further, wireless communications systems may include multiple base stations (e.g., multiple different base station CUs), which may each be associated with their own set of DUs. As the number of relay systems (e.g., independent base station CUs each implementing DUs) increase within a network, more sophisticated scheduling coordination techniques may desired.

The techniques described herein provide for scheduling plan indications (SPIs) that may reduce interference and allow for flexible and efficient scheduling in networks employing CU-DU (e.g., relay) architecture. Generally, the described techniques provide for signaling of SPI information to coordinate scheduling in wireless communications systems implementing DU techniques. A core network may be associated with one or more access networks (ANs). In networks employing distributed node techniques, each AN may include a CU (e.g., associated with a base station) and one or more nodes for scheduling (e.g., DUs, for example, also associated with the base station) for scheduling communications with UEs within the network.

In some examples, a network may employ centralized intra-AN scheduling coordination via SPIs. A CU may receive a measurement report from one or more UEs. The CU may identify a SPI for one or more scheduling nodes (e.g., a DU) in a network, based at least in part on the received measurement reports. The SPI may specify a pattern of scheduling states, over a period of time, to be used by the one or more scheduling nodes to schedule communication resources for one or more UEs in the network (e.g., the SPI pattern may be set by the CU based on an interference profile determined from the received measurement reports). The scheduling states (e.g., for a given time unit) may specify UEs, beam indices, or other communication resources to be used by the scheduling nodes for making transmission scheduling decisions. Additionally or alternatively, the scheduling states may coordinate beam indices or beam patterns for beamforming procedures performed by the scheduling nodes.

In some examples, a network may employ distributed intra-AN scheduling coordination via SPIs. The scheduling nodes may identify tentative SPIs, which the CU may take into consideration upon determining the SPI. The scheduling states associated with tentative SPIs transmitted by scheduling nodes may depend on the capability or functionality partition between the CU and scheduling nodes within the network (e.g., the tentative SPI may depend on the role or responsibility the scheduling nodes take in scheduling decisions). The CU may receive tentative SPI from one or more scheduling nodes, and may update the tentative SPI (e.g., based on an interference profile) or may pass or forward the tentative SPI to other scheduling nodes (e.g., the CU may pass tentative SPI amongst scheduling nodes, and the scheduling nodes may take each other's tentative SPI into account when making scheduling decisions, for example by preparing an updated SPI based on the other's tentative SPIs, providing for scheduling node distributed scheduling coordination schemes).

In some examples, a network may employ inter-AN scheduling coordination via SPIs (e.g., inter-AN scheduling coordination may be employed in addition to intra-AN scheduling coordination). For example, in distributed inter-AN scheduling coordination schemes, two or more CUs may exchange tentative SPI with each other, and each CU may modify SPI, which they may then signal to their respective scheduling nodes based on tentative SPI associated with other CUs. In a centralized inter-AN scheduling coordination scheme, CUs may signal tentative SPI to a network node, and the network node may modify a SPI based on all received tentative SPI, and may signal updated SPI to the CUs (e.g., which the CUs may then indicate to their respective scheduling nodes.

Beneficially, these techniques may provide for reduced inter-AN and intra-AN interference (e.g., due to improved scheduling coordination), as well as flexible scheduling coordination in networks (e.g., ANs) associated with a diverse CU/DU functionality partitions.

Aspects of the disclosure are initially described in the context of a wireless communications system. Example coordination schemes, scheduling diagrams, and process flows implementing discussed techniques are then described. Aspects of the disclosure are further illustrated by and described with reference to apparatus diagrams, system diagrams, and flowcharts that relate to supporting SPIs.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2, Xn, F1, or other interface) either directly (e.g., directly between base stations 105) or indirectly (e.g., via core network 130).

The core network 130 may provide user authentication, access authorization, tracking, Internet Protocol (IP) or Ethernet connectivity, and other access, routing, or mobility functions. The core network 130 may be an evolved packet core (EPC) or a Next Generation Core (NGC), which may include at least one mobility management entity (MME), authentication and mobility management function (AMF), or session management function (SM), at least one serving gateway (S-GW), and at least one Packet Data Network (PDN) gateway (P-GW) or userplane function (UPF). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW or UPF may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an entity, which may be an example of an access node controller (ANC). Each AN entity may communicate with UEs 115 through a number of other AN transmission entities, which may be referred to as a radio head, a smart radio head, or a transmission/reception point. In some configurations, various functions of each AN entity or base station 105 may be distributed across various network devices (e.g., radio heads and AN controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems 100, one or more base stations 105 may be split into base station CUs and base station DUs, where one or more DUs associated with a base station may be partially controlled by a CU associated with the base station. The base station CUs may be a component of a database, data center, or the core network 130 (e.g., a 5G NR core network (5GC)). A base station CU may communicate with a donor base station 105 via a backhaul link 132 (e.g., a wireline backhaul or a wireless backhaul). As another example, in IAB networks, a base station CU (e.g., a donor base station 105-a) may communicate with the core network 130 (e.g., the NGC) via a backhaul link 132 (e.g., a wireline backhaul or wireless backhaul). This donor base station 105-a (e.g., IAB donor) may be in communication with one or more IAB nodes (e.g., base station 105-b and base station 105-c) operating as base station DUs relative to the IAB donor. For example, an IAB network may include a chain of wireless devices (e.g., starting with the donor base station 105-a and ending with a UE 115, with any number of IAB nodes in between) in order to extend the range of the base station CU. In some cases, CU-DU architecture may result in increased scheduling complexity amongst cells associated with the different DUs and/or IAB nodes.

Aspects of base stations 105 (e.g., IAB nodes, DUs, etc.) and served UEs 115 may implement SPI signaling in the wireless communications system 100 for improved inter-cell coordination and scheduling. Wireless communications system 100 may employ relay chains for communications within a CU-DU architecture. A donor base station 105 may include or be connected to a base station CU, and may transmit signals to relay base stations 105 (e.g., DUs) on the downlink. The relay base stations 105 may relay these signals to other relay base stations 105, or to UEs 115 on the downlink, or both. The donor base station 105 or the relay base station 105 may adjust the scheduling of these transmissions according to SPI signaling described below. A relay base station 105 may act as a relay between the donor base station 105 and UE 115 in both transmission directions. The donor base station 105 may refer to the base station containing a base station DU connected to the base station CU. As will be discussed, the donor base station 105 and the relay base stations 105 may implement different aspects and perform different functions relating to SPI signaling. Described SPI based scheduling techniques may mitigate interference and more efficiently utilize wireless resources within wireless communications system 100.

A CU (e.g., associated with a base station 105) may receive a measurement report from one or more UEs 115. The CU may identify a SPI for one or more scheduling nodes (e.g., DUs) in a network, based at least in part on the received measurement reports. The SPI may specify a pattern of scheduling states, over a period of time, to be used by the one or more scheduling nodes to schedule communication resources for one or more UEs 115 in the network. The scheduling states may specify UEs 115 or other communication resources to be used by the scheduling nodes for transmission scheduling decisions, or may specify beam patterns for beamforming procedures performed by the scheduling nodes (e.g., based on an interference profile determined from the received measurement reports). In some cases, the scheduling nodes may identify tentative SPIs, which the CU may take into consideration upon determining the SPI, or may pass amongst other scheduling nodes for distributed scheduling coordination schemes.

Figure 2A:
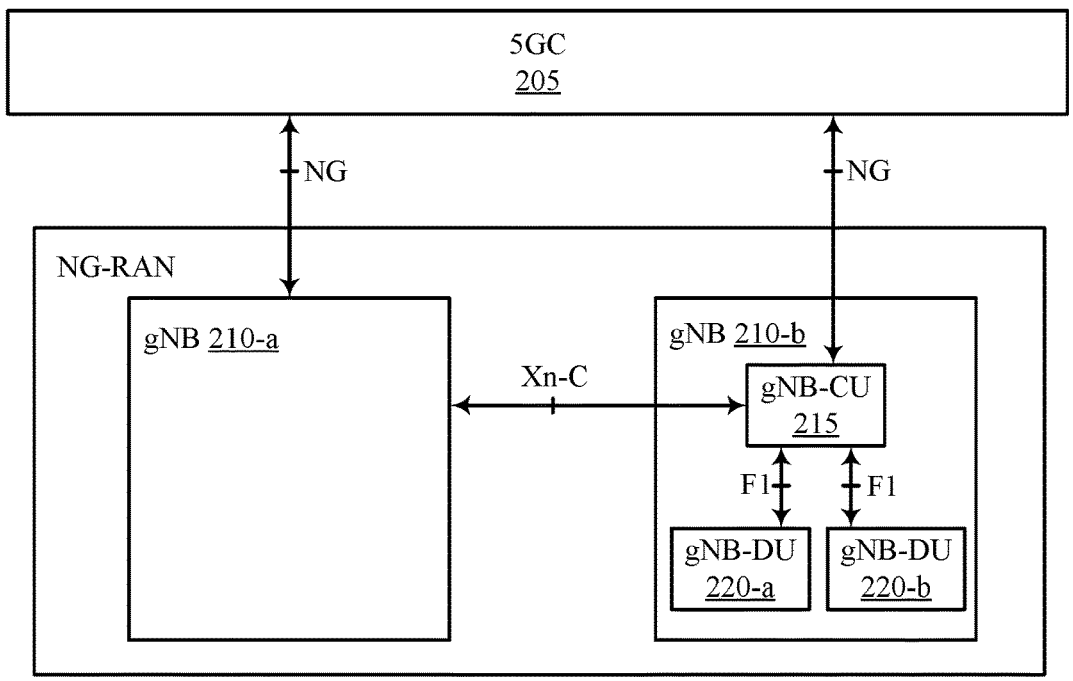
FIGS. 2A and 2B illustrate examples of wireless communications systems that support supporting SPIs in accordance with aspects of the present disclosure.
Figure 2B:
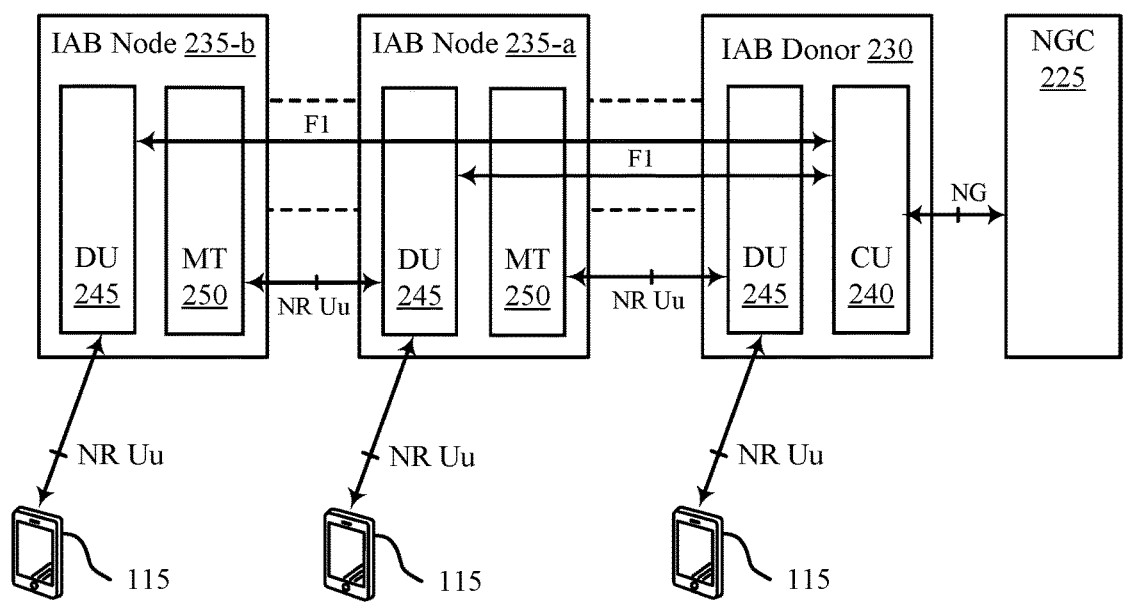

FIGS. 2A and 2B illustrate examples of wireless communications systems that may employ CU-DU split architecture and may implement SPIs in accordance with various aspects of the present disclosure. For example, FIG. 2A illustrates a wireless communications system 200 (e.g., a NR system, an LTE system, etc.) that supports SPIs in accordance with various aspects of the present disclosure. Wireless communications system 200 may include a core network 205 (e.g., a 5GC) and base stations 210 split into base station CUs 215 and base station DUs 220, where one or more DUs 220 associated with a base station 210 may be partially controlled by a CU 215 associated with the base station 210. Base station 210-a and base station 210-b may be an example of aspects of base stations 105, and core network 205 may be an example of aspects of core network 130, as described with reference to FIG. 1.

For example, base station 210-b may be split into one CU 215 and DUs 220-a and 220-b. CU 215 may host layer 3 (L3) (e.g., RRC, service data adaption protocol (SDAP), packet data convergence protocol (PDCP), etc.) functionality and signaling. DUs 220-a and 220-b may host lower layer, such as layer 1 (L1) and layer 2 (L2) (e.g., radio link control (RLC), media access control (MAC), physical (PHY), etc.) functionality and signaling, and may each be at least partially controlled by CU 215. DU 220-a and DU 220-b may each support one of multiple cells (e.g., each DU 220 may be associated with one or multiple different cells). CU 215 and DUs 220-a and 220-b may communicate over an F1 interface according to some protocol that defines signaling messages between CUs 215 and DUs 220 (e.g., F1-application protocol (AP) protocol). Further, CU 215 may communicate with the core network 205 over an NG interface (which may an example of a portion of backhaul link 132), and may communicate with other CUs 215 (e.g., a CU associated with base station 210-a) over an Xn-C interface (which may an example of a portion of backhaul link 134).

FIG. 2B illustrates a wireless communications system 201 (e.g., including portions of an IAB network) that supports SPIs in accordance with various aspects of the present disclosure. Wireless communications system 201 may include a core network 225 (e.g., a NGC), an IAB donor 230, IAB nodes 235, and UEs 115, where IAB nodes may be partially controlled by each other and/or the IAB donor 203. The IAB donor 230 and IAB nodes 235 may be examples of aspects of base stations 105, and core network 225 may be an example of aspects of core network 130, as described with reference to FIG. 1. IAB donor 230 and one or more IAB nodes 235 may be configured as (e.g., or in communication according to) some relay chain.

For example, an AN may refer to communications between access nodes (e.g., IAB donor 230 and IAB nodes 235-*a* and 235-*b*) and UEs 115. The IAB donor 230 may facilitate connection between the core network 225 and the AN (e.g., via a wireline or wireless connection to the core network 225). That is, an IAB donor 230 may refer to a radio access network (RAN) node with a wireline or wireless connection to core network 225. The IAB donor 230 may include a CU 240 and at least one DU 245, where the CU 240 communicates with the core network 225 over an NG interface (e.g., some backhaul link 132). IAB nodes 235 may refer to a RAN node that provides IAB functionality (e.g., access for UEs 115, wireless self-backhauling capabilities, etc.). IAB nodes 235 may include a DU 245 and a mobile terminal (MT) 250. A DU 245 may act as a distributed scheduling node towards child nodes associated with the IAB node 235, and the MT 250 may act as a scheduled node towards parent nodes associated with the IAB node 235. That is, an IAB donor 230 may be referred to as a parent node in communication with one or more child nodes (e.g., an IAB donor may relay transmissions for UEs through one or more other IAB nodes 235). Further, an IAB node 235 may also be referred to as a parent node or a child node to other IAB nodes 235, depending on the relay chain or configuration of the AN. Therefore, the MT interface of IAB nodes (e.g., MTs 250) may provide a Uu interface for a child node to receive signaling from a parent IAB node, and the DU interface (e.g., DUs 245) may provide a Uu interface for a parent node to signal to a child IAB node or UE 115. As discussed in more detail herein, the CU 240 of the IAB donor 230 may schedule one or more IAB nodes 235 via SPI signaling (e.g., over an F1 interface) to DUs 245 of the IAB nodes 235.

For example, IAB node 235-*a* may be referred to a parent node associated with IAB node 235-*b*, and a child node associated with IAB donor 230. The IAB donor may include a CU 240 with a wireline (e.g., optical fiber) or wireless connection to the core network 225, and may act as parent node to IAB nodes 235-*a* and 235-*b*. For example, the DU 245 of IAB donor 230 may relay transmissions to UEs 115 through IAB nodes 235. The CU 240 of IAB donor 230 may signal SPIs via an F1 interface to IAB nodes 235-*a* and 235-*b*, and the IAB nodes 235-*a* and 235-*b* may schedule transmissions (e.g., transmissions to the UEs 115 relayed from the IAB donor 230) through the DUs 245 based on the received SPI. That is, data may be relayed to and from IAB nodes 235-*a* and 235-*b* via signaling over an NR Uu interface (e.g., some communication link 125) to MT 250 of the IABs node 235-*a* and 235-*b*. Communications with IAB node 235-*a* may be scheduled by DU 245 of IAB node 230 based on SPI signaling, and communications with IAB node 235-*b* may be scheduled by DU 245 of IAB Node 235-*a* based on SPI signaling.

In general, wireless communications system 200 and wireless communications system 201 may illustrate example wireless communications systems employing relay chains (e.g., CU-DU architecture) for communications within an AN. A donor base station 105 may include or be connected to a base station CU, and may transmit signals to relay base stations 105 (e.g., DUs, IAB nodes, etc.) on the downlink. The relay base stations 105 may relay these signals to UEs 115 on the downlink. The donor base station 105 or the relay base station 105 may adjust the scheduling of these transmissions according to SPI signaling described below. A relay base station 105 may act as a relay between the donor base station 105 and UE 115 in both transmission directions. The donor base station 105 may refer to the base station containing a base station DU connected to the base station CU. As discussed herein, the donor base station 105 and the relay base stations 105 may implement different aspects and perform different functions relating to SPI signaling. Described SPI based scheduling techniques may mitigate the interference and more efficiently utilize wireless resources within wireless communications systems.

In the following description, SPI based scheduling techniques may be described in terms of actions and processes performed by CUs, DUs, and UEs, but may be implemented by donor base stations 105, relay base stations 105, UEs 115, base stations 210, CUs 215, DUs 220, IAB donors 230, IAB nodes 235, CUs 240, DUs 245, MTs 250, etc. by analogy, without departing from the scope of the present disclosure. That is, a CU may refer to any central entity that controls multiple scheduling nodes in the network. A CU may be associated with L3 signaling and functionality within the network. In the context of wireless communications system 201, a CU may refer to the CU functionality at an IAB donor 230 that controls DUs 245 of IAB nodes 235-*a* and 235-*b*, as well as its own DU. A DU may refer to any node that performs scheduling functions in a network, and may be associated with L1 and L2 signaling and functionality within the network. In the context of wireless communications system 201, a DU may refer to the DU 245 functionality at an IAB node 235 or an IAB donor 230, which schedules UEs 115 and MTs 250 under its coverage. A UE may refer to a scheduled node in a network. In the context of wireless communications system 201, a UE may refer to a UE 115 for the access link and/or a MT 250 functionality at an IAB node 235.

A SPI may specify a pattern or configuration of scheduling states over a period of N time units. A scheduling state may refer to the status of any scheduling associated with the network, or a resource within the network, for a given time unit. For example, possible scheduling states may include a scheduling information state (e.g., a scheduled state), a flexible state, and/or a NULL state. A scheduling information state may take various formats depending on the scheduling information indicated by the scheduling information state (e.g., a scheduling information state may indicate what is scheduled during a given time unit, such as one or more UEs, beams, locations, etc.). For example, a scheduling information state may indicate a set of UE indices, a set or range of beam indices, a set or range of relative or absolute angular values, a set or range of relative or absolute location values, etc., for scheduling (e.g., for scheduling data transmission for different UEs). A scheduling information state may further indicate or include additional information associated with the scheduling, such as allocated resource blocks (RBs), buffer status (e.g., buffer status reports (BSRs)), priority of communications or traffic types, modulation and coding schemes (MCSs), signal to noise ratio (SNR), target signal-to-interference noise ratio (SINR), target transmit or receive power (e.g., target total radiated power (TRP)), etc.

A flexible state may indicate any UE or beam direction may be scheduled for the given time unit (e.g., a flexible state may indicate that the scheduling node (e.g., a the DU) is allowed to schedule any UE or beam direction during the time unit associated with the flexible state). In some cases, a flexible state may be defined (e.g., by the central node via SPI) as a hard state or a soft state. A hard state may indicate communications may be scheduled, and may be fully controllable, by the scheduling node. A soft state may indicate a link from the scheduling node to child node may be dynamically controlled by the scheduling node (e.g., a parent node may permit a child node to use a soft state, but the communications may default as unavailable unless otherwise permitted by the parent node). A NULL state (e.g., a not available state) may indicate no communications are scheduled, or no communications are to be scheduled (e.g., the DU is restricted from scheduling all communications), during the time unit. For example, a NULL state may indicate the scheduling node (e.g., the DU) is prevented from scheduling all or any UEs, beam directions, etc. (e.g., a NULL state may indicate that no resources are available for the scheduling node).

For example, for scheduling of a DU child link (e.g., a link between a scheduling node and its child node), there may be three flavors (e.g., three different classes of availability or criteria for usage). For example, communications or resources of the DU child link may be configured as either hard (e.g., child node controlled), soft (e.g., parent node controlled), or not available (e.g., SPI information may coordinate scheduling via distribution of scheduling states such as scheduling information states, flexible states, hard states, soft states, NULL or not available states, etc.). A hard resource configuration may result in the corresponding time resource always being available for the DU child link. A soft resource configuration may result in the availability of the corresponding time resource for the DU child link being explicitly and/or implicitly controlled by the parent node. As such a DU may be configured with, for example, the following resource types: hard downlink, hard uplink, hard flexible, not available (N.A.), soft downlink, soft uplink, and soft flexible. In some cases, a soft resource (e.g., soft downlink, soft uplink, or soft flexible resource) may initially be unavailable for a DU's child link, and may be converted to a hard resource (e.g., hard downlink, hard uplink, or hard flexible resource) by a parent node (e.g., either explicitly or implicitly).

A time unit in a SPI (e.g., the time units of a SPI pattern or configuration) may refer to one or multiple slots or mini-slots. Further, the scheduling plan indicated by an SPI may be applicable to different types of scheduling. For example, an SPI may indicate scheduling of data transmissions for different DUs, different UEs, etc. In another example, an SPI may indicate scheduling of beam patterns for some procedure such as a synchronization procedure, a beam management procedure, an inter-relay discover procedure, a random access channel procedure (RACH), etc. That is, a SPI may additionally be used, in some cases, to indicate scheduling or coordination of beam patterns (e.g., in systems supporting mmW communications), as described in more detail with reference to FIG. 3.

SPIs may be associated with overriding rules (e.g., SPI priority criteria), for conflict resolution in scenarios where multiple SPIs targeting the same node or resource are received. Multiple different SPI types may be defined and may be associated with different priority, the manner in which SPI is received may establish priority relative to other received SPI, etc. For example, for SPIs defined over Uu air interface, a SPI type may be defined for semi-static configuration over relatively large time scales, and another SPI type may be defined for dynamic configuration over a relatively small time scale. An overriding rule (e.g., or priority criteria) may establish that SPI for dynamic configuration overrides or takes precedent over SPI for semi-static configuration. In other examples, there may be priority inherent in the manner in which the SPI is received. For example, in an IAB network (e.g., wireless communications system 201), an IAB node 235 may receive a SPI from its parent node (e.g., IAB node 235-b may receive SPI from IAB node 235-a) over a Uu interface, and may also receive a SPI from CU 240 over a F1-AP interface. In such cases, overriding rules (e.g., or priority criteria) may establish SPI received over Uu interface overrides SPI received over F1-AP interface (e.g., or vice versa).

SPIs may be defined and signaled over different interfaces. For example, SPI may be signaled over an interface between a CU and a DU (e.g., an SPI signaling message may be defined for SPI over F1-AP). Such F1-AP signaling of SPIs may be used during centralized scheduling coordination of DUs by a CU (e.g., applicable for AN, IAB network with architecture group1), as well as during distributed scheduling coordination amongst DUs (e.g., as described with reference to FIGS. 5-8). SPI may also be signaled over an interface between CUs (e.g., over an Xn-C interface), or between a CU and the core network (e.g., over an NG interface). Such Xn-C and/or NG signaling of SPIs may be used during inter-CU scheduling coordination (e.g., as described in more detail with reference to FIGS. 7-8). Additionally, SPI may be signaled over an air interface between a base station and UEs or between a base station and MTs (e.g., over an Uu interface). Such Uu signaling of SPIs may be used for direct scheduling coordination between parent-child nodes in IAB networks, for UE power savings, etc. In some examples, SPIs may be included in RRC signaling, F1-AP communications, group-common PDCCH (GC-PDCCH) signaling, or some combination thereof. As described above, the base stations 105 may be examples of full gNBs, access nodes, eNBs, or some combination thereof, while the base station CU may be an example of a gNB-CU, a gNB, or a control function.

Figure 3:
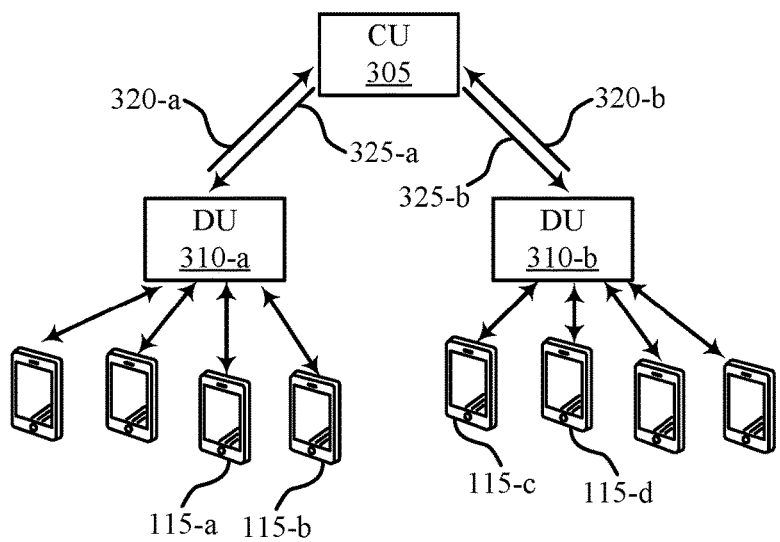
FIG. 3 illustrates an example of a centralized coordination scheme that supports SPIs in accordance with aspects of the present disclosure.
Figure 3:
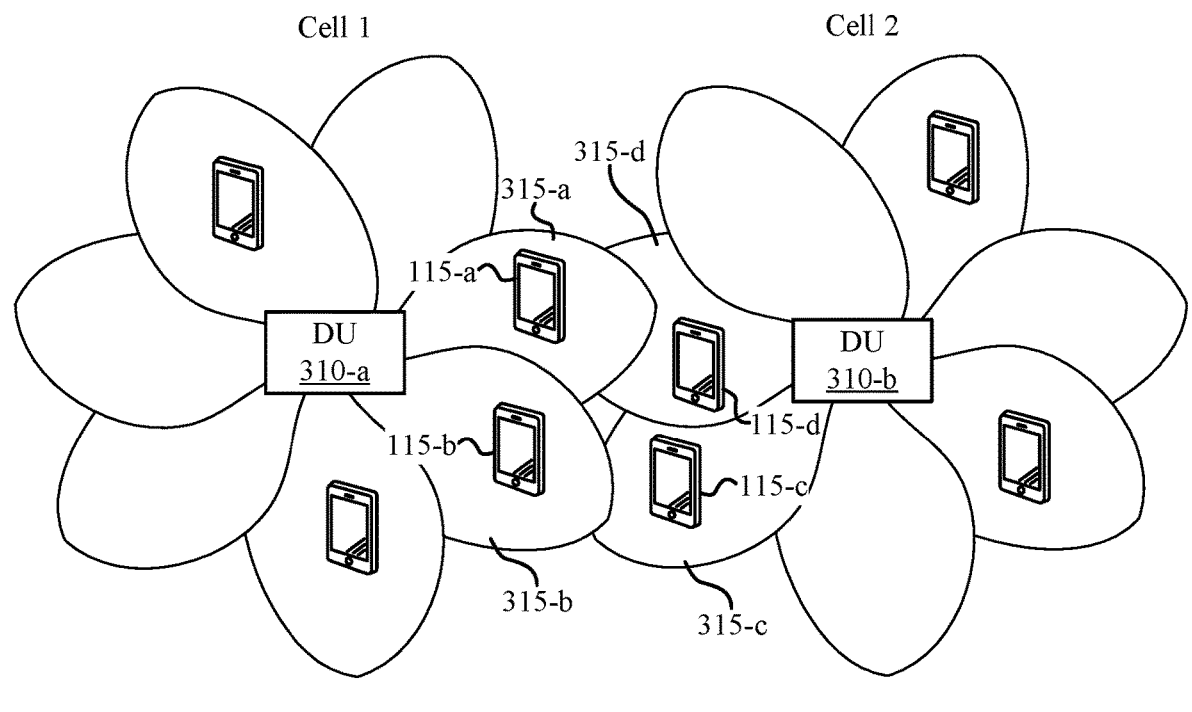

FIG. 3 illustrates an example of a centralized coordination scheme 300 that supports SPIs in accordance with aspects of the present disclosure. In some examples, centralized coordination scheme 300 may be implemented by the wireless communications system 100, the wireless communications system 200, and/or the wireless communications system 201 described with respect to FIGS. 1 and 2. The centralized coordination scheme 300 may include a CU 305 (e.g., a donor base station), DUs 310-a and 310-b (e.g., relay base stations), and at least UEs 115-a, 115-b, 115-c, and 115-d, which may be examples of the corresponding devices described with reference to FIGS. 1, 2A and 2B. Centralized coordination scheme 300 may utilize F1 or F1-AP signaling (e.g., signaling over a F1 or F1-AP interface) to convey SPIs (e.g., tentative SPIs 320 and updated SPIs 325) between CU 305 and DUs 310-a and 310-b.

As discussed above, SPIs may be used to coordinate or configure beam sweeping patterns for neighboring cells controlled by DUs 310. In wireless communications systems utilizing beamforming techniques (e.g., mmW systems), a base station (e.g., a DU 310) may transmit information for cell acquisition and synchronization (e.g., reference signals, synchronization signals, etc.) in a beam sweeping pattern in order to provide adequate information to all UEs within a coverage area of the base station. For example, a DU 310 may beamsweep a set of synchronization signal blocks (SSBs) (e.g., which may include a primary synchronization signal (PSS), secondary synchronization signal (SSS), physical broadcast channel (PBCH), etc.). Each cell (e.g., DU 310) may broadcast a SSB in a beam sweeping fashion. UEs (e.g., UEs 115-a, 115-b, 115-c, and 115-d) may monitor for SSBs transmitted via beams 315 for RRM measurements (e.g., UE 115-a may identify a neighbor cell based on beam 315-d transmitted by DU 310-b).

In some cases, transmissions associated from the neighboring cells may interfere with each other (e.g., beam sweeping patterns utilized during cell synchronization procedures may interfere, beamformed transmissions to UEs may interfere, etc.), resulting in decreased system performance. For example, two cells may be controlled by different DUs 310 (e.g., Cell 1 may be controlled by DU 310-*a* and Cell 2 may be controlled by DU 310-*b*). DU 310-*a* may transmit to UE 115-*a* using a beam 315-*a*, which in some cases (e.g., without SPI coordination) may interfere with DU 310-*b* transmission to UE 115-*d* using beam 315-*d*. Similarly, DU 310-*a* may transmit to UE 115-*b* using a beam 315-*b*, which in some cases (e.g., without SPI coordination) may interfere with DU 310-*b* transmission to UE 115-*c* using beam 315-*c*. Additionally or alternatively, transmissions from UEs 115-*a*, 115-*b*, 115-*c*, and 115-*d* may interfere with each other (e.g., due to their proximity, due to time and frequency resources used by the UEs, etc.).

As discussed herein, CU 305 may control both DUs 310-*a* and 310-*b*, and may coordinate UE 115 scheduling, beam patterns, beamformed transmissions between neighbor cells, etc. using SPIs. SPIs may be used to coordinate beam sweeping patterns, schedule communications for UEs 115, etc. For example, DU 310-*a* may signal a tentative SPI 320-*a* to CU 305, and DU 310-*b* may signal a tentative SPI 320-*b* to the CU 305. The CU 305 may receive tentative SPIs 320-*a* and 320-*b*, and transmit updated SPIs 325-*a* and 325-*b* to DUs 310-*a* and 310-*b*. For example, the CU 305 may, in some cases, determine an interference profile (e.g., based on analysis of the received tentative SPIs 320-*a* and 320-*b*, of measurement reports received from any of UEs 115-*a*, 115-*b*, 115-*c*, and 115-*d*, etc.) and add to or adjust information associated with the received tentative SPIs 320-*a* and 320-*b* (e.g., update the received tentative SPIs 320-*a* and 320-*b*). The updated SPIs 325-*a* and 325-*b* may thus coordinate any beamformed transmissions to UEs 115 within the network. Additionally, the updated SPIs 325-*a* and 325-*b* may coordinate any beam sweeping patterns for beam sweeping procedures associated with Cell 1 and Cell 2.

Figure 4:
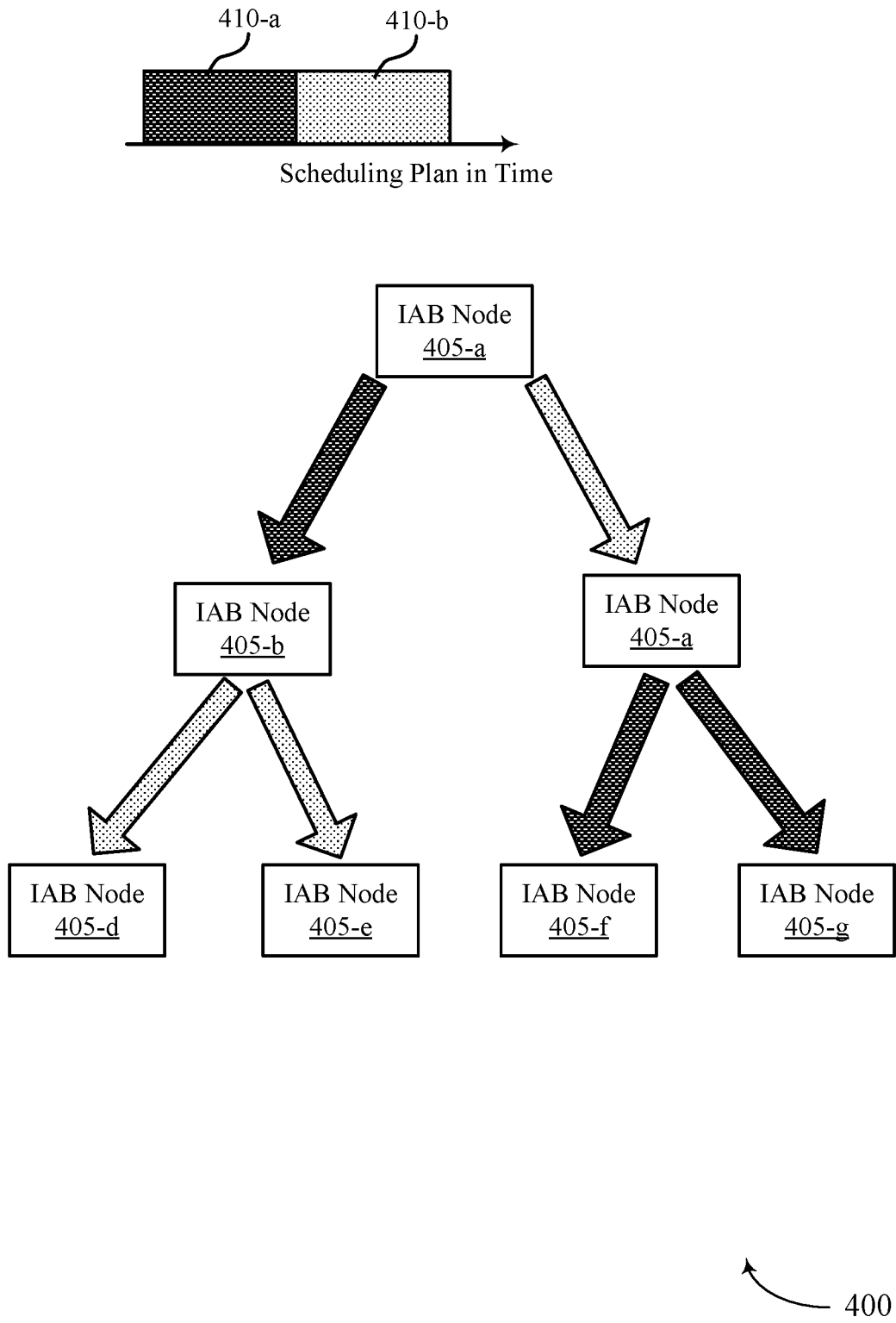
FIG. 4 illustrates an example of a scheduling diagram that supports SPIs in accordance with aspects of the present disclosure.

FIG. 4 illustrates an example of a SPI scheduling diagram 400 that supports SPIs in accordance with aspects of the present disclosure. Aspects of SPI scheduling diagram 400 may be implemented by the wireless communications system 100, the wireless communications system 200, the wireless communications system 201, and/or the centralized coordination scheme 300 described with respect to FIGS. 1-3. The SPI scheduling diagram 400 may include IAB nodes 405, which may be examples of the corresponding devices described with reference to FIG. 2B. SPI scheduling diagram 400 may illustrate how resources 410 (e.g., UE 115 indices, beam indices, beam sweeping patterns, sets of angular values, sets of location values, etc.) may be scheduled by IAB nodes 405.

As discussed above, SPI may be signaled over the Uu air interface in IAB networks for scheduling coordination (e.g., SPI scheduling diagram 400 may implement Uu signaling between IAB nodes 405 to convey SPI for resource scheduling). Each IAB node 405 may be both a scheduling node (e.g., a DU) to its child nodes and a scheduled node (e.g., a MT) to its parent node. A parent node of an IAB node 405 may include either another IAB node 405 or an IAB donor. A child node of an IAB node 405 may include either another IAB node 405 or a UE 115. An IAB node may send out its SPI to its child nodes using a Uu air interface, such that the child IAB nodes may avoid scheduling conflicts (e.g., interference) from half duplex constraints. For example, for a given time unit (e.g., a time unit associated with an SPI pattern), if an IAB node 405 is not scheduled by its parent IAB node, the IAB node may use the time unit to communicate with its own child nodes. A child IAB node may determine the resources 410 used over its own child nodes based on the received SPI. That is, based on the SPI received from a parent node, an IAB node 405 may know which resources 410 to use for the IAB node 405's child nodes. For example, IAB node 405-*b* may receive SPI associated with resources 410-*a* from IAB node 405-*a* (e.g., a parent node), and may use resources 410-*b* for SPI sent to IAB nodes 405-*d* and 405-*e* (e.g., child nodes). In some examples, based on received SPI, parent nodes (e.g., DUs) may identify UEs, beam directions, or other resources as interfering. The parent node may therefore assign the interfering UEs, beam directions, etc. to different time units or different non-overlapping resource block allocations (e.g., different resources 410).

Figure 5:
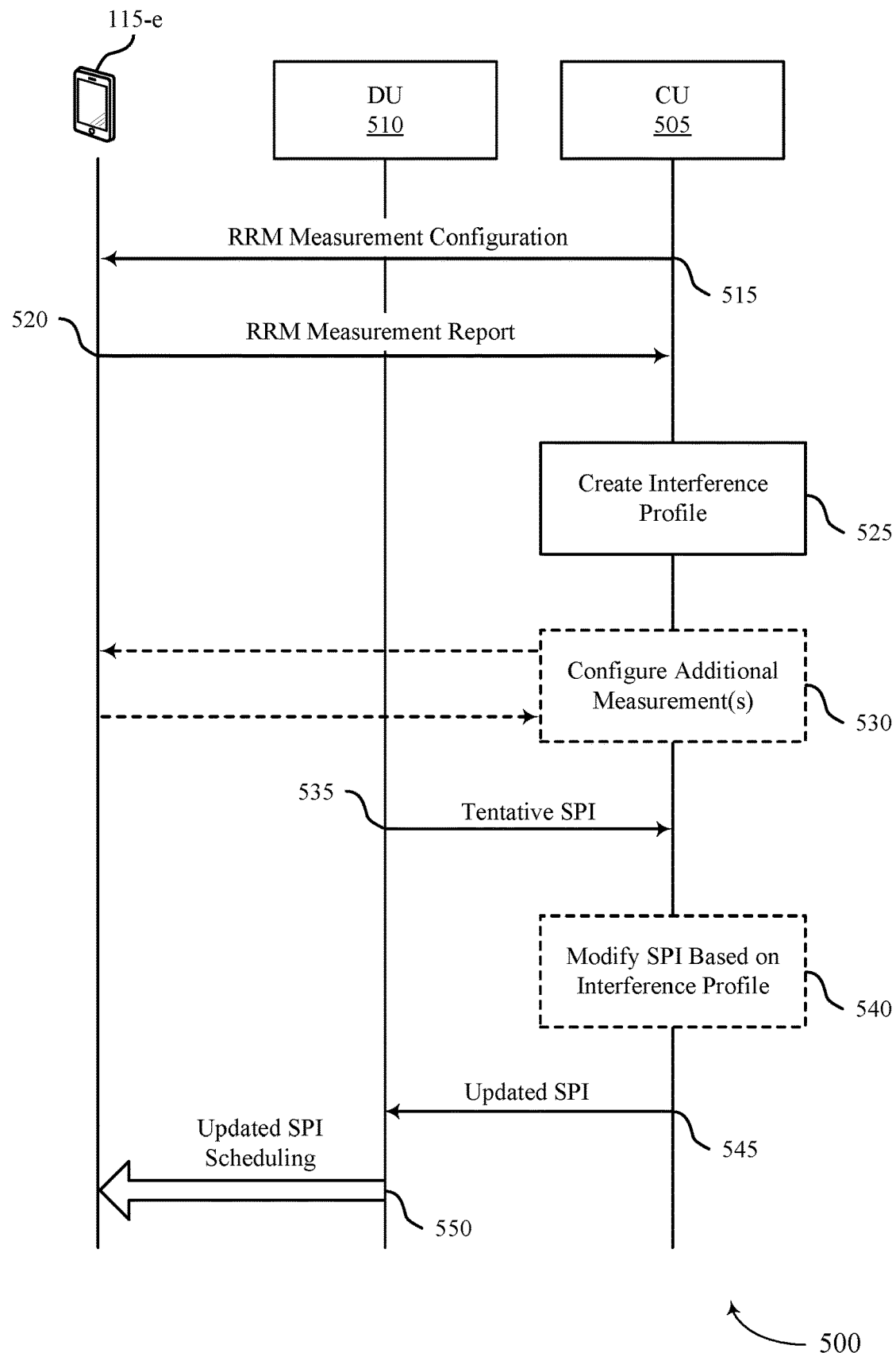
FIG. 5 illustrates an example of a process flow that supports SPIs in accordance with aspects of the present disclosure.

FIG. 5 illustrates an example of a process flow 500 that supports SPIs in accordance with aspects of the present disclosure. In some examples, process flow 500 may implement aspects of wireless communications system 100, wireless communications system 200, and/or wireless communications systems 201. Process flow 500 may include UE 115-*e*, CU 505, and DU 510, which may be examples of the corresponding devices as described with reference to FIGS. 1 through 4. In some cases, CU 505 and DU 510 may be located in the same device (e.g., a donor base station or a donor IAB may include CU 505 and DU 510). In other cases, the CU 505 and DU 510 may be separately located (e.g., CU 505 may be located in a IAB donor and DU 510 may be located in an IAB node, such as some child node associated with the IAB donor that includes the CU 505), and may form an F1 association (e.g., an L3 signaling channel). In some examples, the CU 505 may be a component of a database, data center, or cloud network. Process flow 500 may illustrate centralized intra-AN scheduling coordination using SPI signaling over F1-AP interface. In the following description of the process flow 500, the operations between the UE 115-*e*, the CU 505, and the DU 510 may be transmitted in a different order than the exemplary order shown, or the operations performed by UE 115-*e*, CU 505, and DU 510 may be performed in different orders or at different times. In some cases, certain operations may also be left out of the process flow 500, or other operations may be added to the process flow 500.

At 515, CU 505 may configure UE 115-*e* to transmit a radio resource management (RRM) measurement report. An RRM procedure may provide a mechanism for a UE (e.g., UE 115-*e*) to report reference signal beam indices and measurement quantities (e.g., reference signal received power (RSRP), reference signal received quality (RSRQ), signal-to-interference noise ratio (SINR), etc.) from its serving cell, as well as from neighbor cells that the UE can detect. In some cases, the reference signal beam index may include a SSB index or a channel state information reference signal (CSI-RS) index, that may be indicated in the RRM configuration and/or the RRM measurement report.

At 520, UE 115-*e* may transmit the RRM measurement report to the CU 505. For example, the UE 115-*e* may receive downlink reference signals from the serving cell and from neighbor cells. The UE 115-*e* may measure (e.g., detect) the quality of the beam and report the measurement information to the CU (e.g., the RRC layer of the base station). The RRM measurement report may include a beam index and a measurement quantity for a serving cell and neighbor cells. For example, the RRM measurement report may include results of SSB measurements, CSI-RS measurements, beam indices, physical cell IDs, etc. associated with serving and neighbor cells (e.g., according to the configuration received at 515). In some cases, the RRM measurement report may be transmitted to DU 510, and relayed from DU 510 to CU 505 (e.g., the UE 115-*e* may transmit an RRM measurement report to DU 510 using Uu signaling, and the DU 510 may pass or relay the RRM measurement report to CU 505 using F1-AP signaling).

At 525, CU 505 may determine an interference profile based at least in part on the RRM measurement report received at 520. For example, the CU 505 may identify pairs of interfering UEs and/or beams among neighbor cells. A second UE (e.g., some UE other than UE 115-*e*) may be identified as interfering with UE 115-*e* if the serving beam associated with the second UE is one of UE 115-*e*'s interference beams or neighbor beams. Identification of interfering beams may be based on history of RRM reports provided by groups of UEs (e.g., groups of UEs within the network). The interference profile may include a profile of interfering UEs, interfering beams, etc.

For example, in some cases, CU 505 may receive at least one measurement report in addition to the measurement report received at 520 (e.g., at least one additional measurement report for at least one additional UE). The additional measurement report may be received from DU 510, or may be received from some other DU controlled by the CU 505. The CU 505 may determine an interference profile based at least in part on the measurement report received at 520 and the at least one additional measurement report (e.g., the CU 505 may use the multiple measurement reports to identify interfering UEs, interfering beams, etc.). In some cases, the CU 505 may signal the interference profile to the DU 510. In such cases, the DU 510 may identify UEs, beam directions, etc., as interfering based on the received interference profile. The DU 510 may therefore assign the interfering UEs, beam directions, etc. to different time units or different non-overlapping resource block allocations (e.g., as described with reference to resources 410-*a* and 410-*b*, as discussed in FIG. 4).

In some cases, at 530, CU 505 may configure additional measurements for more accurate interference estimations. For example, CU 505 may transmit configuration information to UE 115-*e* for the UE 115-*e* to use to perform additional measurements of one or more cells. The UE 115-*e* may transmit at least one additional measurement report based on the received configuration information. In some cases, CU 505 may modify or adjust the interference profile determined at 525 based on the additional configured RRM measurements.

At 535, DU 510 may signal a tentative SPI to CU 505 (e.g., via F1-AP signaling). In some cases, the DU 510 may determine the tentative SPI based on L1/L2 reports (e.g., channel state information (CSI) reports, buffer status reports, etc.) from UEs within the respective cell of the DU 510. The extent of the tentative SPI may depend on the functional partition between the CU 505 and the DU 510 (e.g., DU 510 may take more or less responsibility of scheduling decisions of its own cell). For example, in some implementations, DU 510 may take on a relatively larger role (e.g., more responsibility) in scheduling decisions of its own cell by including more scheduling information (e.g., scheduling information states) in the tentative SPI signaled to the CU 505. The CU 505 may then adjust the scheduling information indicated in the received tentative SPI to control inter-cell interference. In other examples, the DU 510 may take on a relatively smaller role (e.g., less responsibility) in scheduling decisions of its own cell by including more flexible states in the tentative SPI (e.g., marking some or all time units in the SPI pattern as flexible), such that the CU 505 may take on some or all of the scheduling decisions. That is, a DU 510 may have more or less control over scheduling decisions based on what the DU 510 includes (e.g., what states the DU sets for some set of time units) in tentative SPI transmitted to the CU 505. In yet other examples, no tentative SPI may be transmitted by the DU 510. In such cases, the CU 505 may completely determine the SPI without DU input, and may have full control and authority over scheduling for each DU 510.

At 540, CU 505 may modify the received scheduling plan (e.g., the received tentative SPI) based on an interference profile (e.g., determined at 525) to reduce or control interference. For example, interfering UEs or beam directions from neighbor DUs may be put into different time units or with non-overlapping RB allocation when scheduled in a same time unit (e.g., the SPI pattern may be modified or updated such that interfering UEs/beam directions may be separated in time and/or frequency). The SPI may be determined for the scheduling node (e.g., for DU 510) based on the measurement report received from the scheduling node.

For example, at 540, CU 505 may identify a SPI for a scheduling node (e.g., DU 510). The SPI may specify a pattern of scheduling states over a period of time. The SPI may be based on the measurement report received at 520. In some cases, the pattern of scheduling states may include a scheduling information state, a flexible state, or a NULL state. A flexible state may allow the scheduling node to schedule any UE, any beam direction, etc. In some cases, a flexible state may be defined (e.g., by the central node via SPI) as a hard state or a soft state. A hard state may indicate communications may be scheduled, and may be fully controllable, by the scheduling node. A soft state may indicate a link from the scheduling node to child node may be dynamically controlled by the scheduling node (e.g., a parent node may permit a child node to use a soft state, but the communications may default as unavailable unless otherwise permitted by the parent node). A NULL state (e.g., a not available state) may prevent the scheduling node from scheduling all UEs, all beam directions, etc. (e.g., a NULL state may indicate that no resources are available for the scheduling node).

In some cases, the period of time associated with the SPI pattern may refer to one or more slots or mini-slots. In some cases, the SPI may identify values (e.g., a set of UE indices, a set of beam indices, a set of angular values, a set of location values, etc.) for scheduling for a scheduling state. The SPI may schedule, for a scheduling state, data transmissions for different UEs, different beam patterns (e.g., for cell beamforming related procedures), etc. Additionally or alternatively, the SPI may identify, for a scheduling state, allocated RBs, buffer status, scheduling priority, types of communications, MCSs, target SINR, target transmit power, target receive power, etc.

At 545, CU 505 may signal updated SPI to DU 510 (e.g., via F1-AP signaling). In some cases, the updated SPI may be transmitted on a GC-PDCCH, a RRC message, etc.

At 550, the DU 510 may schedule UE 115-*e* (e.g., with communication resources) according to the updated SPI received at 545 (e.g., the DU 510 may schedule UE 115-*e*, or in some cases may coordinate some beamforming procedure, in compliance with the received SPI).

In some cases, DU 510 may refer to a DU of an IAB network (e.g., wireless communications system 201). In some cases, the IAB network may include the CU 505 that may control multiple DUs (e.g., and the multiple DUs may include at least DU 510). The SPI (e.g., the updated SPI at 545) may be used for inter-DU coordination via the CU 505 of the IAB network.

Figure 6:
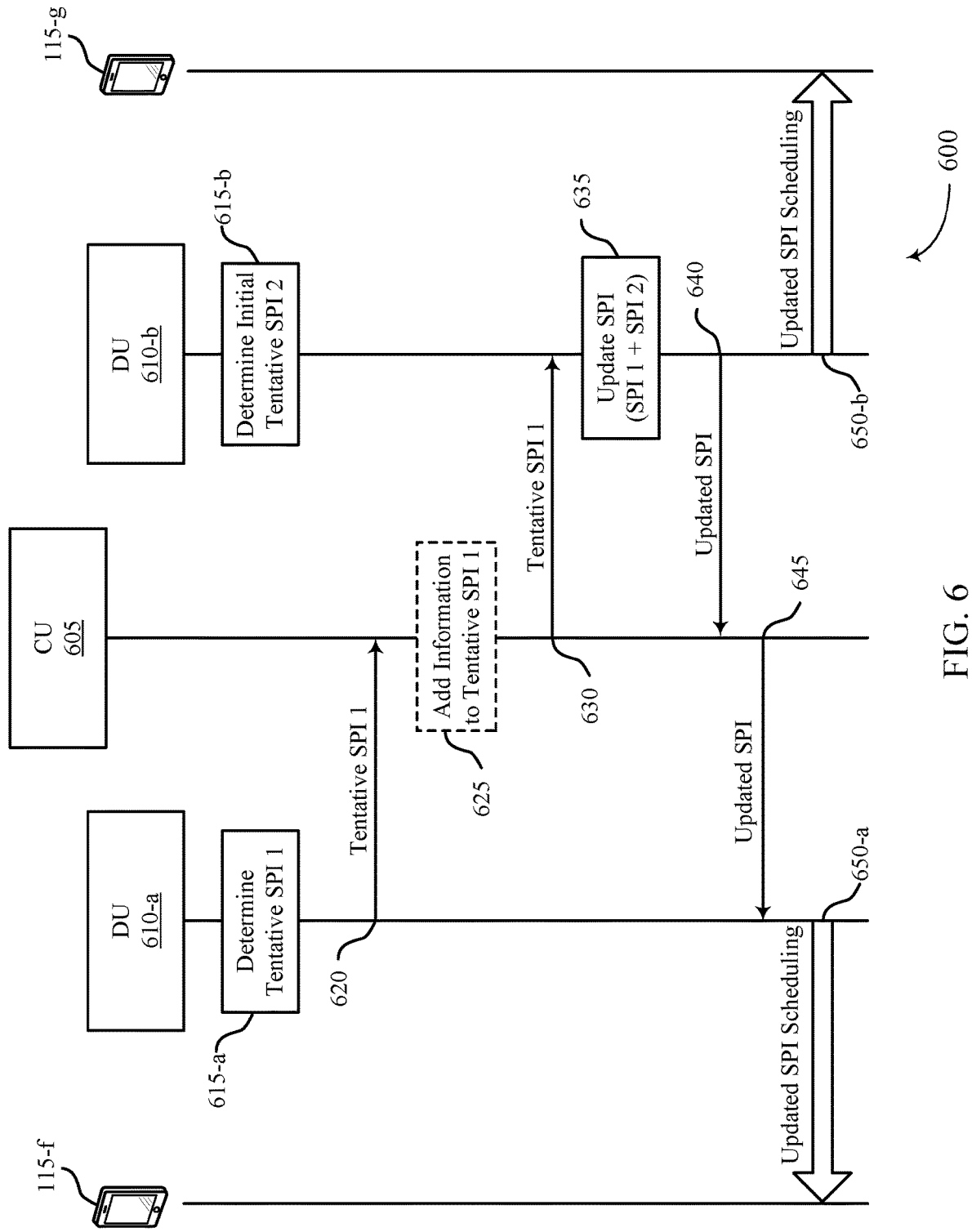
FIG. 6 illustrates an example of a process flow that supports SPIs in accordance with aspects of the present disclosure.

FIG. 6 illustrates an example of a process flow 600 that supports SPIs in accordance with aspects of the present disclosure. In some examples, process flow 600 may implement aspects of wireless communications system 100, wireless communications system 200, and/or wireless communications systems 201. Process flow 600 may include UE 115-*f*, UE 115-*g*, CU 605, DU 610-*a*, and DU 610-*b*, which may be examples of the corresponding devices as described with reference to FIGS. 1 through 4. In some cases, CU 605 and DUs 610-*a* and 610-*b* may be located in the same device (e.g., a donor base station or a donor IAB may include CU 605 and DUs 610-*a* and 610-*b*). In other cases, the CU 605 and DUs 610-*a* and 610-*b* may be separately located (e.g., CU 605 may be located in a IAB donor and DUs 610-*a* and 610-*b* may be located in separate IAB nodes, such as some child nodes associated with the IAB donor that includes the CU 605), and may form an F1 association (e.g., an L3 signaling channel). In some examples, the CU 605 may be a component of a database, data center, or cloud network. Process flow 600 may illustrate a distributed intra-AN coordination scheme amongst DUs 610-*a* and 610-*b* using SPI signaling over a Uu interface. In the following description of the process flow 600, the operations between the UE 115-*f*, the UE 115-*g*, the CU 605, the DU 610-*a*, and the DU 610-*b* may be transmitted in a different order than the exemplary order shown, or the operations performed by UE 115-*f*, UE 115-*g*, CU 605, DU 610-*a*, and DU 610-*b* may be performed in different orders or at different times. In some cases, certain operations may also be left out of the process flow 600, or other operations may be added to the process flow 600.

At 615, DUs 610-*a* and 610-*b* may determine tentative SPI (e.g., DU 610-*a* may determine a tentative SPI 1 and DU 610-*b* may determine a tentative SPI 2). For example, DUs 610-*a* and 610-*b* may determine tentative SPI based on their respective cells (e.g., based on L1/L2 reports, such as CSI reports, BSRs, etc., from UEs within their respective cells). In some cases, tentative SPIs may include scheduling information further dependent on the DU dependent functionality (e.g., whether the tentative SPI includes scheduling information states, flexible states, hard states, soft states, or NULL states, may in some cases depend on the functionality or priority of the DU). For example, in some cases, DU 610-*a* may be associated with high priority, and may be associated with increased scheduling functionality/priority relative to DU 610-*b*. In such cases, tentative SPI associated with DU 610-*a* may include scheduling information states, whereas tentative SPI associated with DU 610-*b* may include flexible states or soft states (e.g., such that DU 610-*b* may routinely defer to, or rely on, DU 610-*a* for SPI/scheduling coordination). In some cases, 615-*a* and 615-*b* may be performed in parallel (e.g., at least partially overlapping in time), in other cases, 615-*a* and 615-*b* may be performed independently and at different times.

At 620, DU 610-*a* may signal tentative SPI 1 (e.g., determined at 615-*a*) to CU 605.

At 625, CU 605 may, in some cases, add information to the tentative SPI. For example, in some cases the CU 605 may determine an interference profile (e.g., as discussed above with reference to 525). In such cases, the CU 605 may receive the tentative SPI 1 at 620, and may modify, or add information to, the SPI based on the interference profile. In other examples, the CU 605 may not alter the tentative SPI 1, and may simply pass or forward the tentative SPI 1 to DU 610-*b*.

At 630, CU 605 may pass or forward the tentative SPI 1 (e.g., updated or unaltered) to DU 610-*b*.

At 635, DU 610-*b* may update SPI based on the tentative SPI 2 determined at 615-*b* and the tentative SPI 1 received at 630. For example, the SPI may be updated based on considering the scheduling states included in both tentative SPI 1 and tentative SPI 2 (e.g., an updated SPI may be determined based on considering and coordinating, for each time unit, scheduling information states, flexible states, and NULL states in the tentative SPI 1 and tentative SPI 2 patterns).

At 640, DU 610-*b* may pass or forward the updated SPI to CU 605. At 645, CU 605 may pass or forward the updated SPI to DU 610-*a*. At 650-*a* and 650-*b*, DUs 610-*a* and 610-*b* may schedule one or more UEs in their respective cells based at least in part on the updated SPI. As alluded to above, in some cases, 650-*a* and 650-*b* may be performed in parallel (e.g., at least partially overlapping in time), in other cases, 650-*a* and 650-*b* may be performed independently and at different times.

Figure 7:
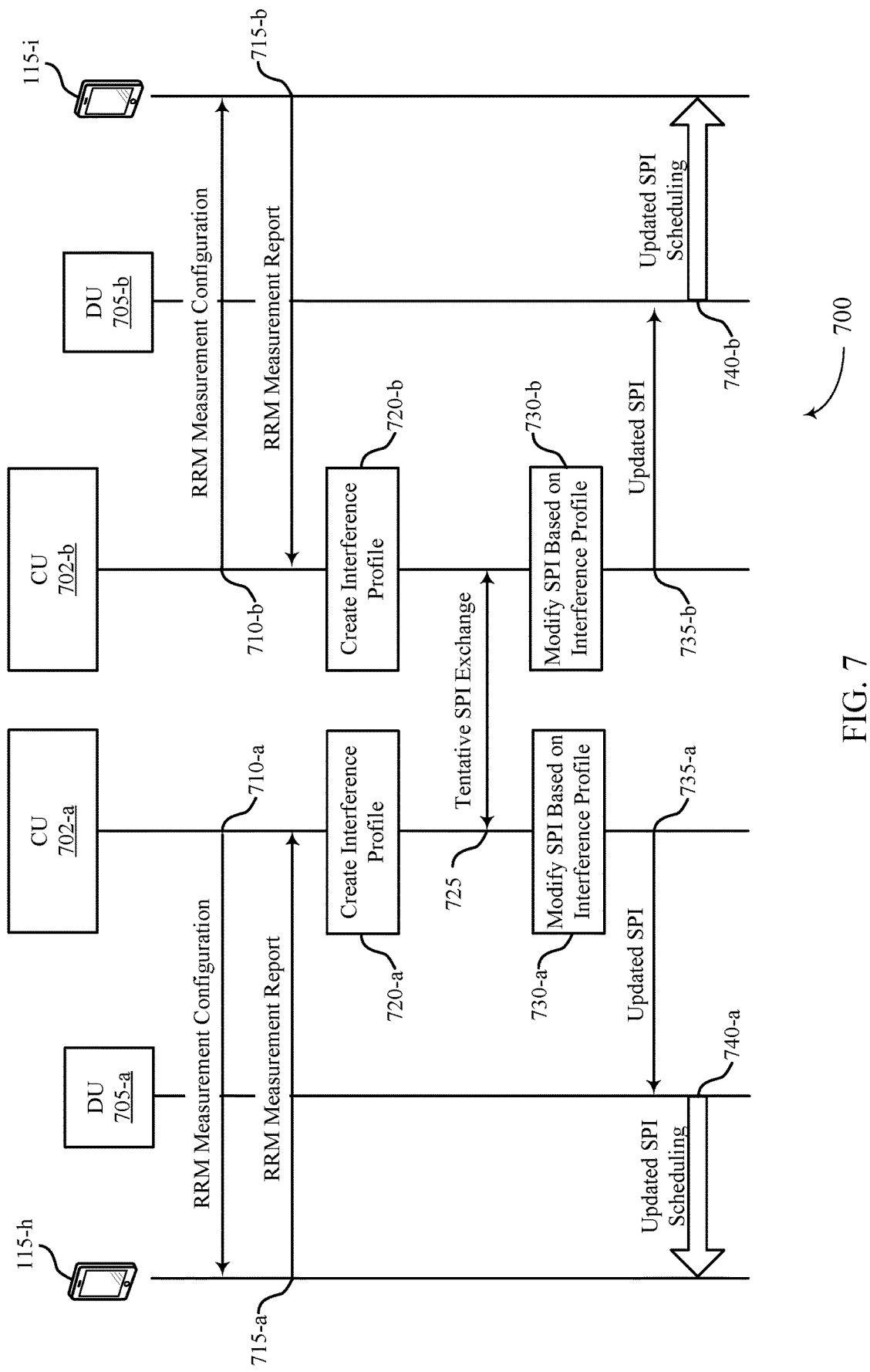
FIG. 7 illustrates an example of a process flow that supports SPIs in accordance with aspects of the present disclosure.

FIG. 7 illustrates an example of a process flow 700 that supports SPIs in accordance with aspects of the present disclosure. In some examples, process flow 700 may implement aspects of wireless communications system 100, wireless communications system 200, and/or wireless communications systems 201. Process flow 700 may include UE 115-*h*, UE 115-*i*, CU 702-*a*, CU 702-*b*, DU 705-*a* and DU 705-*b*, which may be examples of the corresponding devices as described with reference to FIGS. 1 through 4. In some cases, a CU and DU (e.g., and CU 702-*a* and DU 705-*a*) may be located in the same device (e.g., a donor base station or a donor IAB may include CU 702-*a* and DU 705-*a*). In other cases, the CU and DU may be separately located (e.g., CU 702-*a* may be located in a IAB donor and DU 705-*a* may be located in an IAB node, such as some child node associated with the IAB donor that includes the CU 702-*a*), and may form an F1 association (e.g., an L3 signaling channel). In some examples, the CUs 702-*a* and 702-*b* may be a component of a database, data center, or cloud network. Process flow 700 may illustrate distributed inter-AN scheduling coordination using SPI signaling over Xn-C interface. In the following description of the process flow 700, the operations between UE 115-*h*, UE 115-*i*, CU 702-*a*, CU 702-*b*, DU 705-*a* and DU 705-*b* may be transmitted in a different order than the exemplary order shown, or the operations performed by UE 115-*h*, UE 115-*i*, CU 702-*a*, CU 702-*b*, DU 705-*a* and DU 705-*b* may be performed in different orders or at different times. In some cases, certain operations may also be left out of the process flow 700, or other operations may be added to the process flow 700.

At 710-*a* and 710-*b*, CUs 702-*a* and 702-*b* may configure UEs 115-*h* and 115-*i* to transmit RRM measurement reports. In some cases, 710-*a* and 710-*b* may be performed in parallel (e.g., at least partially overlapping in time), in other cases, 710-*a* and 710-*b* may be performed independently and at different times.

At 715-*a* and 715-*b*, UEs 115-*h* and 115-*i* may transmit RRM measurement reports to CUs 702-*a* and 702-*b*. For example, the UEs 115-*h* and 115-*i* may receive downlink reference signals from the serving cell and from neighbor cells. The UEs 115-*h* and 115-*i* may measure (e.g., detect) the quality of the beam and report the measurement information to the CU (e.g., the RRC layer of the base station). The RRM measurement reports may include beam indices and measurement quantities for serving cells and neighbor cells. For example, the RRM measurement reports may include results of SSB measurements, CSI-RS measurements, beam indices, physical cell IDs, etc. associated with serving and neighbor cells (e.g., according to the respective configurations received by 115-*h* and 115-*i* at 710-*a* and 710-*b*). In some cases, the RRM measurement reports may be transmitted to DUs 705-*a* and 705-*b*, and may be respectively relayed from DUs 705-*a* and 705-*b* to CUs 702-*a* and 702-*b* (e.g., the UE 115-*h* may transmit an RRM measurement report to DU 705-*a* using Uu signaling, and the DU 705-*a* may pass or relay the RRM measurement report to CU 702-*a* using F1-AP signaling). In some cases, 715-*a* and 715-*b* may be performed in parallel (e.g., at least partially overlapping in time), in other cases, 715-*a* and 715-*b* may be performed independently and at different times.

At 720-*a* and 720-*b*, CUs 702-*a* and 702-*b* may create or determine interference profiles based at least in part on the RRM measurement reports received at 715-*a* and 715-*b*. For example, the CUs 702-*a* and 702-*b* may each identify pairs of interfering UEs and/or beams among neighbor cells associated with their respective ANs. The interference profiles may include a profile of interfering UEs, interfering beams, etc. In some cases, 720-*a* and 720-*b* may be performed in parallel (e.g., at least partially overlapping in time), in other cases, 720-*a* and 720-*b* may be performed independently and at different times.

At 725, CUs 702-*a* and 702-*b* may exchange tentative SPIs. For example, each of CU 702-*a* and CU 702-*b* may determine a tentative SPI based on one or more measurement reports received. The CUs 702-*a* and 702-*b* may exchange such tentative SPIs for distributed inter-AN scheduling coordination. In some examples, inter-AN scheduling coordination may resemble aspects of distributed intra-AN scheduling coordination techniques performed by DUs, as discussed with reference to 615 of FIG. 615 (e.g., in some cases, CUs may be associated with different priority, which may affect determination and contents of tentative SPI exchanged at 725). For example, tentative SPIs may include scheduling information further dependent on the ANs or CUs priority (e.g., whether the tentative SPI includes scheduling information states, flexible states, hard states, soft states, or NULL states, may in some cases depend on the priority associated with the CU). For example, in some cases, CU 702-*a* may be associated with high priority relative to CU 702-*b*. In such cases, tentative SPI associated with CU 702-*a* may include scheduling information states, whereas tentative SPI associated with CU 702-*b* may include flexible states At 730-*a* and 730-*b*, CUs 702-*a* and 702-*b* may modify or update SPI based on the tentative SPI exchanged at 725. For example, the SPI may be updated based on considering the scheduling states included in exchanged tentative SPI (e.g., an updated SPI may be determined by each of CU 702-*a* and CU 702-*b* based on considering and coordinating, for each time unit, scheduling information states, flexible states (e.g., hard states, soft states), and NULL states in the exchanged tentative SPI patterns). In some cases, 730-*a* and 730-*b* may be performed in parallel (e.g., at least partially overlapping in time), in other cases, 730-*a* and 730-*b* may be performed independently and at different times.

At 735-*a* and 735-*b*, CUs 702-*a* and 702-*b* may signal updated SPI to DUs 705-*a* and 705-*b* (e.g., via F1-AP signaling). In some cases, 735-*a* and 735-*b* may be performed in parallel (e.g., at least partially overlapping in time), in other cases, 735-*a* and 735-*b* may be performed independently and at different times.

At 740-*a* and 740-*b*, DUs 705-*a* and 705-*b* may schedule one or more UEs in their respective cells (e.g., including UE 115-*h* and UE 115-*i*) based at least in part on the updated SPI. In some cases, 740-*a* and 740-*b* may be performed in parallel (e.g., at least partially overlapping in time), in other cases, 740-*a* and 740-*b* may be performed independently and at different times.

In some cases, DUs 705-*a* and 705-*b* may refer to a DUs of different IAB networks (e.g., different wireless communications system 201). In some cases, the IAB networks may each include a CU 702 that control multiple DUs (e.g., CU 702-*a* may control multiple DUs including at least DU 705-*a* and CU 702-*b* may control multiple DUs including at least DU 705-*b*). The SPI (e.g., the updated SPI at 735-*a* and 735-*b*) may be used for inter-CU coordination.

Figure 8:
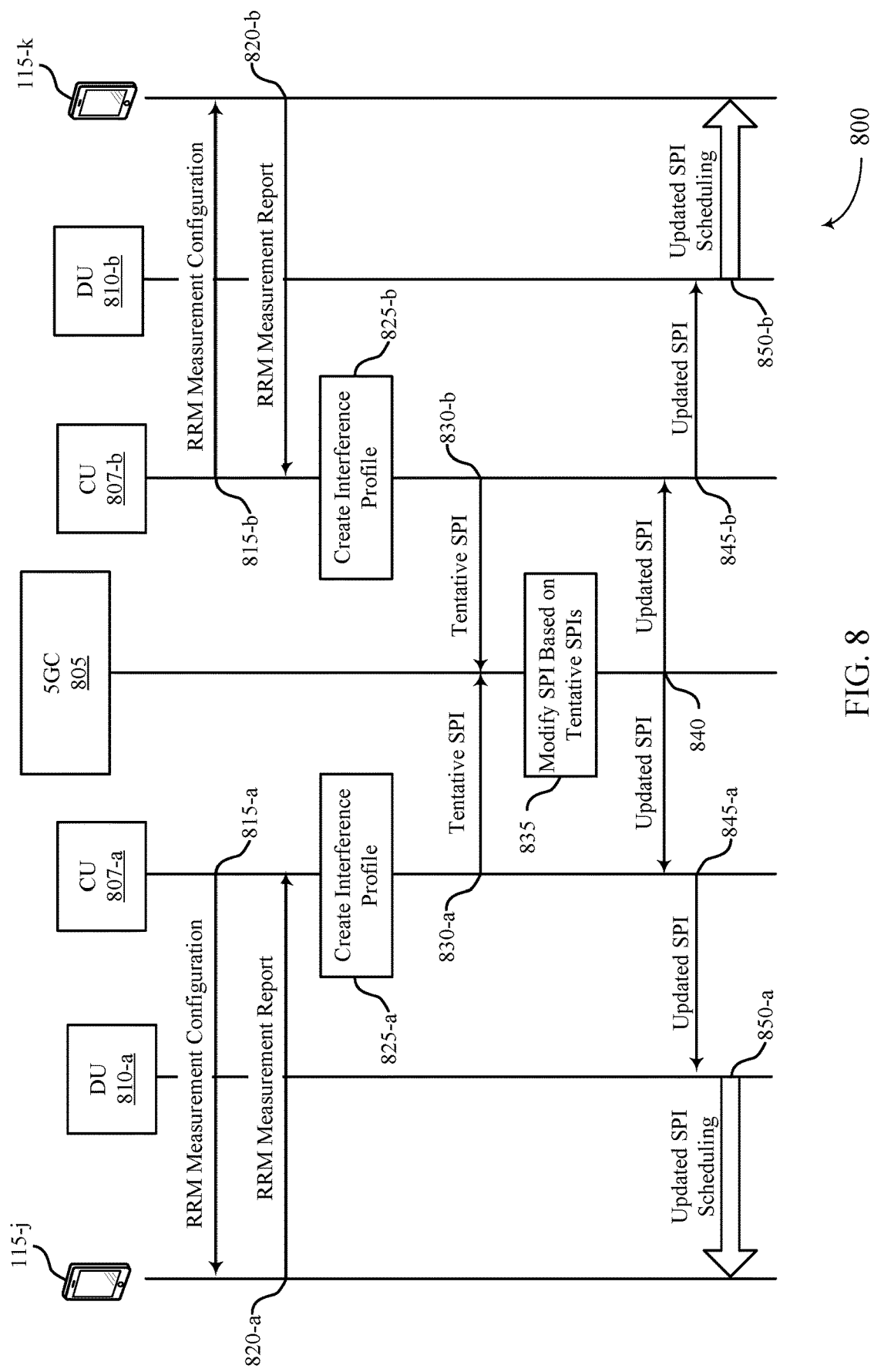
FIG. 8 illustrates an example of a process flow that supports SPIs in accordance with aspects of the present disclosure.

FIG. 8 illustrates an example of a process flow 800 that supports SPIs in accordance with aspects of the present disclosure. In some examples, process flow 800 may implement aspects of wireless communications system 100, wireless communications system 200, and/or wireless communications systems 201. Process flow 800 may include UE 115-*j*, UE 115-*k*, core network 805, CU 807-*a*, CU 807-*b*, DU 810-*a*, and DU 810-*b*, which may be examples of the corresponding devices as described with reference to FIGS. 1 through 4. Process flow 800 may illustrate a coordinated inter-AN coordination scheme amongst CUs 807-*a* and 807-*b* using SPI signaling over a NG interface. In the following description of the process flow 800, the operations between the UE 115-*j*, UE 115-*k*, core network 805, CU 807-*a*, CU 807-*b*, DU 810-*a*, and DU 810-*b* may be transmitted in a different order than the exemplary order shown, or the operations performed by UE 115-*j*, UE 115-*k*, core network 805, CU 807-*a*, CU 807-*b*, DU 810-*a*, and DU 810-*b* may be performed in different orders or at different times. In some cases, certain operations may also be left out of the process flow 800, or other operations may be added to the process flow 800.

At 815-*a* and 815-*b*, CUs 807-*a* and 807-*b* may configure UEs 115-*j* and 115-*k* to transmit RRM measurement reports. In some cases, 815-*a* and 815-*b* may be performed in parallel (e.g., at least partially overlapping in time), in other cases, 815-*a* and 815-*b* may be performed independently and at different times.

At 820-*a* and 820-*b*, UEs 115-*j* and 115-*k* may transmit RRM measurement reports to CUs 807-*a* and 807-*b*. For example, the UEs 115-*j* and 115-*k* may receive downlink reference signals from the serving cell and from neighbor cells. The UEs 115-*j* and 115-*k* may measure (e.g., detect) the quality of the beam and report the measurement information to the CU (e.g., the RRC layer of the base station). The RRM measurement reports may include beam indices and measurement quantities for serving cells and neighbor cells. For example, the RRM measurement reports may include results of SSB measurements, CSI-RS measurements, beam indices, physical cell IDs, etc. associated with serving and neighbor cells (e.g., according to the respective configurations received by UEs 115-*j* and 115-*k* at 815-*a* and 815-*b*). In some cases, the RRM measurement reports may be transmitted to DUs 810-*a* and 810-*b*, and may be respectively relayed from DUs 810-*a* and 810-*b* to CUs 807-*a* and 807-*b* (e.g., the UE 115-*j* may transmit an RRM measurement report to DU 810-*a* using Uu signaling, and the DU 810-*a* may pass or relay the RRM measurement report to CU 807-*a* using F1-AP signaling). In some cases, 820-*a* and 820-*b* may be performed in parallel (e.g., at least partially overlapping in time), in other cases, 820-*a* and 820-*b* may be performed independently and at different times.

At 825-*a* and 825-*b*, CUs 807-*a* and 807-*b* may create or determine interference profiles based at least in part on the RRM measurement reports received at 820-*a* and 820-*b*. For example, the CUs 807-*a* and 807-*b* may each identify pairs of interfering UEs and/or beams among neighbor cells associated with their respective ANs. The interference profiles may include a profile of interfering UEs, interfering beams, etc. In some cases, 825-*a* and 825-*b* may be performed in parallel (e.g., at least partially overlapping in time), in other cases, 825-*a* and 825-*b* may be performed independently and at different times.

At 830-*a* and 830-*b*, CUs 807-*a* and 807-*b* may transmit tentative SPI to the core network 805. CUs 807-*a* and 807-*b* may each determine tentative SPI (e.g., CU 807-*a* may determine a tentative SPI 1 and CU 807-*b* may determine a tentative SPI 2). For example, CUs 807-*a* and 807-*b* may determine tentative SPI based on their respective ANs (e.g., based on measurement reports from UEs within their respective cells). In some cases, 830-*a* and 830-*b* may be performed in parallel (e.g., at least partially overlapping in time), in other cases, 830-*a* and 830-*b* may be performed independently and at different times.

At 835, the core network 805 may modify or update SPI based on the tentative SPI received at 830-*a* and 830-*b*.

At 840, the core network 805 may signal updated SPI to the CUs 807-*a* and 807-*b* (e.g., via NG signaling). At 845-*a* and 845-*b*, CUs 807-*a* and 807-*b* may forward pass (e.g., and in some cases adjust or update before forwarding or passing) updated SPI to DUs 810-*a* and 810-*b*. At 850-*a* and 850-*b*, DUs 810-*a* and 810-*b* may schedule one or more UEs in their respective cells (e.g., including UE 115-*j* and UE 115-*k*) based at least in part on the updated SPI.

Figure 9:
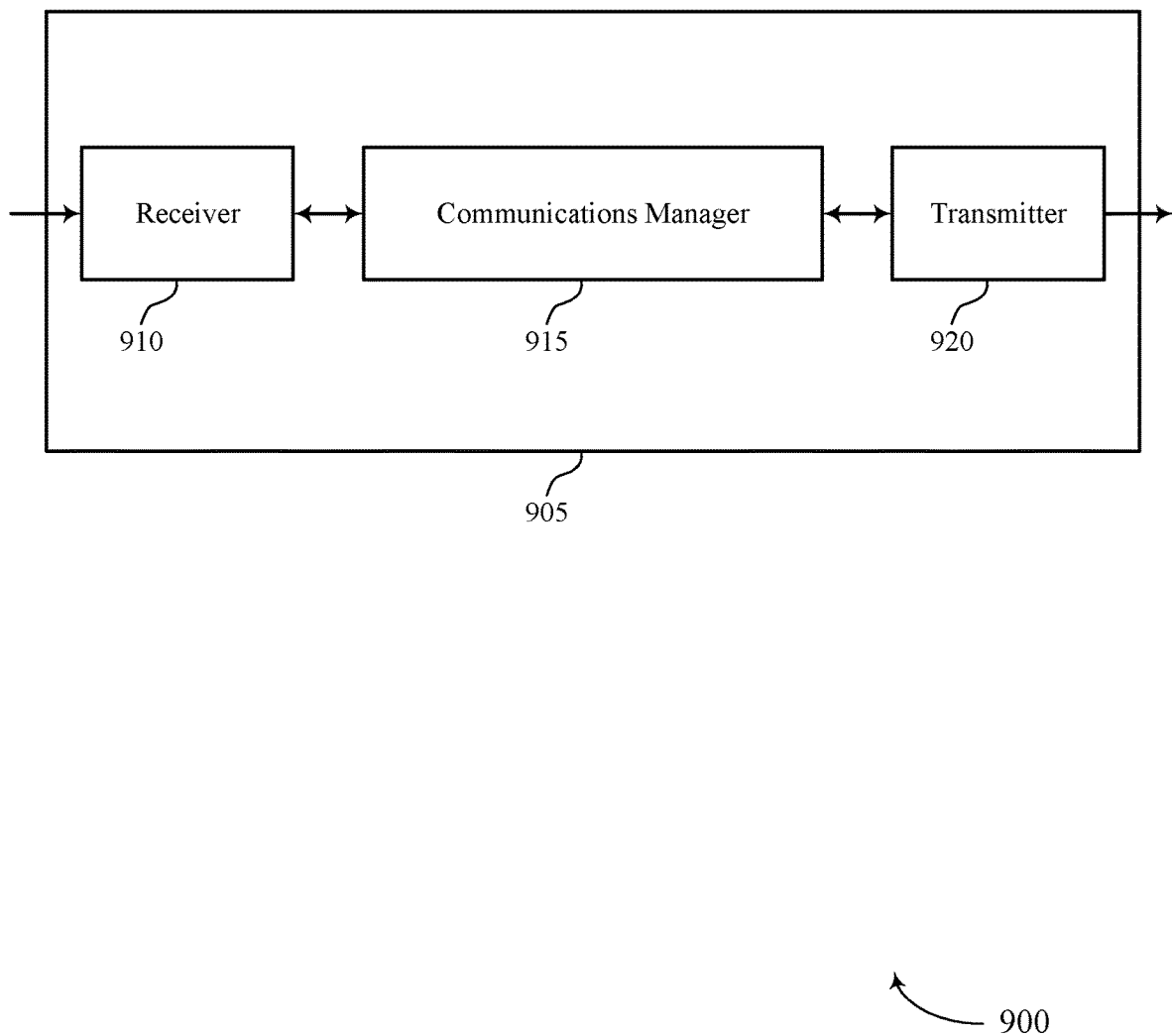
FIGS. 9 and 10 show block diagrams of devices that support supporting SPIs in accordance with aspects of the present disclosure.

FIG. 9 shows a block diagram 900 of a device 905 that supports SPIs in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to supporting SPIs, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a measurement report for a UE, the measurement report including measured values of at least one beam of a cell measured by the UE and identify, for a scheduling node, an indication of a scheduling plan specifying a pattern of scheduling states over a period of time, the indication of the scheduling plan based on the measurement report and to be used by the scheduling node to schedule communication resources for the UE. The communications manager 915 may be an example of aspects of the communications manager 1210 described herein. The actions performed by the communications manager 915 as described herein may be implemented to realize one or more potential advantages described herein. One implementation may allow a network (e.g., devices, such as base stations, CUs, DUs, etc.) to mitigate interference and more efficiently utilize wireless resources within wireless communications system via identification of an indication of a scheduling plan (e.g., SPI) specifying a pattern of scheduling states over a period of time (e.g., based on received measurement reports for a UE). For example, SPI may be used, in some cases, to indicate scheduling or coordination of data transmission scheduling, beam patterns, etc., which may provide for improved quality and reliability of service at a UE 115, as data transmission scheduling, scheduled beam patterns, etc., by base stations, CUs, DUs, etc., may be coordinated. Such coordination may result in reduced network latency (e.g., reduced latency from retransmissions resulting from interference, etc.), decreased power consumption by UEs 115 and/or base stations 105 (e.g., reduced power consumption associated with communicating any retransmissions), etc.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
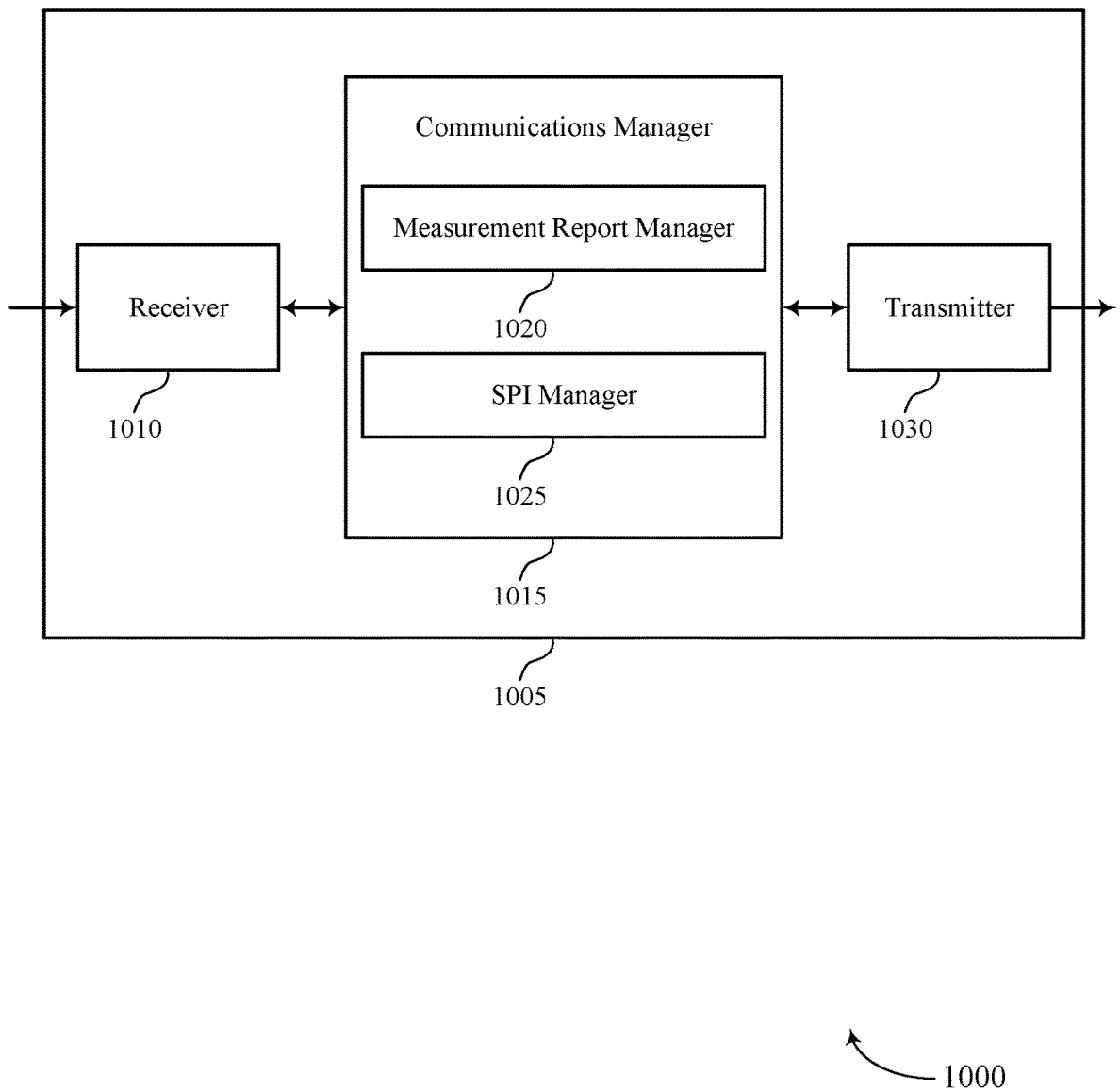

FIG. 10 shows a block diagram 1000 of a device 1005 that supports SPIs in accordance with aspects of the present disclosure. The device 1005 may be an example of aspects of a device 905 or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to supporting SPIs, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a measurement report manager 1020 and a SPI manager 1025. The communications manager 1015 may be an example of aspects of the communications manager 1210 described herein.

The measurement report manager 1020 may receive a measurement report for a UE, the measurement report including measured values of at least one beam of a cell measured by the UE.

The SPI manager 1025 may identify, for a scheduling node, an indication of a scheduling plan specifying a pattern of scheduling states over a period of time, the indication of the scheduling plan based on the measurement report and to be used by the scheduling node to schedule communication resources for the UE.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
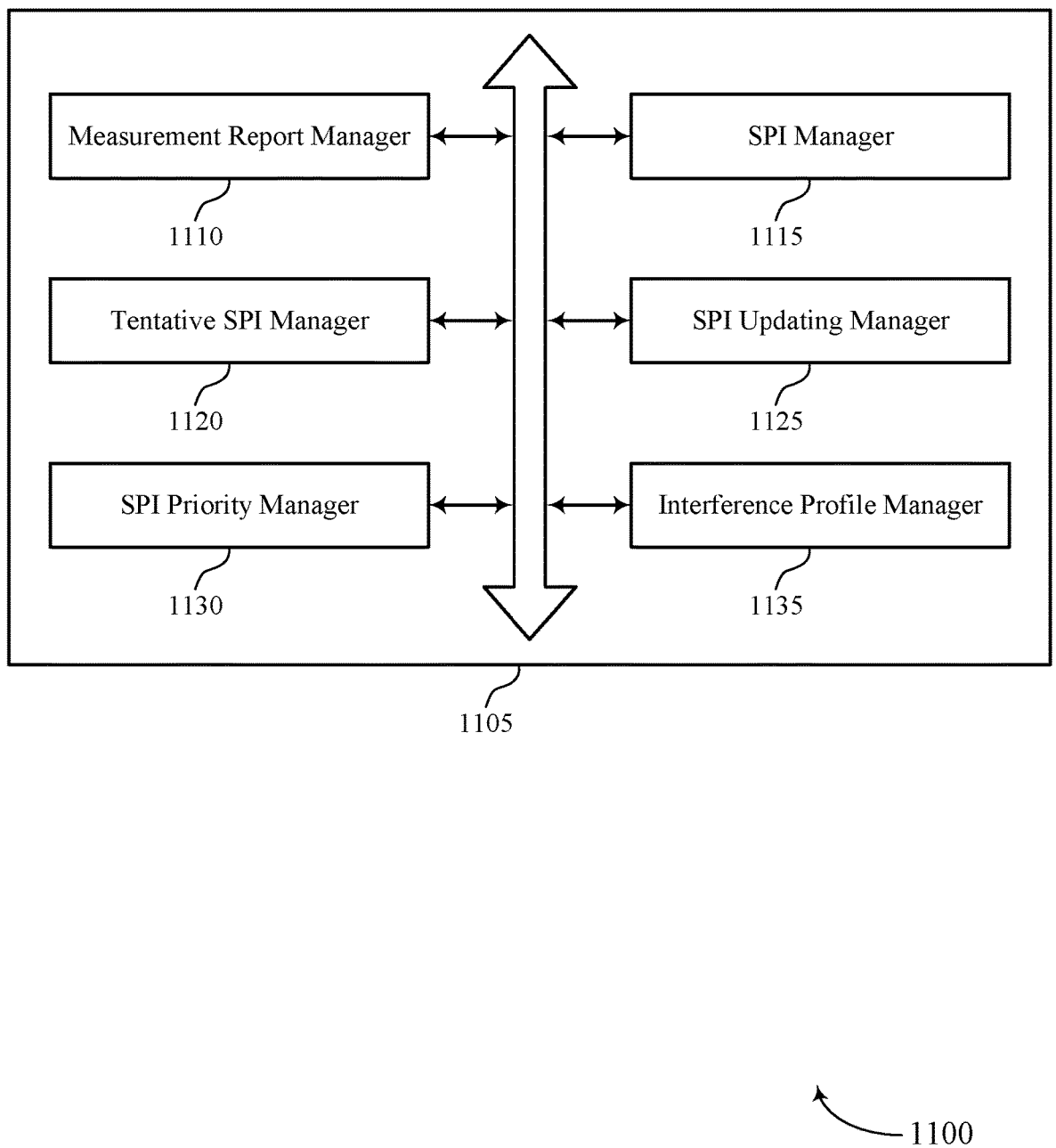
FIG. 11 shows a block diagram of a communications manager that supports SPIs in accordance with aspects of the present disclosure.

FIG. 11 shows a block diagram 1100 of a communications manager 1105 that supports supporting SPIs in accordance with aspects of the present disclosure. The communications manager 1105 may be an example of aspects of a communications manager 915, a communications manager 1015, or a communications manager 1210 described herein. The communications manager 1105 may include a measurement report manager 1110, a SPI manager 1115, a tentative SPI manager 1120, a SPI updating manager 1125, a SPI priority manager 1130, and an interference profile manager 1135. Each of these modules may communicate, directly or indirectly, with one another (e.g., via one or more buses). In some cases the communications manager 1105 may be included in a scheduling node, such as a DU.

The measurement report manager 1110 may receive a measurement report for a UE, the measurement report including measured values of at least one beam of a cell measured by the UE. In some examples, the measurement report manager 1110 may transmit, by the scheduling node, the measurement report to a CU. In some examples, the measurement report manager 1110 may receive, based on transmitting the measurement report, the indication of the scheduling plan from the CU. In some examples, the measurement report manager 1110 may transmit configuration information for the UE to use to perform measurements of the cell, or at least one additional cell, or a combination thereof. In some examples, the measurement report manager 1110 may receive at least one additional measurement report from the UE based on the transmitted configuration information. The actions performed by the measurement report manager 1110 as described herein may be implemented to determine interference profiles, identify interfering UEs, interfering beams, etc. For example, actions performed by the measurement report manager 1110 as described herein may be implemented such that interfering UEs 115, interfering beam directions, etc. may be assigned to different time units or different non-overlapping resource block allocations, which may provide for interference mitigation and more efficient utilization of wireless resources.

The SPI manager 1115 may identify, for a scheduling node, an indication of a scheduling plan specifying a pattern of scheduling states over a period of time, the indication of the scheduling plan based on the measurement report and to be used by the scheduling node to schedule communication resources for the UE. Such indications of scheduling plans (e.g., SPIs) may be used to coordinate beam sweeping patterns, schedule communications for UEs 115, coordinate UE 115 scheduling, beam patterns, beamformed transmissions between neighbor cells, etc. Such coordination via SPI signaling may provide for improved inter-cell coordination and scheduling, intra-cell coordination and scheduling, etc. Further, such coordination and scheduling techniques described herein may mitigate interference and more efficiently utilize wireless resources, which may provide for improved quality of service for UEs 115, base stations 105, etc.

In some examples, when an indicated scheduling state is a flexible state, the scheduling node is allowed to schedule any UE, or any beam direction, or a combination thereof. In some examples, when an indicated scheduling state is a NULL state, the scheduling node is prevented from scheduling all UEs, or all beam directions, or a combination thereof. In some examples, the SPI manager 1115 may transmit the indication of the scheduling plan on a GC-PDCCH, or a RRC message, or a combination thereof. In some examples, the SPI manager 1115 may receive a first indication of a first scheduling plan over a first type of interface. In some examples, the SPI manager 1115 may receive a second indication of a second scheduling plan over a second type of interface.

In some cases, the pattern of scheduling states includes a scheduling information state, or a flexible state, or a NULL state, or a combination thereof. In some cases, the period of time includes one or more slots or mini-slots. In some cases, the indication of the scheduling plan identifies values for scheduling for a scheduling state, the values including a set UE indices, or a set of beam indices, or a set of angular values, or a set of location values, or a combination thereof. In some cases, the indication of the scheduling plan schedules, for a scheduling state, data transmissions for different UEs, or different beam patterns, or a combination thereof. In some cases, the indication of the scheduling plan identifies, for a scheduling state, allocated resources blocks, or a buffer status, or a priority, or a type of communications, or a MCS, or a target SINR, or a target transmit power, or a target receive power, or a combination thereof. In some cases, the scheduling node includes a DU of an IAB network. In some cases, the IAB network includes a CU controlling a set of DUs, including the DU. In some cases, the SPI is used for inter-DU coordination via a CU of the IAB network. In some cases, the SPI is used for inter-CU coordination via one or more Xn_C interfaces, or via a core network, or a combination thereof.

The tentative SPI manager 1120 may determine, by the scheduling node, a tentative scheduling plan (e.g., based on L1/L2 signaling from one or more UEs, such as CSI reports, BSRs, etc.). In some examples, the tentative SPI manager 1120 may transmit an indication of the tentative scheduling plan to a CU. In some examples, the tentative SPI manager 1120 may receive, at the scheduling node and from a second scheduling node via a CU, an indication of a tentative scheduling plan.

The SPI updating manager 1125 may receive, from the CU, an indication of an updated scheduling plan based on the tentative scheduling plan, where the updated scheduling plan is the scheduling plan for the scheduling node. In some examples, the SPI updating manager 1125 may determine, by the scheduling node, an updated scheduling plan for the scheduling node based on the received indication of the tentative scheduling plan.

The SPI priority manager 1130 may identify, by the scheduling node, at least one priority rule applicable to the scheduling plan of the scheduling node, where the updated scheduling plan for the scheduling node is determined based on the received indication of the tentative scheduling plan and the at least one priority rule. In some examples, the SPI priority manager 1130 may identify a conflict between a first indication of a first scheduling plan for the scheduling node and a second indication of the scheduling plan for the scheduling node. In some examples, the SPI priority manager 1130 may select the first scheduling plan or the second scheduling plan to be the scheduling plan based on a rule for scheduling plan selection. In some examples, the SPI priority manager 1130 may identify a first time duration associated with the first scheduling plan and a second time duration associated with the second scheduling plan, where the rule indicates that the first scheduling plan is selected based on the second time duration being longer than the first time duration. In some examples, the SPI priority manager 1130 may select the first scheduling plan to be the scheduling plan based on the rule indicating that the first type of interface overrides the second type of interface.

The interference profile manager 1135 may receive, at the scheduling node, an interference profile from a central unit. In some examples, the interference profile manager 1135 may identify at least one UE, or at least one beam direction, or a combination thereof, as interfering based on the received interference profile. In some examples, the interference profile manager 1135 may assign, by the scheduling node, the at least one UE, or the at least one beam direction, or the combination thereof, to different time units, or different non-overlapping resource block allocations, or a combination thereof.

Figure 12:
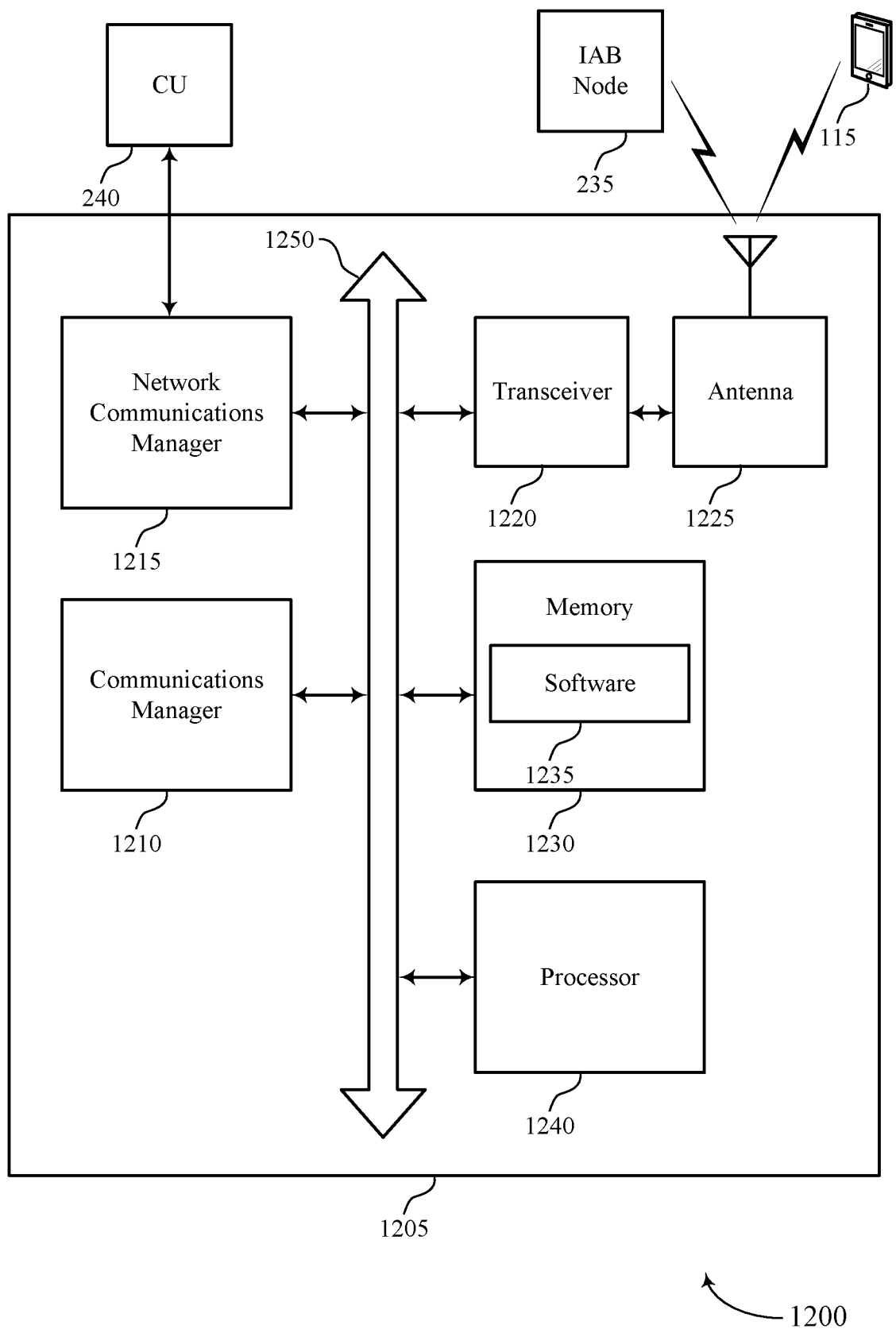
FIG. 12 shows a diagram of a system including a device that supports SPIs in accordance with aspects of the present disclosure.

FIG. 12 shows a diagram of a system 1200 including a device 1205 that supports supporting SPIs in accordance with aspects of the present disclosure. The device 1205 may be an example of or include the components of device 905, device 1005, or a DU as described herein. The device 1205 may include components for bi-directional voice and data communications including components for transmitting and receiving communications, including a communications manager 1210, network communications manager 1215, a transceiver 1220, an antenna 1225, memory 1230, and a processor 1240. These components may be in electronic communication via one or more buses (e.g., bus 1245).

The communications manager 1210 may receive a measurement report for a UE, the measurement report including measured values of at least one beam of a cell measured by the UE and identify, for a scheduling node, an indication of a scheduling plan specifying a pattern of scheduling states over a period of time, the indication of the scheduling plan based on the measurement report and to be used by the scheduling node to schedule communication resources for the UE.

The network communications manager 1215 may manage communications with other CUs 240 (e.g., or CUs 215), as described with reference to FIGS. 1-8. For example, network communications manager 1215 may include a controller or scheduler for controlling communications with CUs over an F1-AP interface. For example, the network communications manager 1215 may provide an F1-AP interface for signaling of SPIs for coordinated scheduling techniques described herein.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code or software 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting SPIs).

The software 1235 may include code or instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
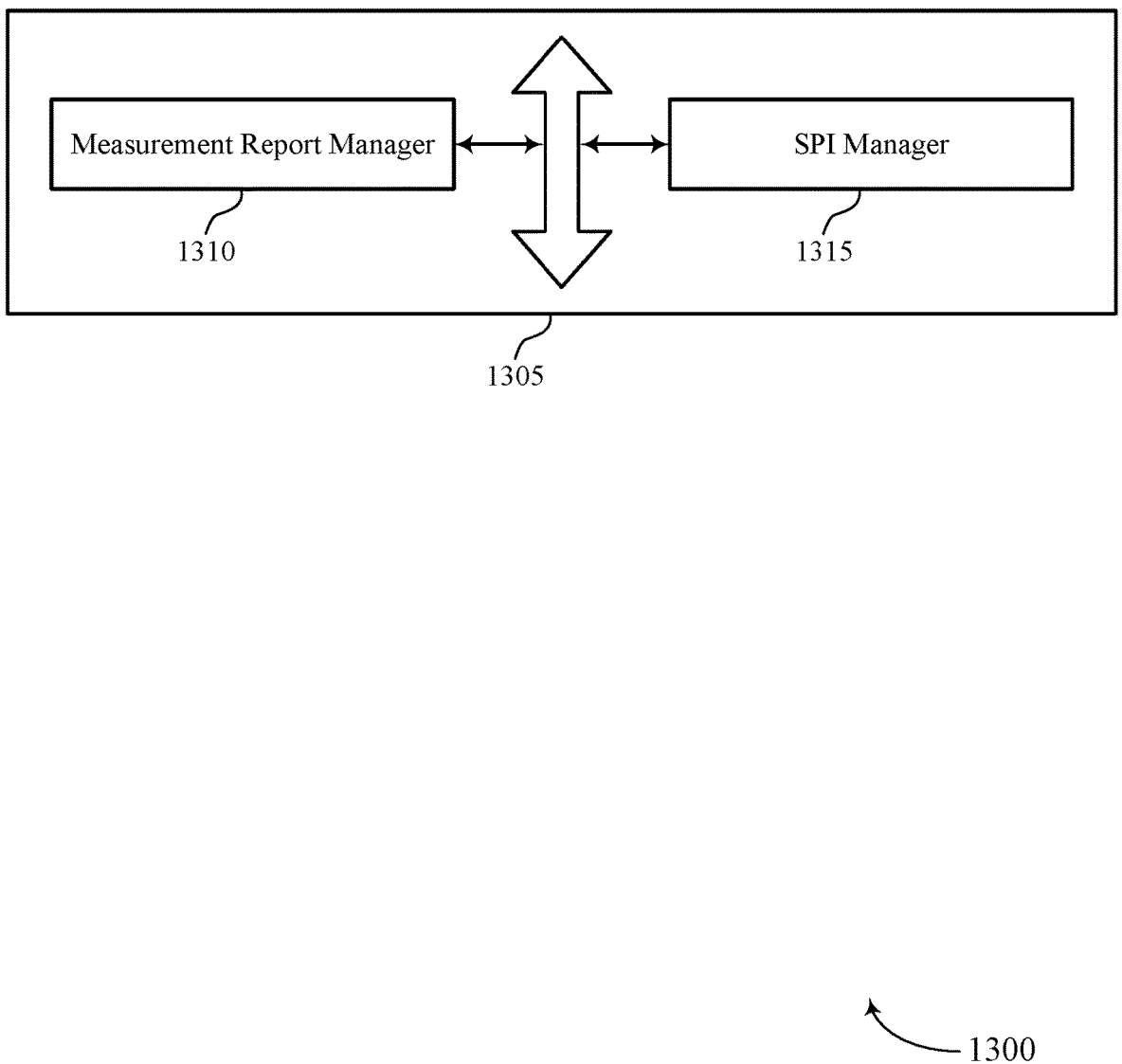
FIGS. 13 through 23 show flowcharts illustrating methods that support supporting SPIs in accordance with aspects of the present disclosure.

FIG. 13 shows a block diagram 1300 of a communications manager 1305 that supports supporting SPIs in accordance with aspects of the present disclosure. The communications manager 1305 may be an example of aspects of a communications manager 1610 described herein. The communications manager 1305 may include a measurement report manager 1310 and a SPI manager 1315. Each of these modules may communicate, directly or indirectly, with one another (e.g., via one or more buses).

The measurement report manager 1310 may receive a measurement report for a UE, the measurement report including measured values of at least one beam of a cell measured by the UE. In some examples, the measurement report manager 1310 may transmit configuration information for the UE to use to perform measurements of the cell, or at least one additional cell, or a combination thereof. In some examples, the measurement report manager 1310 may receive at least one additional measurement report from the UE based on the transmitted configuration information. The actions performed by the measurement report manager 1310 as described herein may be implemented to determine interference profiles, identify interfering UEs, interfering beams, etc. For example, actions performed by the measurement report manager 1310 as described herein may be implemented such that interfering UEs 115, interfering beam directions, etc. may be assigned to different time units or different non-overlapping resource block allocations, which may provide for interference mitigation and more efficient utilization of wireless resources.

The SPI manager 1315 may identify, for a scheduling node, an indication of a scheduling plan specifying a pattern of scheduling states over a period of time, the indication of the scheduling plan based on the measurement report and to be used by the scheduling node to schedule communication resources for the UE. In some examples, when an indicated scheduling state is a flexible state, the scheduling node is allowed to schedule any UE, or any beam direction, or a combination thereof. In some examples, when an indicated scheduling state is a NULL state, the scheduling node is prevented from scheduling all UEs, or all beam directions, or a combination thereof. In some examples, identifying the indication of the scheduling plan includes determining, by a core network node, the indication of the scheduling plan based on the received measurement report. In some examples, the SPI manager 1315 may transmit the indication of the scheduling plan on a GC-PDCCH, a RRC message, a F1 interface, a Xn-C interface, a NG interface, or a combination thereof.

The actions performed by the SPI manager 1315 as described herein may be implemented to realize one or more potential advantages described herein. One implementation may allow a network (e.g., network devices, such as base stations, CUs, DUs, etc.) to mitigate interference and more efficiently utilize wireless resources within wireless communications system via identification of an indication of a scheduling plan (e.g., SPI) specifying a pattern of scheduling states over a period of time (e.g., based on received measurement reports for a UE). For example, SPI may be used, in some cases, to indicate scheduling or coordination of data transmission scheduling, beam patterns, etc., which may provide for improved quality and reliability of service at a UE 115, as data transmission scheduling, scheduled beam patterns, etc., by base stations, CUs, DUs, etc. may be coordinated. Such coordination may result in reduced network latency (e.g., reduced latency from retransmissions resulting from interference, etc.), decreased power consumption by UEs 115 and/or base stations 105 (e.g., reduced power consumption associated with communicating any retransmissions), etc.

In some cases, the pattern of scheduling states includes a scheduling information state, or a flexible state, or a NULL state, or a combination thereof. In some cases, the period of time includes one or more slots or mini-slots. In some cases, the indication of the scheduling plan identifies values for scheduling for a scheduling state, the values including a set UE indices, or a set of beam indices, or a set of angular values, or a set of location values, or a combination thereof. In some cases, the indication of the scheduling plan schedules, for a scheduling state, data transmissions for different UEs, or different beam patterns, or a combination thereof. In some cases, the indication of the scheduling plan identifies, for a scheduling state, allocated resources blocks, or a buffer status, or a priority, or a type of communications, or a MCS, or a target SINR, or a target transmit power, or a target receive power, or a combination thereof.

In some cases, the method further includes transmitting the indication of the scheduling plan determined by the core network node to a CU. In some cases, the scheduling node includes a DU of an IAB network. In some cases, the IAB network includes a CU controlling a set of DUs, including the DU. In some cases, the SPI is used for inter-DU coordination via a CU of the IAB network. In some cases, the SPI is used for inter-CU coordination via one or more Xn_C interfaces, or via a core network, or a combination thereof.

Figure 14:
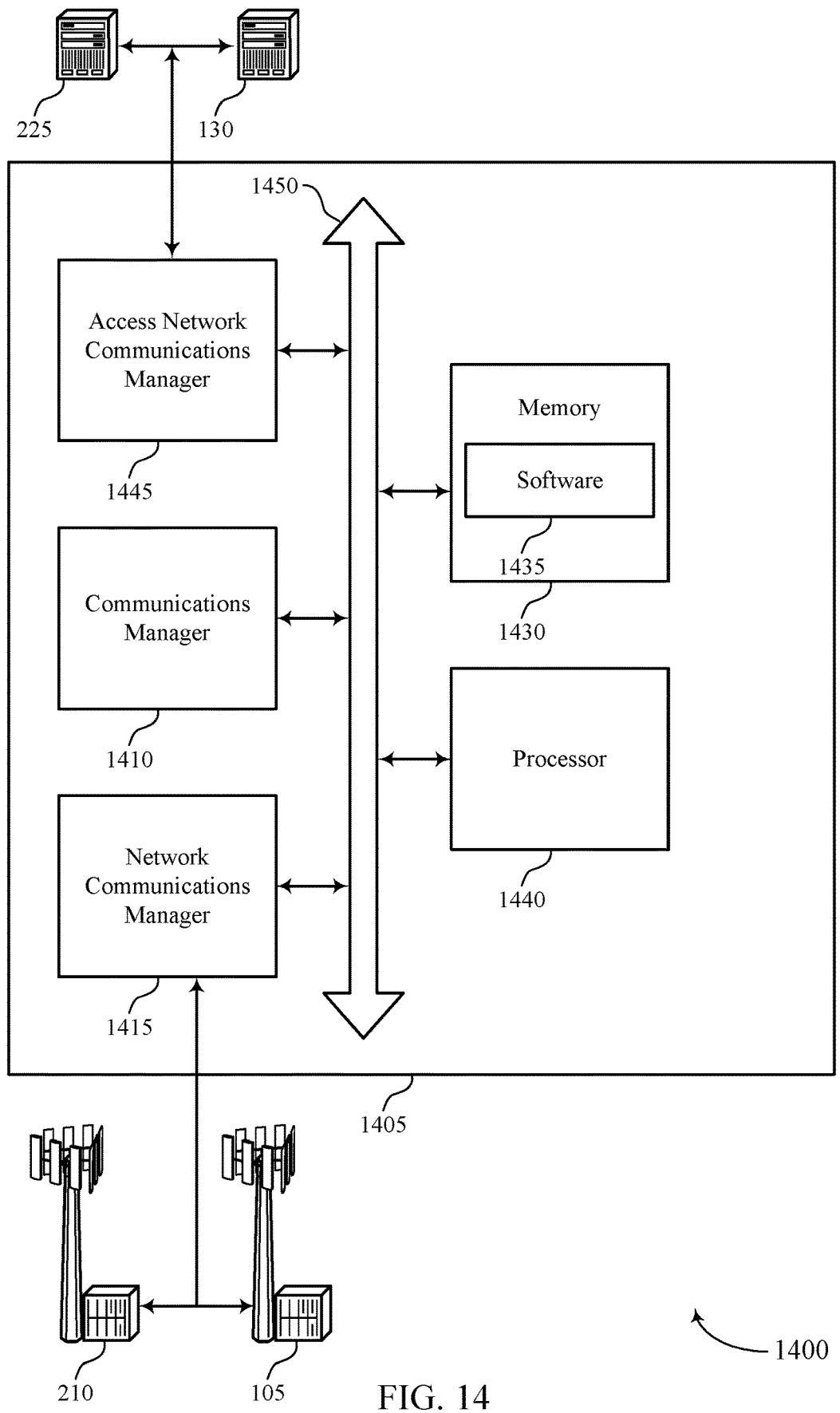

FIG. 14 shows a diagram of a system 1400 including a device 1405 that supports supporting SPIs in accordance with aspects of the present disclosure. The device 1405 may be an example of or include the components of a network or network core as described herein. The device 1405 may include components for bi-directional data communications including components for transmitting and receiving communications, including a communications manager 1410, a network communications manager 1415, memory 1430, a processor 1440, and an AN communications manager 1445. These components may be in electronic communication via one or more buses (e.g., bus 1450).

The communications manager 1410 may be an example of a communications manager 1305 as described herein. For example, the communications manager 1410 may perform any of the methods or processes described above. In some cases, the communications manager 1410 may be implemented in hardware, software executed by a processor, firmware, or any combination thereof.

The network communications manager 1415 may manage communications with other base station 105 (e.g., or base stations 210, IAB donors 230, etc.), as described with reference to FIGS. 1-8, for example over an NG interface. In some examples, the network communications manager 1415 may provide an X2 interface within an LTE/LTE-A wireless communication network technology to provide communication between base stations 105. That is, the network communications manager 1415 may provide an NG interface for signaling of SPIs for coordinated scheduling techniques described herein.

The access network communications manager 1445 may manage communications with one or more components of the same core network (intra-core network communications), or with network nodes of other networks (inter-network communications), for example in communication with network components of core network 130 or core network 225.

A database controller may manage data storage and processing in a database. In some cases, a user may interact with the database controller. In other cases, the database controller may operate automatically without user interaction. The database may be an example of a single database, a distributed database, multiple distributed databases, a data store, a data lake, or an emergency backup database.

Memory 1430 may include random-access memory (RAM) and read-only memory (ROM). The memory 1430 may store computer-readable, computer-executable code or software 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1430 may be configured to operate a memory array using a memory controller. In other cases, a memory controller may be integrated into the processor 1440. The processor 1440 may be configured to execute computer-readable instructions stored in a memory 1430 to perform various functions (e.g., functions or tasks supporting SPIs).

The software 1435 may include instructions to implement aspects of the present disclosure, including instructions to support wireless communications. The software 1435 may be stored in a non-transitory computer-readable medium such as system memory or other type of memory. In some cases, the software 1645 may not be directly executable by the processor 1440 but may cause a computer (e.g., when compiled and executed) to perform functions described herein.

Figure 15:
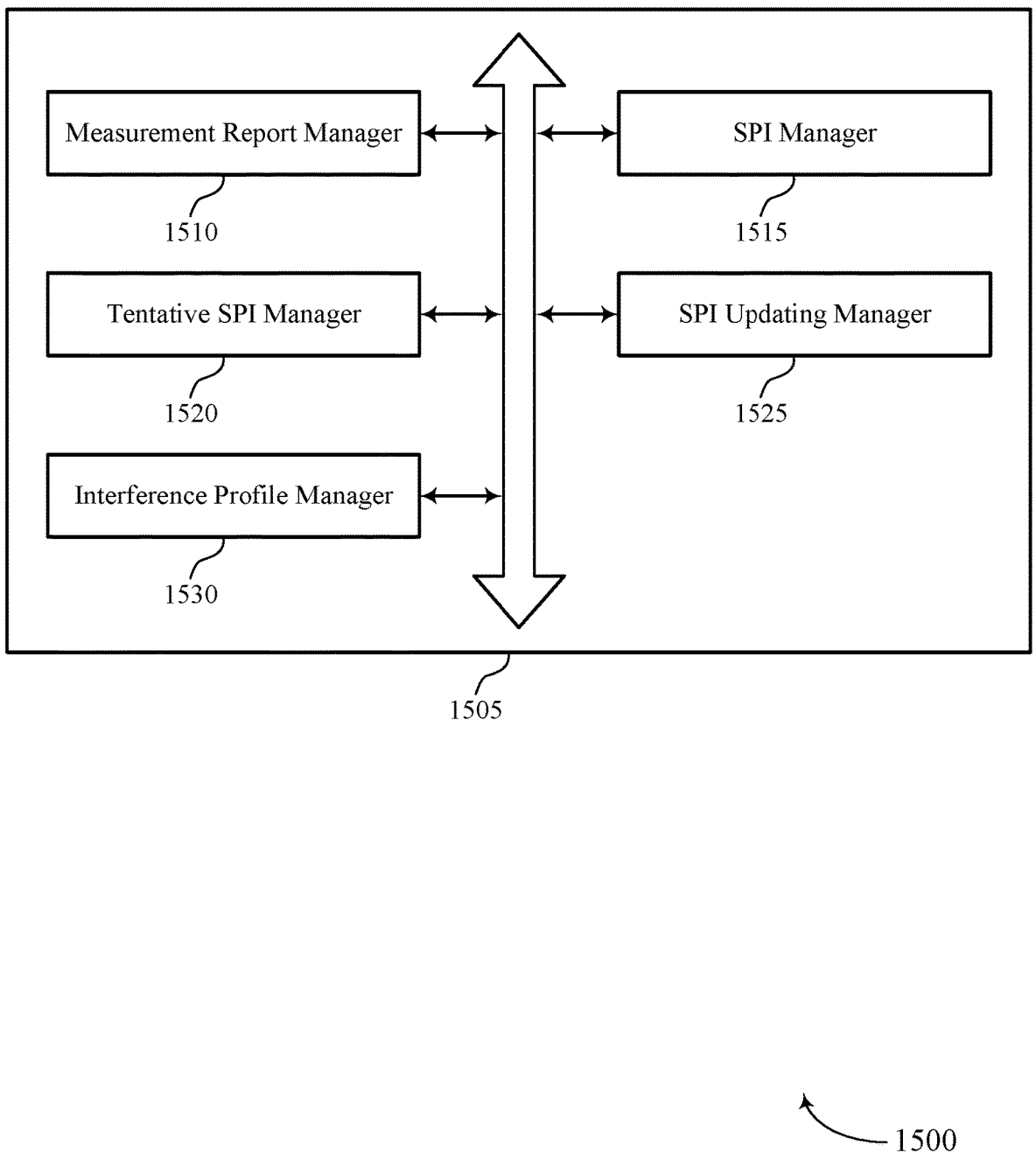

FIG. 15 shows a block diagram 1500 of a communications manager 1505 that supports supporting SPIs in accordance with aspects of the present disclosure. The communications manager 1505 may be an example of aspects of a communications manager 2010 described herein. The communications manager 1505 may include a measurement report manager 1510, a SPI manager 1515, a tentative SPI manager 1520, a SPI updating manager 1525, and an interference profile manager 1530. Each of these modules may communicate, directly or indirectly, with one another (e.g., via one or more buses).

The measurement report manager 1510 may receive a measurement report for a UE, the measurement report including measured values of at least one beam of a cell measured by the UE. In some examples, the measurement report manager 1510 may transmit the measurement report to a core network node. In some examples, the measurement report manager 1510 may receive, at a CU, at least one additional measurement report for at least one additional UE from the scheduling node or at least one second scheduling node. In some examples, the measurement report manager 1510 may transmit configuration information for the UE to use to perform measurements of the cell, or at least one additional cell, or a combination thereof. In some examples, the measurement report manager 1510 may receive at least one additional measurement report from the UE based on the transmitted configuration information. The actions performed by the measurement report manager 1510 as described herein may be implemented to determine interference profiles, identify interfering UEs, interfering beams, etc. For example, actions performed by the measurement report manager 1510 as described herein may be implemented such that interfering UEs 115, interfering beam directions, etc. may be assigned to different time units or different non-overlapping resource block allocations, which may provide for interference mitigation and more efficient utilization of wireless resources.

The SPI manager 1515 may identify, for a scheduling node, an indication of a scheduling plan specifying a pattern of scheduling states over a period of time, the indication of the scheduling plan based on the measurement report and to be used by the scheduling node to schedule communication resources for the UE. In some examples, when an indicated scheduling state is a flexible state, the scheduling node is allowed to schedule any UE, or any beam direction, or a combination thereof. In some examples, when an indicated scheduling state is a NULL state, the scheduling node is prevented from scheduling all UEs, or all beam directions, or a combination thereof. In some examples, the SPI manager 1515 may transmit, by a first CU, the indication of the scheduling plan to the scheduling node, where the first CU identifies the indication of the scheduling plan. In some examples, the SPI manager 1515 may determine, by the first CU, the indication of the scheduling plan based on the received measurement report, the measurement report received from the scheduling node.

In some examples, the SPI manager 1515 may receive the indication of the scheduling plan from a second CU, the received indication transmitted to the scheduling node by the CU. In some examples, the SPI manager 1515 may receive the indication of the scheduling plan from the core network node. In some examples, the SPI manager 1515 may transmit, by a first CU, the indication of the scheduling plan to a second CU, or a core network node, or a combination thereof, where the first CU identifies the indication of the scheduling plan based on the received measurement report. In some examples, the SPI manager 1515 may transmit, by a parent node of an IAB, the indication of the scheduling plan to a child node of the IAB. In some examples, the SPI manager 1515 may transmit the indication of the scheduling plan on a GC-PDCCH, or a RRC message, or a combination thereof.

In some cases, the pattern of scheduling states includes a scheduling information state, or a flexible state, or a NULL state, or a combination thereof. In some cases, the period of time includes one or more slots or mini-slots. In some cases, the indication of the scheduling plan identifies values for scheduling for a scheduling state, the values including a set UE indices, or a set of beam indices, or a set of angular values, or a set of location values, or a combination thereof. In some cases, the indication of the scheduling plan schedules, for a scheduling state, data transmissions for different UEs, or different beam patterns, or a combination thereof. In some cases, the indication of the scheduling plan identifies, for a scheduling state, allocated resources blocks, or a buffer status, or a priority, or a type of communications, or a MCS, or a target SINR, or a target transmit power, or a target receive power, or a combination thereof. In some cases, the scheduling node includes a DU of an IAB network. In some cases, the IAB network includes a CU controlling a set of DUs, including the DU. In some cases, the SPI is used for inter-DU coordination via a CU of the IAB network. In some cases, the SPI is used for inter-CU coordination via one or more Xn_C interfaces, or via a core network, or a combination thereof.

The actions performed by the SPI manager 1515 (e.g., and/or the tentative SPI manager 1520, SPI updating manager 1525, etc.) as described herein may be implemented to realize one or more potential advantages described herein. One implementation may allow a network (e.g., devices, such as base stations, CUs, DUs, etc.) to mitigate interference and more efficiently utilize wireless resources within wireless communications system via identification of an indication of a scheduling plan (e.g., SPI) specifying a pattern of scheduling states over a period of time (e.g., based on received measurement reports for a UE). For example, SPI may be used, in some cases, to indicate scheduling or coordination of data transmission scheduling, beam patterns, etc., which may provide for improved quality and reliability of service at a UE 115, as data transmission scheduling, scheduled beam patterns, etc. by base stations, CUs, DUs, etc., may be coordinated. Such coordination may result in reduced network latency (e.g., reduced latency from retransmissions resulting from interference, etc.), decreased power consumption by UEs 115 and/or base stations 105 (e.g., reduced power consumption associated with communicating any retransmissions), etc.

The tentative SPI manager 1520 may receive an indication of a tentative scheduling plan from the scheduling node. In some examples, the tentative SPI manager 1520 may receive, at a CU, indications of one or more tentative scheduling plans, each of the one or more tentative scheduling plans for an additional scheduling node. In some examples, the tentative SPI manager 1520 may forward the indications of the one or more tentative scheduling plans to the scheduling node.

The SPI updating manager 1525 may determine an updated scheduling plan for the scheduling node based on the received indication of the tentative scheduling plan and the received measurement report, where the updated scheduling plan is scheduling plan for the scheduling node. In some cases, the updated scheduling plan for the scheduling node is further based on at least one additional tentative scheduling plan received from at least one additional scheduling node, and is further based on at least one additional measurement report from at least one additional UE.

The interference profile manager 1530 may determine, by the CU, an interference profile based on the received measurement report and the at least one additional measurement reports, where the indication of the scheduling plan is identified based on the determined interference profile. In some cases, the interference profile includes a profile of interfering UEs, or interfering beams, or a combination thereof.

Figure 16:
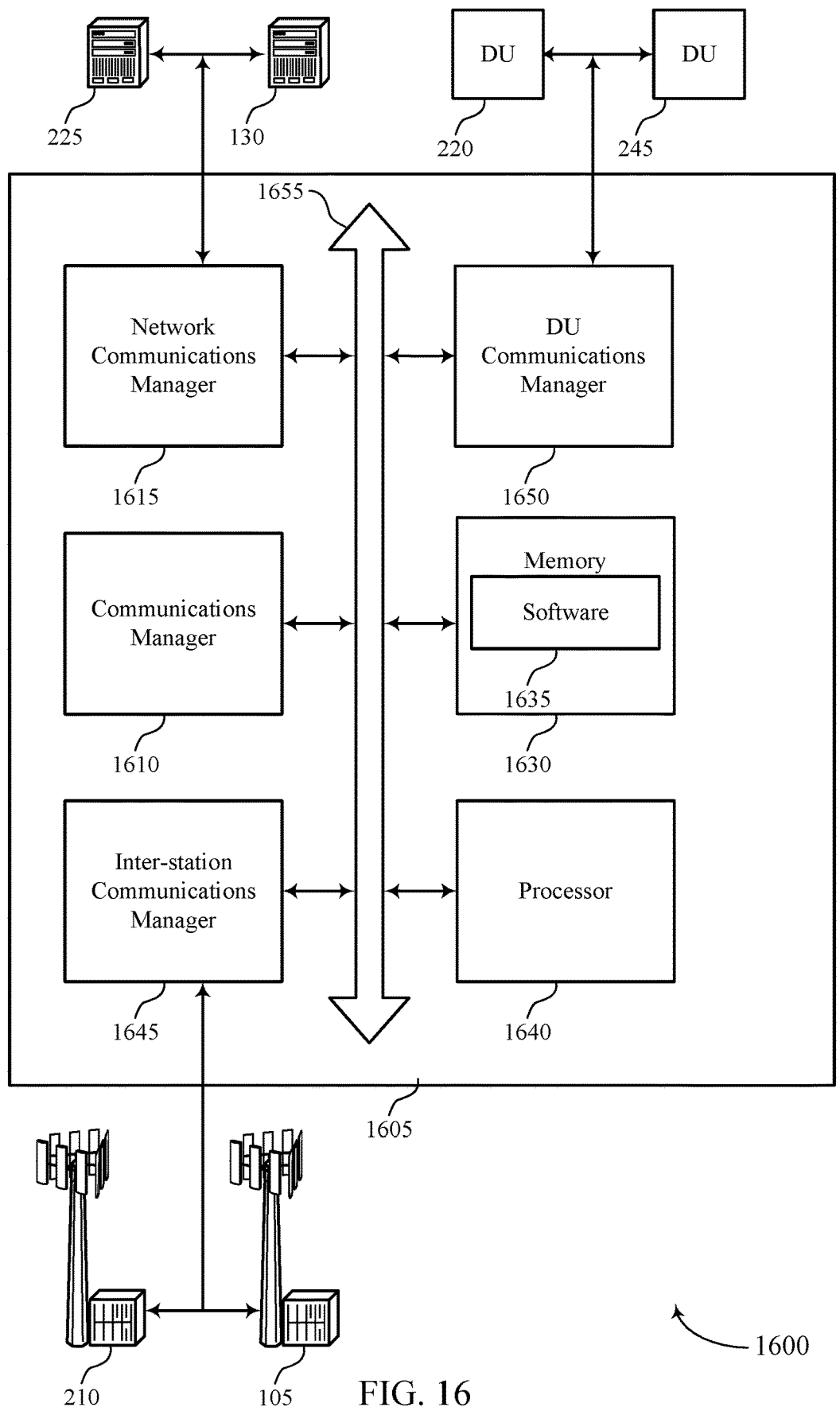

FIG. 16 shows a diagram of a system 1600 including a device 1605 that supports supporting SPIs in accordance with aspects of the present disclosure. The device 1605 may be an example of or include the components of a base station 105 or DU as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1655).

The communications manager 1610 may receive a measurement report for a UE, the measurement report including measured values of at least one beam of a cell measured by the UE and identify, for a scheduling node, an indication of a scheduling plan specifying a pattern of scheduling states over a period of time, the indication of the scheduling plan based on the measurement report and to be used by the scheduling node to schedule communication resources for the UE.

The network communications manager 1615 may manage communications with the core network (e.g., via one or more wired backhaul links), for example to a core network 130 (e.g., core network 225 (e.g., a NGC) over an NG interface (e.g., some backhaul link 132)). For example, the network communications manager 1615 may provide an NG interface for signaling (transmitting and/or receive) of SPIs for coordinated scheduling techniques described herein.

In some cases, device 1605 may include a transceiver that may communicate bi-directionally, via one or more antennas, wired, or wireless links as described above. For example, the transceiver may represent a wireless transceiver and may communicate bi-directionally with another wireless transceiver. The transceiver may also include a modem to modulate the packets and provide the modulated packets to the antennas for transmission, and to demodulate packets received from the antennas. In some cases, the device 1605 may include a single antenna. However, in some cases the device may have more than one antenna, which may be capable of concurrently transmitting or receiving multiple wireless transmissions.

The memory 1630 may include RAM, ROM, or a combination thereof. The memory 1630 may store computer-readable code or software 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device to perform various functions (e.g., functions or tasks supporting SPIs).

The inter-station communications manager 1645 may manage communications with base stations 105, base stations 210, CUs 215, IAB donors 230, IAB nodes 235, and/or CUs 240, as described with reference to FIGS. 1-8, and may include a controller or scheduler for controlling communications with these nodes. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105, or may provide an Xn-C interface with a 5G/NR wireless communication network technology to provide communication between base stations 210, CUs 215, IAB donors 230, IAB nodes 235, and/or CUs 240.

The DU communications manager 1650 may manage communications with one or more DUs 220 and/or one or more DUs 245, as described with reference to FIGS. 1-8. For example, the network communications manager 1650 may include a controller or scheduler for controlling communications with DUs (e.g., gNB-DUs) over an F1-AP interface. For example, the DU communications manager 1650 may provide an F1-AP interface for signaling (e.g., transmitting or receiving) of SPIs and/or measurement reports for coordinated scheduling techniques described herein.

The software 1635 may include instructions to implement aspects of the present disclosure, including instructions to support wireless communications. The software 1635 may be stored in a non-transitory computer-readable medium such as system memory or other type of memory. In some cases, the software 1635 may not be directly executable by the processor 1640 but may cause a computer (e.g., when compiled and executed) to perform functions described herein.

It should be noted that the methods described above describe possible implementations, and that the operations and the steps may be rearranged or otherwise modified and that other implementations are possible. Further, aspects from two or more of the methods may be combined.

Figure 17:
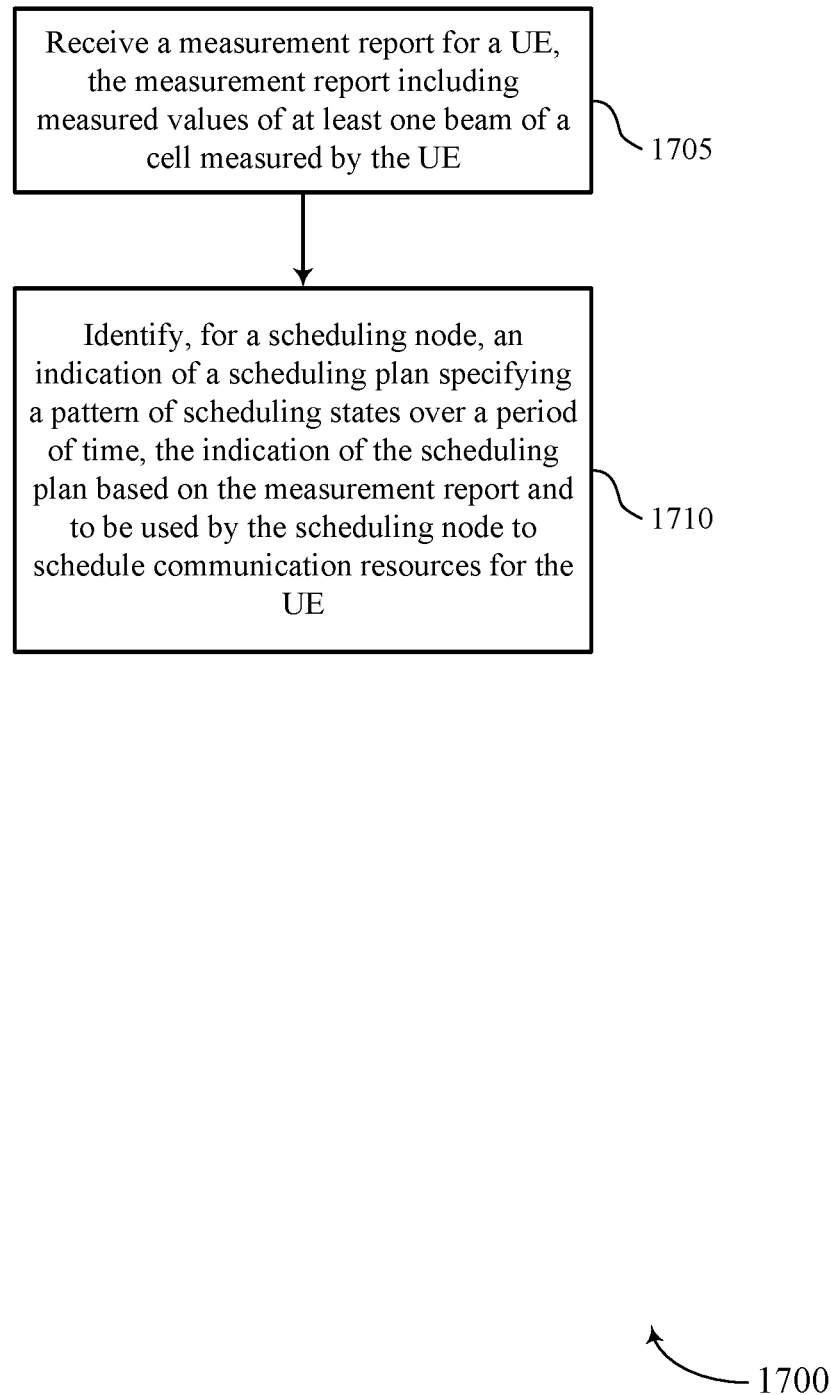

FIG. 17 shows a flowchart illustrating a method 1700 that supports SPIs in accordance with aspects of the present disclosure. The operations of method 1700 may be implemented by a base station 105 or its components as described herein. For example, the operations of method 1700 may be performed by a communications manager as described with reference to FIGS. 9 through 16. In some examples, a base station may execute a set of instructions to control the functional elements of the base station to perform the functions described below. Additionally or alternatively, a base station may perform aspects of the functions described below using special-purpose hardware.

At 1705, the base station may receive a measurement report for a UE, the measurement report including measured values of at least one beam of a cell measured by the UE. The operations of 1705 may be performed according to the methods described herein. In some examples, aspects of the operations of 1705 may be performed by a measurement report manager as described with reference to FIGS. 9 through 16.

At 1710, the base station may identify, for a scheduling node, an indication of a scheduling plan specifying a pattern of scheduling states over a period of time, the indication of the scheduling plan based on the measurement report and to be used by the scheduling node to schedule communication resources for the UE. The operations of 1710 may be performed according to the methods described herein. In some examples, aspects of the operations of 1710 may be performed by a SPI manager as described with reference to FIGS. 9 through 16.

Figure 18:
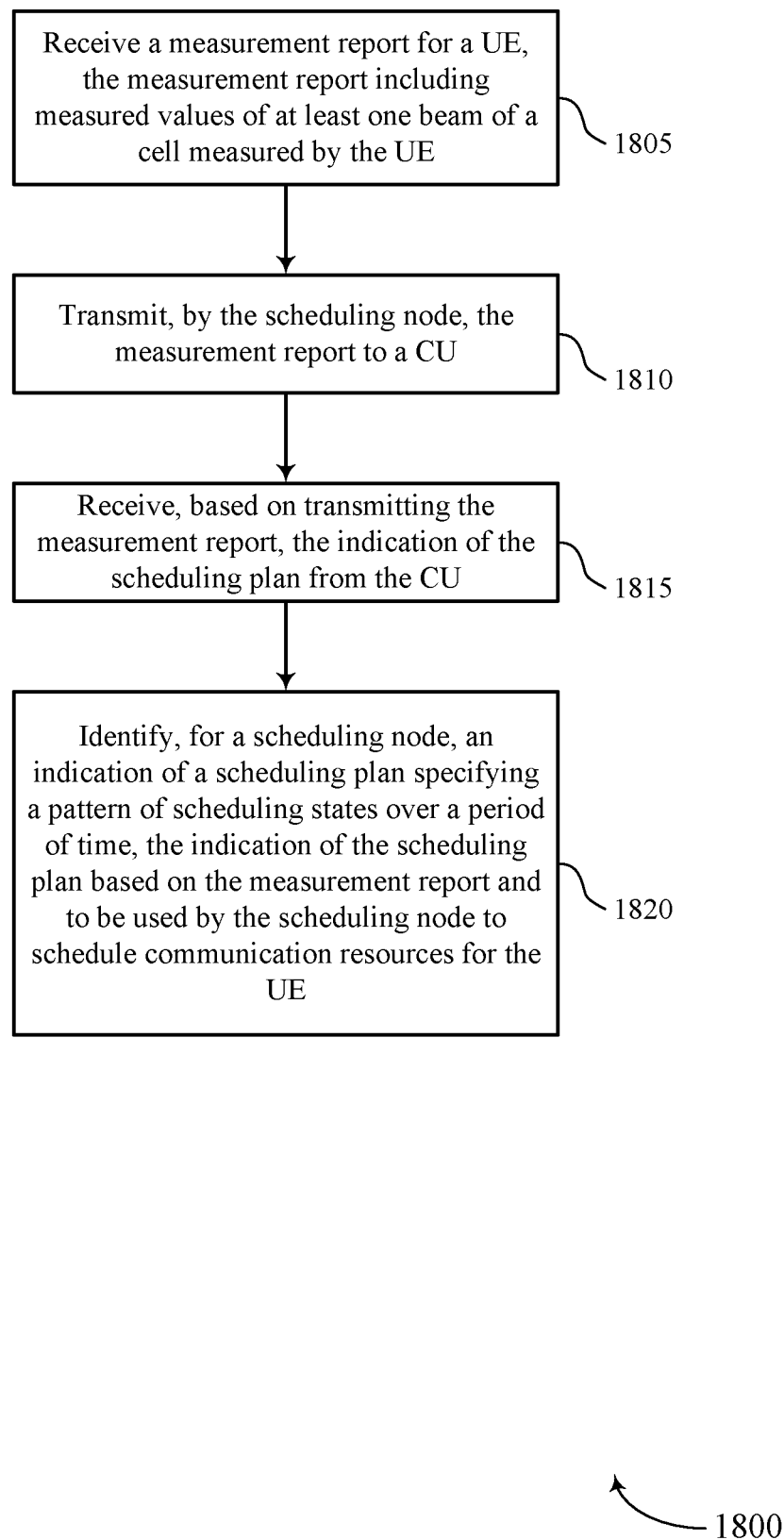

FIG. 18 shows a flowchart illustrating a method 1800 that supports SPIs in accordance with aspects of the present disclosure. The operations of method 1800 may be implemented by a base station 105 or its components as described herein. For example, the operations of method 1800 may be performed by a communications manager as described with reference to FIGS. 9 through 16. In some examples, a base station may execute a set of instructions to control the functional elements of the base station to perform the functions described below. Additionally or alternatively, a base station may perform aspects of the functions described below using special-purpose hardware.

At 1805, the base station may receive a measurement report for a UE, the measurement report including measured values of at least one beam of a cell measured by the UE. The operations of 1805 may be performed according to the methods described herein. In some examples, aspects of the operations of 1805 may be performed by a measurement report manager as described with reference to FIGS. 9 through 16.

At 1810, the base station may transmit, by the scheduling node, the measurement report to a CU. The operations of 1810 may be performed according to the methods described herein. In some examples, aspects of the operations of 1810 may be performed by a measurement report manager as described with reference to FIGS. 9 through 16.

At 1815, the base station may receive, based on transmitting the measurement report, the indication of the scheduling plan from the CU. The operations of 1815 may be performed according to the methods described herein. In some examples, aspects of the operations of 1815 may be performed by a SPI manager as described with reference to FIGS. 9 through 16.

At 1820, the base station may identify, for a scheduling node, an indication of a scheduling plan specifying a pattern of scheduling states over a period of time, the indication of the scheduling plan based on the measurement report and to be used by the scheduling node to schedule communication resources for the UE. The operations of 1820 may be performed according to the methods described herein. In some examples, aspects of the operations of 1820 may be performed by a SPI manager as described with reference to FIGS. 9 through 16.

Figure 19:
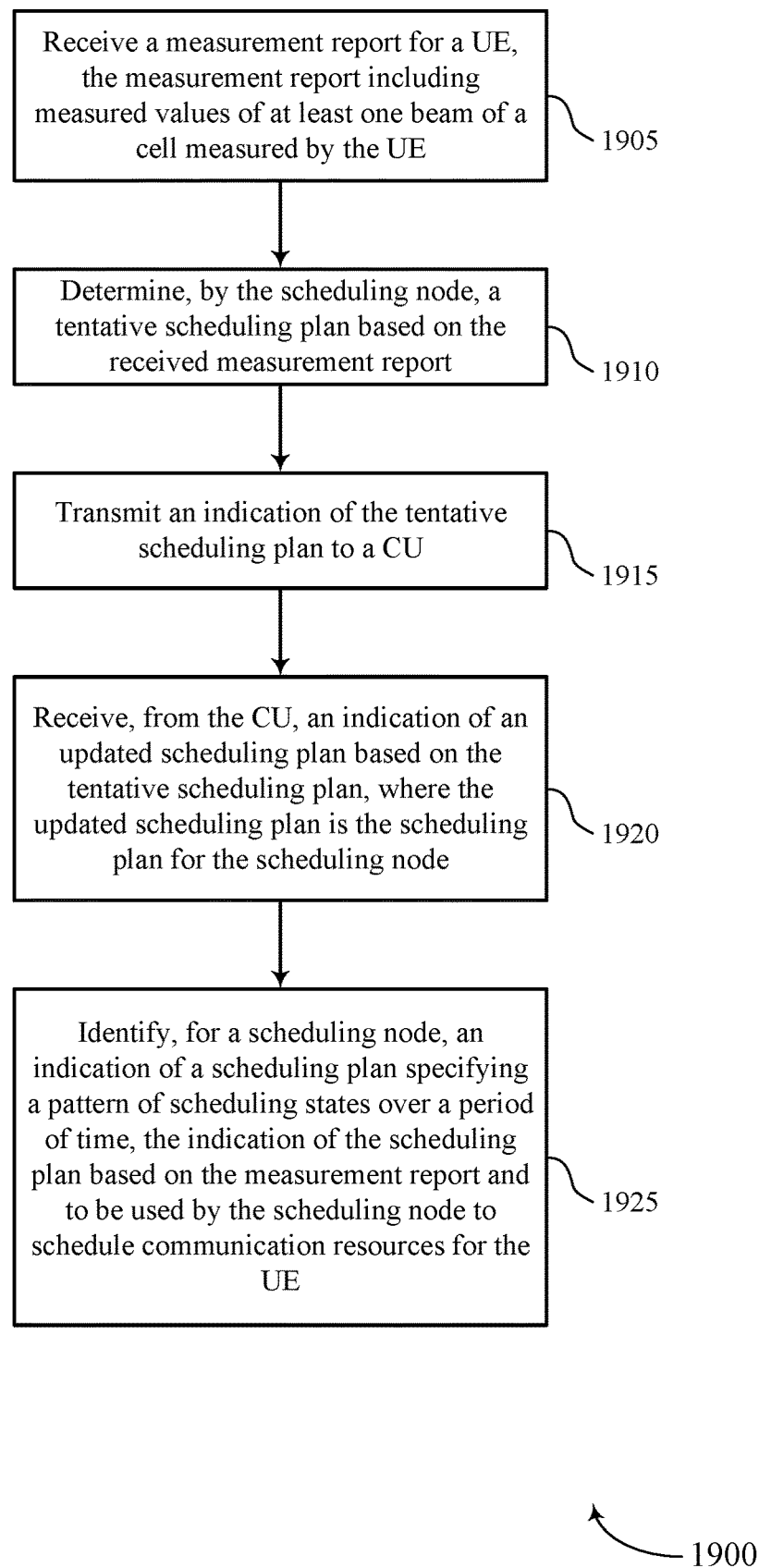

FIG. 19 shows a flowchart illustrating a method 1900 that supports SPIs in accordance with aspects of the present disclosure. The operations of method 1900 may be implemented by a base station 105 or its components as described herein. For example, the operations of method 1900 may be performed by a communications manager as described with reference to FIGS. 9 through 16. In some examples, a base station may execute a set of instructions to control the functional elements of the base station to perform the functions described below. Additionally or alternatively, a base station may perform aspects of the functions described below using special-purpose hardware.

At 1905, the base station may receive a measurement report for a UE, the measurement report including measured values of at least one beam of a cell measured by the UE. The operations of 1905 may be performed according to the methods described herein. In some examples, aspects of the operations of 1905 may be performed by a measurement report manager as described with reference to FIGS. 9 through 16.

At 1910, the base station may determine, by the scheduling node, a tentative scheduling plan. The operations of 1910 may be performed according to the methods described herein. In some examples, aspects of the operations of 1910 may be performed by a tentative SPI manager as described with reference to FIGS. 9 through 16.

At 1915, the base station may transmit an indication of the tentative scheduling plan to a CU. The operations of 1915 may be performed according to the methods described herein. In some examples, aspects of the operations of 1915 may be performed by a tentative SPI manager as described with reference to FIGS. 9 through 16.

At 1920, the base station may receive, from the CU, an indication of an updated scheduling plan based on the tentative scheduling plan, where the updated scheduling plan is the scheduling plan for the scheduling node. The operations of 1920 may be performed according to the methods described herein. In some examples, aspects of the operations of 1920 may be performed by a SPI updating manager as described with reference to FIGS. 9 through 16.

At 1925, the base station may identify, for a scheduling node, an indication of a scheduling plan specifying a pattern of scheduling states over a period of time, the indication of the scheduling plan based on the measurement report and to be used by the scheduling node to schedule communication resources for the UE. The operations of 1925 may be performed according to the methods described herein. In some examples, aspects of the operations of 1925 may be performed by a SPI manager as described with reference to FIGS. 9 through 16.

Figure 20:
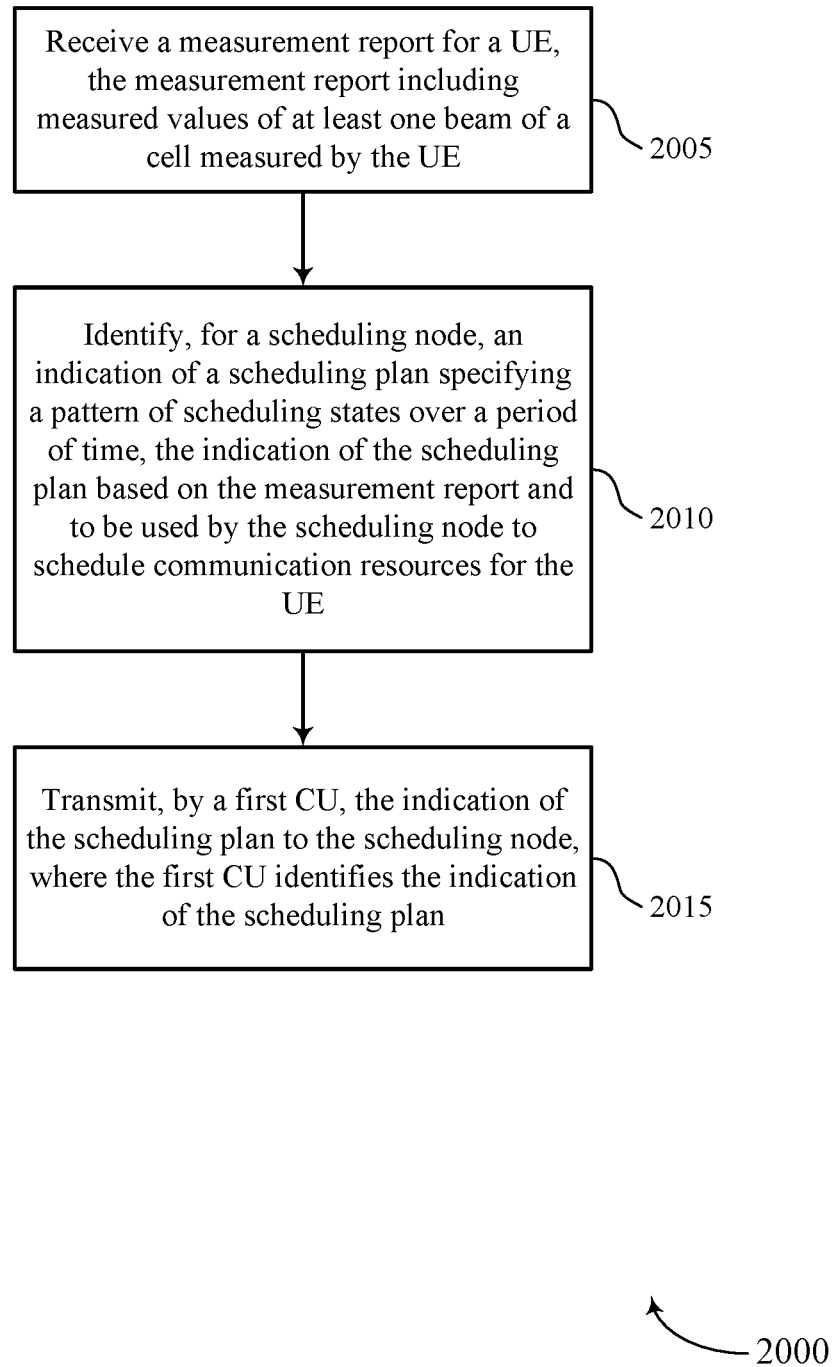

FIG. 20 shows a flowchart illustrating a method 2000 that supports SPIs in accordance with aspects of the present disclosure. The operations of method 2000 may be implemented by a base station 105 or its components as described herein. For example, the operations of method 2000 may be performed by a communications manager as described with reference to FIGS. 9 through 16. In some examples, a base station may execute a set of instructions to control the functional elements of the base station to perform the functions described below. Additionally or alternatively, a base station may perform aspects of the functions described below using special-purpose hardware.

At 2005, the base station may receive a measurement report for a UE, the measurement report including measured values of at least one beam of a cell measured by the UE. The operations of 2005 may be performed according to the methods described herein. In some examples, aspects of the operations of 2005 may be performed by a measurement report manager as described with reference to FIGS. 9 through 16.

At 2010, the base station may identify, for a scheduling node, an indication of a scheduling plan specifying a pattern of scheduling states over a period of time, the indication of the scheduling plan based on the measurement report and to be used by the scheduling node to schedule communication resources for the UE. The operations of 2010 may be performed according to the methods described herein. In some examples, aspects of the operations of 2010 may be performed by a SPI manager as described with reference to FIGS. 9 through 16.

At 2015, the base station may transmit, by a first CU, the indication of the scheduling plan to the scheduling node, where the first CU identifies the indication of the scheduling plan. The operations of 2015 may be performed according to the methods described herein. In some examples, aspects of the operations of 2015 may be performed by a SPI manager as described with reference to FIGS. 9 through 16.

Figure 21:
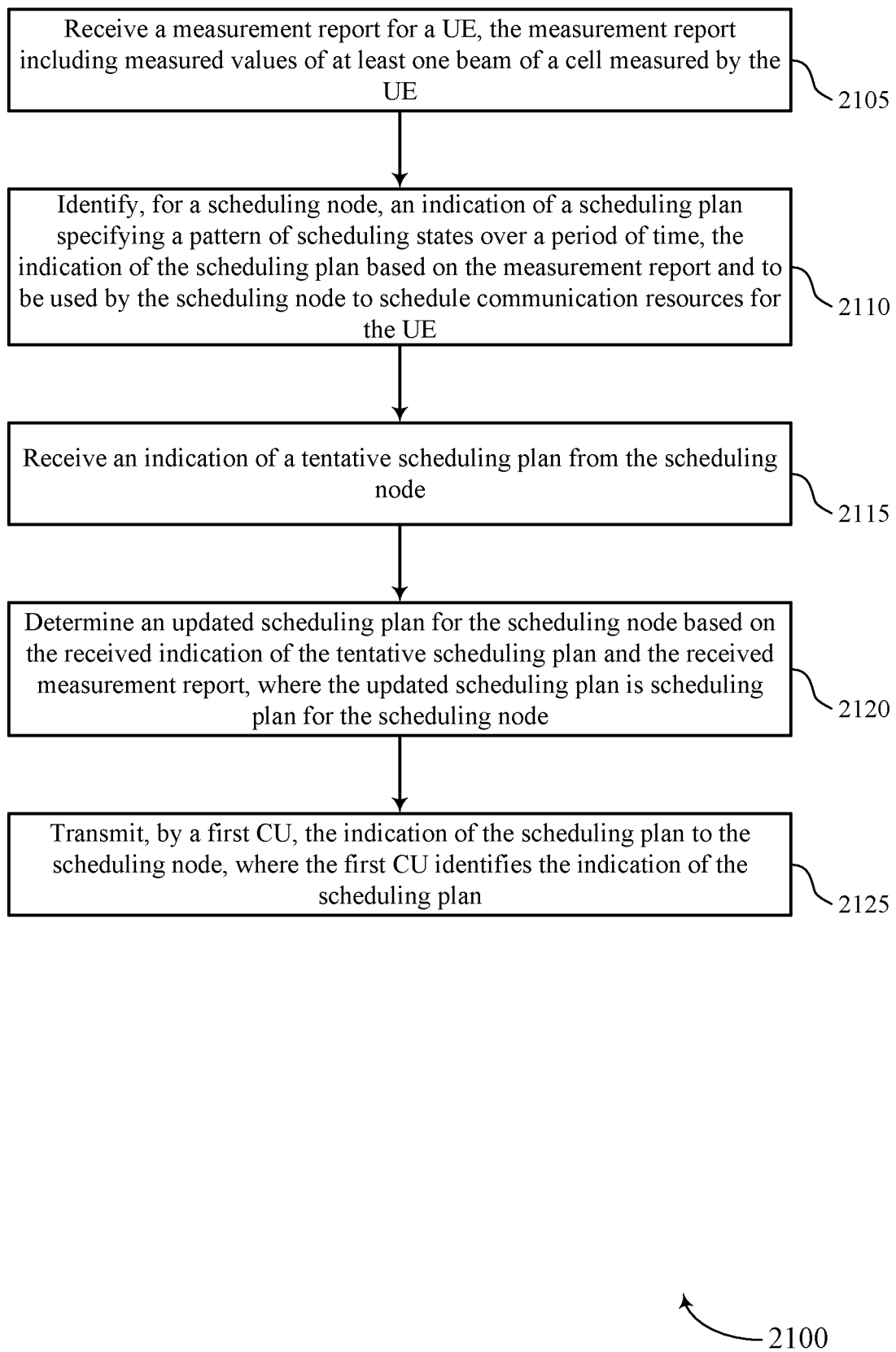

FIG. 21 shows a flowchart illustrating a method 2100 that supports SPIs in accordance with aspects of the present disclosure. The operations of method 2100 may be implemented by a base station 105 or its components as described herein. For example, the operations of method 2100 may be performed by a communications manager as described with reference to FIGS. 9 through 16. In some examples, a base station may execute a set of instructions to control the functional elements of the base station to perform the functions described below. Additionally or alternatively, a base station may perform aspects of the functions described below using special-purpose hardware.

At 2105, the base station may receive a measurement report for a UE, the measurement report including measured values of at least one beam of a cell measured by the UE. The operations of 2105 may be performed according to the methods described herein. In some examples, aspects of the operations of 2105 may be performed by a measurement report manager as described with reference to FIGS. 9 through 16.

At 2110, the base station may identify, for a scheduling node, an indication of a scheduling plan specifying a pattern of scheduling states over a period of time, the indication of the scheduling plan based on the measurement report and to be used by the scheduling node to schedule communication resources for the UE. The operations of 2110 may be performed according to the methods described herein. In some examples, aspects of the operations of 2110 may be performed by a SPI manager as described with reference to FIGS. 9 through 16.

At 2115, the base station may receive an indication of a tentative scheduling plan from the scheduling node. The operations of 2115 may be performed according to the methods described herein. In some examples, aspects of the operations of 2115 may be performed by a tentative SPI manager as described with reference to FIGS. 9 through 16.

At 2120, the base station may determine an updated scheduling plan for the scheduling node based on the received indication of the tentative scheduling plan and the received measurement report, where the updated scheduling plan is scheduling plan for the scheduling node. The operations of 2120 may be performed according to the methods described herein. In some examples, aspects of the operations of 2120 may be performed by a SPI updating manager as described with reference to FIGS. 9 through 16.

At 2125, the base station may transmit, by a first CU, the indication of the scheduling plan to the scheduling node, where the first CU identifies the indication of the scheduling plan. The operations of 2125 may be performed according to the methods described herein. In some examples, aspects of the operations of 2125 may be performed by a SPI manager as described with reference to FIGS. 9 through 16.

Figure 22:
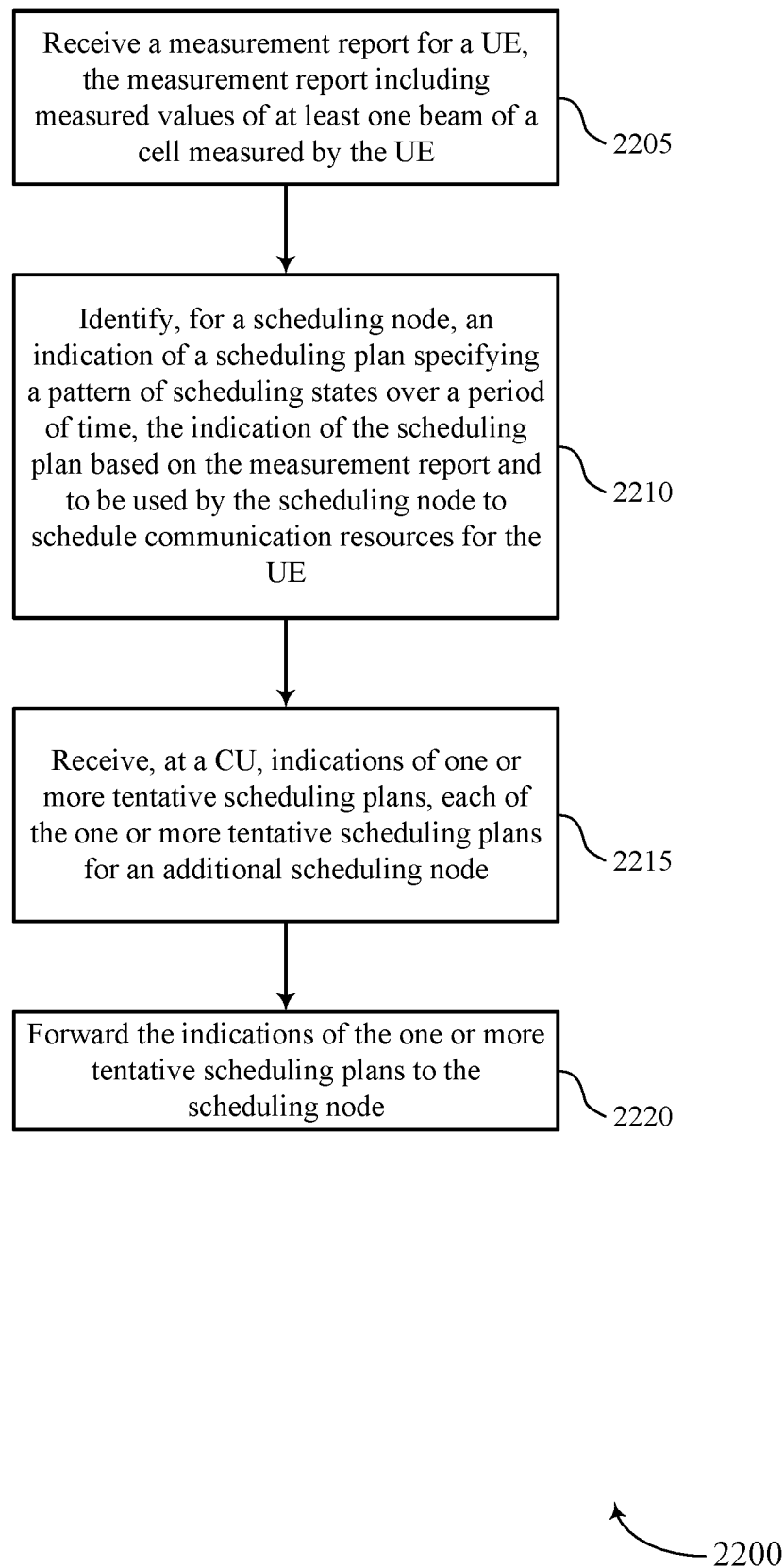

FIG. 22 shows a flowchart illustrating a method 2200 that supports SPIs in accordance with aspects of the present disclosure. The operations of method 2200 may be implemented by a base station 105 or its components as described herein. For example, the operations of method 2200 may be performed by a communications manager as described with reference to FIGS. 9 through 16. In some examples, a base station may execute a set of instructions to control the functional elements of the base station to perform the functions described below. Additionally or alternatively, a base station may perform aspects of the functions described below using special-purpose hardware.

At 2205, the base station may receive a measurement report for a UE, the measurement report including measured values of at least one beam of a cell measured by the UE. The operations of 2205 may be performed according to the methods described herein. In some examples, aspects of the operations of 2205 may be performed by a measurement report manager as described with reference to FIGS. 9 through 16.

At 2210, the base station may identify, for a scheduling node, an indication of a scheduling plan specifying a pattern of scheduling states over a period of time, the indication of the scheduling plan based on the measurement report and to be used by the scheduling node to schedule communication resources for the UE. The operations of 2210 may be performed according to the methods described herein. In some examples, aspects of the operations of 2210 may be performed by a SPI manager as described with reference to FIGS. 9 through 16.

At 2215, the base station may receive, at a CU, indications of one or more tentative scheduling plans, each of the one or more tentative scheduling plans for an additional scheduling node. The operations of 2215 may be performed according to the methods described herein. In some examples, aspects of the operations of 2215 may be performed by a tentative SPI manager as described with reference to FIGS. 9 through 16.

At 2220, the base station may forward the indications of the one or more tentative scheduling plans to the scheduling node. The operations of 2220 may be performed according to the methods described herein. In some examples, aspects of the operations of 2220 may be performed by a tentative SPI manager as described with reference to FIGS. 9 through 16.

Figure 23:
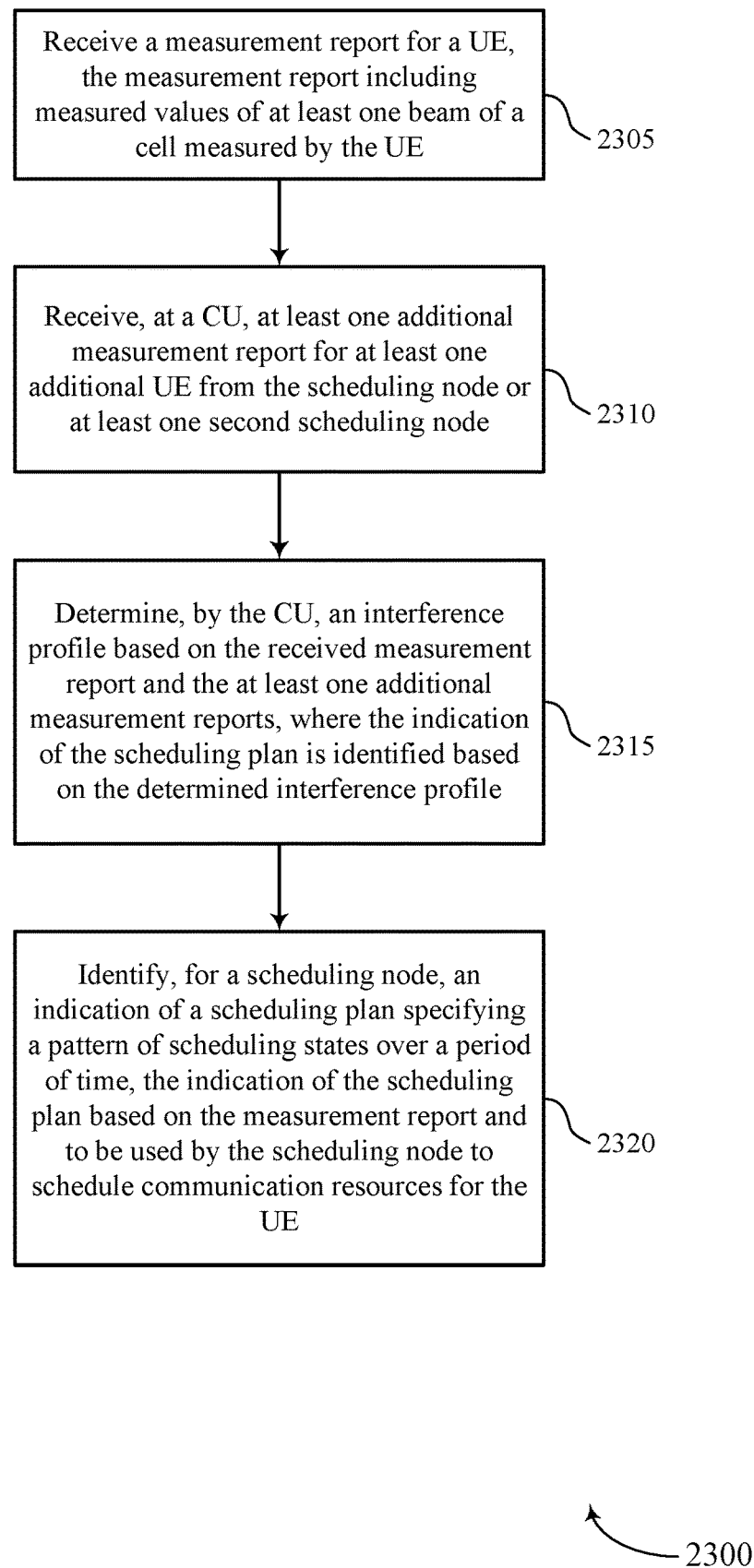

FIG. 23 shows a flowchart illustrating a method 2300 that supports SPIs in accordance with aspects of the present disclosure. The operations of method 2300 may be implemented by a base station 105 or its components as described herein. For example, the operations of method 2300 may be performed by a communications manager as described with reference to FIGS. 9 through 16. In some examples, a base station may execute a set of instructions to control the functional elements of the base station to perform the functions described below. Additionally or alternatively, a base station may perform aspects of the functions described below using special-purpose hardware.

At 2305, the base station may receive a measurement report for a UE, the measurement report including measured values of at least one beam of a cell measured by the UE. The operations of 2305 may be performed according to the methods described herein. In some examples, aspects of the operations of 2305 may be performed by a measurement report manager as described with reference to FIGS. 9 through 16.

At 2310, the base station may receive, at a CU, at least one additional measurement report for at least one additional UE from the scheduling node or at least one second scheduling node. The operations of 2310 may be performed according to the methods described herein. In some examples, aspects of the operations of 2310 may be performed by a measurement report manager as described with reference to FIGS. 9 through 16.

At 2315, the base station may determine, by the CU, an interference profile based on the received measurement report and the at least one additional measurement reports, where the indication of the scheduling plan is identified based on the determined interference profile. The operations of 2315 may be performed according to the methods described herein. In some examples, aspects of the operations of 2315 may be performed by an interference profile manager as described with reference to FIGS. 9 through 16.

At 2320, the base station may identify, for a scheduling node, an indication of a scheduling plan specifying a pattern of scheduling states over a period of time, the indication of the scheduling plan based on the measurement report and to be used by the scheduling node to schedule communication resources for the UE. The operations of 2320 may be performed according to the methods described herein. In some examples, aspects of the operations of 2320 may be performed by a SPI manager as described with reference to FIGS. 9 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication comprising:
   receiving a measurement report for a user equipment (UE), the measurement report comprising measured values of at least one beam of a cell measured by the UE; and
   identifying, for a scheduling node, an indication of a scheduling plan specifying a pattern of scheduling states over a period of time, the indication of the scheduling plan based at least in part on the measurement report and each scheduling state of the pattern of scheduling states indicating whether the scheduling node is allowed to or prevented from scheduling communication resources for the UE during a respective time unit during the period of time.

2. The method of claim 1, wherein the pattern of scheduling states comprises a scheduling information state, or a flexible state, or a NULL state, or a combination thereof.

3. The method of claim 2, wherein:
   for the flexible state the scheduling node is allowed to schedule any UE, or any beam direction, or a combination thereof; and
   for the NULL state the scheduling node is prevented from scheduling all UEs, or all beam directions, or a combination thereof.

4. The method of claim 1, wherein the period of time comprises one or more slots or mini-slots.

5. The method of claim 1, wherein the indication of the scheduling plan identifies values for scheduling for a scheduling state, the values comprising a set UE indices, or a set of beam indices, or a set of angular values, or a set of location values, or a combination thereof.

6. The method of claim 1, wherein the indication of the scheduling plan schedules, for a scheduling state, data transmissions for different UEs, or different beam patterns, or a combination thereof.

7. The method of claim 1, wherein the indication of the scheduling plan identifies, for a scheduling state, allocated resources blocks, or a buffer status, or a priority, or a type of communications, or a modulation and coding scheme (MCS), or a target signal to interference noise ratio (SINR), or a target transmit power, or a target receive power, or a combination thereof.

8. The method of claim 1, further comprising:
   transmitting, by the scheduling node, the measurement report to a central unit (CU); and
   receiving, based at least in part on transmitting the measurement report, the indication of the scheduling plan from the CU.

9. The method of claim 1, further comprising:
   determining, by the scheduling node, a tentative scheduling plan;
   transmitting an indication of the tentative scheduling plan to a CU; and
   receiving, from the CU, an indication of an updated scheduling plan based at least in part on the tentative scheduling plan, wherein the updated scheduling plan is the scheduling plan for the scheduling node.

10. The method of claim 1, further comprising:
transmitting, by a first central unit (CU), the indication of the scheduling plan to the scheduling node, wherein the first CU identifies the indication of the scheduling plan.

11. The method of claim 10, wherein identifying the indication of the scheduling plan comprises:
determining, by the first CU, the indication of the scheduling plan based at least in part on the received measurement report, the measurement report received from the scheduling node.

12. The method of claim 10, wherein identifying the indication of the scheduling plan comprises:
receiving an indication of a tentative scheduling plan from the scheduling node; and
determining an updated scheduling plan for the scheduling node based at least in part on the received indication of the tentative scheduling plan and the received measurement report, wherein the updated scheduling plan is the scheduling plan for the scheduling node.

13. The method of claim 12, wherein the updated scheduling plan for the scheduling node is further based at least in part on at least one additional tentative scheduling plan received from at least one additional scheduling node, and is further based at least in part on at least one additional measurement report from at least one additional UE.

14. The method of claim 10, further comprising:
receiving the indication of the scheduling plan from a second CU, the received indication transmitted to the scheduling node by the CU.

15. The method of claim 10, further comprising:
transmitting the measurement report to a core network node; and
receiving the indication of the scheduling plan from the core network node.

16. The method of claim 1, further comprising:
transmitting, by a first CU, the indication of the scheduling plan to a second CU, or a core network node, or a combination thereof, wherein the first CU identifies the indication of the scheduling plan based at least in part on the received measurement report.

17. The method of claim 1, further comprising:
receiving, at the scheduling node and from a second scheduling node via a CU, an indication of a tentative scheduling plan; and
determining, by the scheduling node, an updated scheduling plan for the scheduling node based at least in part on the received indication of the tentative scheduling plan.

18. The method of claim 17, further comprising:
identifying, by the scheduling node, at least one priority rule applicable to the scheduling plan of the scheduling node, wherein the updated scheduling plan for the scheduling node is determined based at least in part on the received indication of the tentative scheduling plan and the at least one priority rule.

19. The method of claim 1, further comprising:
receiving, at a central unit (CU), indications of one or more tentative scheduling plans, each of the one or more tentative scheduling plans for an additional scheduling node; and
forwarding the indications of the one or more tentative scheduling plans to the scheduling node.

20. The method of claim 1, wherein:
identifying the indication of the scheduling plan comprises determining, by a core network node, the indication of the scheduling plan based at least in part on the received measurement report; and
the method further comprises transmitting the indication of the scheduling plan determined by the core network node to a central unit (CU).

21. The method of claim 1, further comprising:
receiving, at a central unit (CU), at least one additional measurement report for at least one additional UE from the scheduling node or at least one second scheduling node; and
determining, by the CU, an interference profile based at least in part on the received measurement report and the at least one additional measurement reports, wherein the indication of the scheduling plan is identified based at least in part on the determined interference profile.

22. The method of claim 21, wherein the interference profile comprises a profile of interfering UEs, or interfering beams, or a combination thereof.

23. The method of claim 1, further comprising:
receiving, at the scheduling node, an interference profile from a central unit;
identifying at least one UE, or at least one beam direction, or a combination thereof, as interfering based at least in part on the received interference profile; and
assigning, by the scheduling node, the at least one UE, or the at least one beam direction, or the combination thereof, to different time units, or different non-overlapping resource block allocations, or a combination thereof.

24. The method of claim 1, further comprising:
transmitting configuration information for the UE to use to perform measurements of the cell, or at least one additional cell, or a combination thereof.

25. The method of claim 24, further comprising:
receiving at least one additional measurement report from the UE based at least in part on the transmitted configuration information.

26. The method of claim 1, further comprising:
transmitting, by a parent node of an integrated access and backhaul network (IAB), the indication of the scheduling plan to a child node of the IAB.

27. The method of claim 1, further comprising:
transmitting the indication of the scheduling plan on a group common physically downlink control channel (GC-PDCCH), or a radio resource control (RRC) message, or a combination thereof.

28. The method of claim 1, wherein identifying the indication of the scheduling plan comprises:
identifying a conflict between a first indication of a first scheduling plan for the scheduling node and a second indication of a second scheduling plan for the scheduling node; and
selecting the first scheduling plan or the second scheduling plan to be the scheduling plan based at least in part on a rule for scheduling plan selection.

29. The method of claim 28, further comprising:
identifying a first time duration associated with the first scheduling plan and a second time duration associated with the second scheduling plan, wherein the rule indicates that the first scheduling plan is selected based at least in part on the second time duration being longer than the first time duration.

30. The method of claim 28, further comprising:
receiving the first indication of the first scheduling plan over a first type of interface;
receiving the second indication of the second scheduling plan over a second type of interface; and selecting the first scheduling plan to be the scheduling plan based at least in part on the rule indicating that the first type of interface overrides the second type of interface.

31. The method of claim 1, wherein the scheduling node comprises a distributed unit (DU) of an integrated access and backhaul (IAB) network.

32. The method of claim 31, wherein the IAB network comprises a central unit (CU) controlling a plurality of DUs, including the DU.

33. The method of claim 31, wherein the SPI is used for inter-DU coordination via a central unit (CU) of the TAB network.

34. The method of claim 31, wherein the SPI is used for inter-CU coordination via one or more Xn_C interfaces, or via a core network, or a combination thereof.

35. An apparatus for wireless communication, comprising:
  a processor;
  memory in electronic communication with the processor; and
  instructions stored in the memory and executable by the processor to cause the apparatus to:
    receive a measurement report for a user equipment (UE), the measurement report comprising measured values of at least one beam of a cell measured by the UE; and
    identify, for a scheduling node, an indication of a scheduling plan specifying a pattern of scheduling states over a period of time, the indication of the scheduling plan based at least in part on the measurement report and each scheduling state of the pattern of scheduling states indicating whether the scheduling node is allowed to or prevented from scheduling communication resources for the UE during a respective time unit during the period of time.

36. The apparatus of claim 35, wherein the pattern of scheduling states comprises a scheduling information state, or a flexible state, or a NULL state, or a combination thereof.

37. The apparatus of claim 36, wherein:
  for the flexible state the scheduling node is allowed to schedule any UE, or any beam direction, or a combination thereof; and
  for the NULL state the scheduling node is prevented from scheduling all UEs, or all beam directions, or a combination thereof.

38. The apparatus of claim 35, wherein the period of time comprises one or more slots or mini-slots.

39. The apparatus of claim 35, wherein the indication of the scheduling plan identifies values for scheduling for a scheduling state, the values comprising a set UE indices, or a set of beam indices, or a set of angular values, or a set of location values, or a combination thereof.

40. The apparatus of claim 35, wherein the indication of the scheduling plan schedules, for a scheduling state, data transmissions for different UEs, or different beam patterns, or a combination thereof.

41. The apparatus of claim 35, wherein the indication of the scheduling plan identifies, for a scheduling state, allocated resources blocks, or a buffer status, or a priority, or a type of communications, or a modulation and coding scheme (MCS), or a target signal to interference noise ratio (SINK), or a target transmit power, or a target receive power, or a combination thereof.

42. The apparatus of claim 35, wherein the instructions are further executable by the processor to cause the apparatus to:
  transmit, by the scheduling node, the measurement report to a central unit (CU); and
  receive, based at least in part on transmitting the measurement report, the indication of the scheduling plan from the CU.

43. The apparatus of claim 35, wherein the instructions are further executable by the processor to cause the apparatus to:
  determine, by the scheduling node, a tentative scheduling plan;
  transmit an indication of the tentative scheduling plan to a CU; and
  receive, from the CU, an indication of an updated scheduling plan based at least in part on the tentative scheduling plan, wherein the updated scheduling plan is the scheduling plan for the scheduling node.

44. The apparatus of claim 35, wherein the instructions are further executable by the processor to cause the apparatus to:
  transmit, by a first central unit (CU), the indication of the scheduling plan to the scheduling node, wherein the first CU identifies the indication of the scheduling plan.

45. The apparatus of claim 35, wherein the instructions are further executable by the processor to cause the apparatus to:
  transmit, by a first CU, the indication of the scheduling plan to a second CU, or a core network node, or a combination thereof, wherein the first CU identifies the indication of the scheduling plan based at least in part on the received measurement report.

46. The apparatus of claim 35, wherein the instructions are further executable by the processor to cause the apparatus to:
  receive, at the scheduling node and from a second scheduling node via a CU, an indication of a tentative scheduling plan; and
  determine, by the scheduling node, an updated scheduling plan for the scheduling node based at least in part on the received indication of the tentative scheduling plan.

47. The apparatus of claim 35, wherein the instructions are further executable by the processor to cause the apparatus to:
  receive, at a central unit (CU), indications of one or more tentative scheduling plans, each of the one or more tentative scheduling plans for an additional scheduling node; and
  forward the indications of the one or more tentative scheduling plans to the scheduling node.

48. The apparatus of claim 35, wherein
  identify the indication of the scheduling plan comprises determining, by a core network node, the indication of the scheduling plan based at least in part on the received measurement report; and
  the method further comprises transmitting the indication of the scheduling plan determined by the core network node to a central unit (CU).

49. The apparatus of claim 35, wherein the instructions are further executable by the processor to cause the apparatus to:
  receive, at a central unit (CU), at least one additional measurement report for at least one additional UE from the scheduling node or at least one second scheduling node; and determine, by the CU, an interference profile based at least in part on the received measurement report and the at least one additional measurement reports, wherein the indication of the scheduling plan is identified based at least in part on the determined interference profile.

50. The apparatus of claim 35, wherein the instructions are further executable by the processor to cause the apparatus to:
receive, at the scheduling node, an interference profile from a central unit;
identify at least one UE, or at least one beam direction, or a combination thereof, as interfering based at least in part on the received interference profile; and
assign, by the scheduling node, the at least one UE, or the at least one beam direction, or the combination thereof, to different time units, or different non-overlapping resource block allocations, or a combination thereof.

51. The apparatus of claim 35, wherein the instructions are further executable by the processor to cause the apparatus to:
transmit configuration information for the UE to use to perform measurements of the cell, or at least one additional cell, or a combination thereof.

52. The apparatus of claim 35, wherein the instructions are further executable by the processor to cause the apparatus to:
transmit, by a parent node of an integrated access and backhaul network (IAB), the indication of the scheduling plan to a child node of the IAB.

53. The apparatus of claim 35, wherein the instructions are further executable by the processor to cause the apparatus to:
transmit the indication of the scheduling plan on a group common physically downlink control channel (GC-PDCCH), or a radio resource control (RRC) message, or a combination thereof.

54. The apparatus of claim 35, wherein the instructions to identify the indication of the scheduling plan are executable by the processor to cause the apparatus to:
identify a conflict between a first indication of a first scheduling plan for the scheduling node and a second indication of a second scheduling plan for the scheduling node; and
select the first scheduling plan or the second scheduling plan to be the scheduling plan based at least in part on a rule for scheduling plan selection.

55. An apparatus for wireless communication, comprising:
means for receiving a measurement report for a user equipment (UE), the measurement report comprising measured values of at least one beam of a cell measured by the UE; and
means for identifying, for a scheduling node, an indication of a scheduling plan specifying a pattern of scheduling states over a period of time, the indication of the scheduling plan based at least in part on the measurement report and each scheduling state of the pattern of scheduling states indicating whether the scheduling node is allowed to or prevented from scheduling communication resources for the UE during a respective time unit during the period of time.

56. The apparatus of claim 55, further comprising:
means for transmitting, by the scheduling node, the measurement report to a central unit (CU); and
means for receiving, based at least in part on transmitting the measurement report, the indication of the scheduling plan from the CU.

57. The apparatus of claim 55, further comprising:
means for determining, by the scheduling node, a tentative scheduling plan;
means for transmitting an indication of the tentative scheduling plan to a CU; and
means for receiving, from the CU, an indication of an updated scheduling plan based at least in part on the tentative scheduling plan, wherein the updated scheduling plan is the scheduling plan for the scheduling node.

58. The apparatus of claim 55, further comprising:
means for transmitting, by a first central unit (CU), the indication of the scheduling plan to the scheduling node, wherein the first CU identifies the indication of the scheduling plan.

59. The apparatus of claim 55, further comprising:
means for transmitting, by a first central unit (CU), the indication of the scheduling plan to a second CU, or a core network node, or a combination thereof, wherein the first CU identifies the indication of the scheduling plan based at least in part on the received measurement report.

60. The apparatus of claim 55, further comprising:
means for receiving, at the scheduling node and from a second scheduling node via a CU, an indication of a tentative scheduling plan; and
means for determining, by the scheduling node, an updated scheduling plan for the scheduling node based at least in part on the received indication of the tentative scheduling plan.

61. The apparatus of claim 55, further comprising:
means for receiving, at a central unit (CU), indications of one or more tentative scheduling plans, each of the one or more tentative scheduling plans for an additional scheduling node; and
means for forwarding the indications of the one or more tentative scheduling plans to the scheduling node.

62. The apparatus of claim 55, wherein:
means for identifying the indication of the scheduling plan comprises determining, by a core network node, the indication of the scheduling plan based at least in part on the received measurement report; and
the method further comprises transmitting the indication of the scheduling plan determined by the core network node to a central unit (CU).

63. The apparatus of claim 55, further comprising:
means for receiving, at a central unit (CU), at least one additional measurement report for at least one additional UE from the scheduling node or at least one second scheduling node; and
means for determining, by the CU, an interference profile based at least in part on the received measurement report and the at least one additional measurement reports, wherein the indication of the scheduling plan is identified based at least in part on the determined interference profile.

64. The apparatus of claim 55, further comprising:
means for receiving, at the scheduling node, an interference profile from a central unit;
means for identifying at least one UE, or at least one beam direction, or a combination thereof, as interfering based at least in part on the received interference profile; and
means for assigning, by the scheduling node, the at least one UE, or the at least one beam direction, or the combination thereof, to different time units, or different non-overlapping resource block allocations, or a combination thereof.

65. The apparatus of claim 55, further comprising:
means for transmitting configuration information for the UE to use to perform measurements of the cell, or at least one additional cell, or a combination thereof.

66. The apparatus of claim 55, further comprising:
means for transmitting, by a parent node of an integrated access and backhaul network (IAB), the indication of the scheduling plan to a child node of the TAB.

67. The apparatus of claim 55, further comprising:
means for transmitting the indication of the scheduling plan on a group common physically downlink control channel (GC-PDCCH), or a radio resource control (RRC) message, or a combination thereof.

68. The apparatus of claim 55, wherein the means for identifying the indication of the scheduling plan comprises:
means for identifying a conflict between a first indication of a first scheduling plan for the scheduling node and a second indication of a second scheduling plan for the scheduling node; and
means for selecting the first scheduling plan or the second scheduling plan to be the scheduling plan based at least in part on a rule for scheduling plan selection.

69. A non-transitory computer-readable medium storing code for wireless communication, the code comprising instructions executable by a processor to:
receive a measurement report for a user equipment (UE), the measurement report comprising measured values of at least one beam of a cell measured by the UE; and
identify, for a scheduling node, an indication of a scheduling plan specifying a pattern of scheduling states over a period of time, the indication of the scheduling plan based at least in part on the measurement report and each scheduling state of the pattern of scheduling states indicating whether the scheduling node is allowed to or prevented from scheduling communication resources for the UE during a respective time unit during the period of time.

* * * * *